(12) United States Patent
Fernandez et al.

(10) Patent No.: US 10,734,946 B2
(45) Date of Patent: Aug. 4, 2020

(54) METHODS AND SYSTEMS FOR DETERMINING SOILING ON PHOTOVOLTAIC DEVICES

(71) Applicants: Alliance for Sustainable Energy, LLC, Golden, CO (US); Universidad de Jaen, Jaen (ES)

(72) Inventors: Eduardo F. Fernandez, Jaen (ES); Matthew Thomas Muller, Wheat Ridge, CO (US); Leonardo Micheli, Jaen (ES); Florencia Marina Almonacid Cruz, Jaen (ES)

(73) Assignees: Alliance for Sustainable Energy, LLC, Golden, CO (US); Universidad de Jaen, Jaen (ES)

( * ) Notice: Subject to any disclaimer, the term of this patent is extended or adjusted under 35 U.S.C. 154(b) by 0 days.

(21) Appl. No.: 16/376,547

(22) Filed: Apr. 5, 2019

(65) Prior Publication Data

US 2019/0312548 A1    Oct. 10, 2019

Related U.S. Application Data

(60) Provisional application No. 62/652,955, filed on Apr. 5, 2018, provisional application No. 62/690,086, filed on Jun. 26, 2018.

(51) Int. Cl.
*H02S 50/15* (2014.01)
*G01N 21/958* (2006.01)
(Continued)

(52) U.S. Cl.
CPC ............ *H02S 50/15* (2014.12); *G01N 21/94* (2013.01); *G01N 21/958* (2013.01); *H02S 50/00* (2013.01); *G01N 2021/945* (2013.01)

(58) Field of Classification Search
CPC ................ G01N 21/94; G01N 21/958; G01N 2021/945; H02S 50/00–15
(Continued)

(56) References Cited

U.S. PATENT DOCUMENTS

| 6,052,196 A | 4/2000 | Pientka et al. |
| 6,573,995 B1 | 6/2003 | Beutner et al. |

(Continued)

FOREIGN PATENT DOCUMENTS

| EP | 2 960 643 A1 | 12/2015 |
| WO | 2012089485 A1 | 7/2012 |
| WO | 2014081967 A1 | 5/2014 |

OTHER PUBLICATIONS

Tien et al "A Novel Concentrator Photovoltaic (CPV) System with the Improvement of Irradiance Uniformity and the Capturing of Diffuse Solar Radiation," Appl. Sci. 2016, 6, 251. (Year: 2016).*
Corresponding PCT Search Report, PCT/US19/26049, dated Jul. 3, 2019, 2 pages.
Corresponding PCT Written Opinion, PCT/US19/26049, dated Jul. 3, 2019, 5 pages.
(Continued)

*Primary Examiner* — Colin W Kreutzer
(74) *Attorney, Agent, or Firm* — Alexandra M. Hall; Michael A. McIntyre

(57) ABSTRACT

An aspect of the present disclosure relates to radiating light on to a front surface of a glass pane comprising a first surface and a second surface defining a thickness between the first surface and the second surface, wherein the first surface is substantially parallel to the second surface; detecting a transmittance of the light through the glass pane; comparing the transmittance through the glass pane to a reference transmittance value corresponding to a clean reference glass pane; and determining, using the transmittance and the reference transmittance, a soiling metric of a photovoltaic module.

6 Claims, 38 Drawing Sheets

(51) Int. Cl.
*G01N 21/94* (2006.01)
*H02S 50/00* (2014.01)

(58) Field of Classification Search
USPC .......... 324/761.01; 356/239.1, 239.2, 239.7, 356/239.8, 432–434
See application file for complete search history.

(56) References Cited

U.S. PATENT DOCUMENTS

| | | | |
|---|---|---|---|
| 8,334,972 | B2 | 12/2012 | Thien |
| 8,951,356 | B2 | 2/2015 | Fisher et al. |
| 10,245,338 | B2 | 4/2019 | Smetona et al. |
| 10,284,139 | B2 | 5/2019 | Gostein et al. |
| 2009/0266353 | A1 | 10/2009 | Lee |
| 2010/0028567 | A1 | 2/2010 | Suizu et al. |
| 2011/0066401 | A1 | 3/2011 | Yang et al. |
| 2011/0265840 | A1 | 11/2011 | Sela |
| 2013/0222804 | A1 | 8/2013 | Kim et al. |
| 2014/0251034 | A1 | 9/2014 | Dror et al. |
| 2016/0218670 | A1* | 7/2016 | Johnston ............... H02S 50/15 |
| 2017/0194897 | A1 | 7/2017 | Lopez et al. |
| 2018/0331654 | A1* | 11/2018 | Gostein ............... H01L 31/042 |
| 2018/0337633 | A1 | 11/2018 | Tamizhmani et al. |
| 2019/0145907 | A1* | 5/2019 | Van Mechelen ......... G01J 5/00 356/239.1 |

OTHER PUBLICATIONS

Deceglie et al., "Quantifying Soiling Loss Directly From PV Yield," IEEE Journal of Photovoltaics, vol. 8, No. 2, Mar. 2018, pp. 547-551.

Gostein et al., "Accurately Measuring PV Soiling Losses With Soiling Station Employing Module Power Measurements," 42nd IEEE Photovoltaics Conference, Jun. 2015, 4 pages.

Gostein et al., "Mars Soiling Sensor™," 45th IEEE Photovoltaics Conference, Jun. 2018, 4 pages.

King et al., "Regional Soiling Stations for PV: Design, Calibration and Installation," 42nd IEEE Photovoltaics Conference, Jun. 2015, 4 pages.

Kipp & Zonen, "Breakthrough: Novel Soiling Monitoring Solution for Solar Panels," https://www.kippzonen.com/News/808/Breakthrough-Novel-Soiling-Monitoring-Solution-for-Solar-Panels#.XQqatlhKiUl, accessed May 31, 2017, 3 pages.

Kipp & Zonen "DustIQ Development of a novel soiling measurement technology," Intersolar 2017, 20 pages.

Muller et al., "A Method to Extract Soiling Loss Data From Soiling Stations with Imperfect Cleaning Schedules," 44th IEEE Photovoltaics Conference, Jun. 2017, 7 pages.

Semleit et al., "Detection of Deposited Particles from the Backside of a Glass Plate," Part. Part. Syst. Charact., vol. 13, 1996, pp. 34-40.

UKC Holdings Corporation, "DDSolar Dust Detection System," https://www.solardds.com/DDS-Ground.html?lang=en, 6 pages.

\* cited by examiner (A)

(B)

METHODS AND SYSTEMS FOR DETERMINING SOILING ON PHOTOVOLTAIC DEVICES

CROSS-REFERENCE TO RELATED APPLICATIONS

This application claims the benefit of U.S. Provisional Application No. 62/652,955 filed Apr. 5, 2018 and U.S. Provisional Application No. 62/690,086 filed Jun. 26, 2018, the contents of which are incorporated herein by reference in their entirety.

CONTRACTUAL ORIGIN

The United States Government has rights in this invention under Contract No. DE-AC36-08GO28308 between the United States Department of Energy and Alliance for Sustainable Energy, LLC, the Manager and Operator of the National Renewable Energy Laboratory.

BACKGROUND

Photovoltaic (PV) modules convert incoming sunlight into electrical energy. The accumulation of dust, particles, and dirt on the surface of PV modules, known as soiling, negatively impacts the solar energy industry. Soiling causes a reduction in the sunlight that reaches PV modules, causing a reduction in electrical power production. The reduction in electrical power production because of soiling accumulation is known as soiling loss. Soiling losses may cause a 50% reduction in electrical power generation, or even higher, in particularly adverse conditions. In the worst conditions soiling may cause power losses as high as 70%. Maintenance to the PV modules is required to remove the soiling and restore performance, but cleaning PV modules may be expensive. Identifying soiling is essential to planning an effective maintenance schedule which maximizes the electrical power production of PV modules and limits operating costs.

Soiling losses are due to the drop in optical transmittance, because soiling absorbs part of the incoming sunlight and increases the portion of reflected light, limiting the amount of light available for conversion to electrical energy. Moreover, soiling changes the spectrum of the transmitted light, (e.g., causing larger transmittance drops in the blue region) meaning that the various PV technologies are differently affected by soiling, depending on their bandgaps. The impact of soiling may depend on the spectral response of the specific PV material under investigation.

Some PV modules absorb the entire light spectrum (i.e., the entire global irradiance), while others absorb only a portion of the light spectrum. Concentrator PV (CPV) modules convert the direct component of global irradiance to electrical energy. Soiling produces a higher impact on the direct transmission of the irradiance CPV systems show a higher and different dependence on soiling than conventional PVs. Soiling produces a higher attenuation in the blue region, and therefore causes a red-shift of the incident spectral distribution.

SUMMARY

An aspect of the present disclosure is a method that includes recording a first reading of a light detector, turning on a light source configured to emit a light beam on a first surface of a glass pane, recording a second reading of the light detector while the light source is turned on, subtracting the first reading from the second reading resulting in a corrected second reading, and determining a soiling metric of the glass pane using the corrected second reading, where the glass pane includes the first surface and a second surface, the light beam is transmitted through the glass pane, and the light detector is adjacent to the second surface of the glass pane and configured to receive at least a portion of the light beam. In some embodiments, the light detector may be a photovoltaic cell. In some embodiments, the light source may emit the light beam at a discrete wavelength. In some embodiments, the discrete wavelength may be between 300 nm and 1300 nm. In some embodiments, the soiling metric of the glass pane may be inferd to be approximately equal to the soiling metric for a proximately located photovoltaic cell. In some embodiments, the determining of the soiling ratio of the glass pane may be performed by a control unit. In some embodiments, the method may include collimating the light beam after it is transmitted through the glass pane. In some embodiments, a collimator may be adjacent to the second surface of the glass pane.

An aspect of the present disclosure is a device including a light source configured to emit a light beam on a first surface of a glass pane, a light detector configured to be adjacent to a collimator and a second surface of the glass pane, a collimator configured to be in direct contact with the second surface of the glass pane and adjacent to the light detector, and a control unit connected to the light detector via a first wiring and connect to the light source via a second wiring, where the light beam is transmitted through the glass pane, the light beam is collimated by the collimator resulting in a collimated light, and the light detector absorbs the collimated light. In some embodiments, the light detector may be a photovoltaic cell. In some embodiments, the photovoltaic cell may be a concentrated photovoltaic cell. In some embodiments, the light source may be a laser diode. In some embodiments, the control unit may record a reading of the collimated light. In some embodiments, the control unit may use an algorithm to determine a soiling metric for the glass pane from the reading. In some embodiments, the soiling metric may be inferred to be approximately equal to the soiling metric for a proximately located photovoltaic cell.

BRIEF DESCRIPTION OF THE DRAWINGS

Exemplary embodiments are illustrated in referenced figures of the drawings. It is intended that the embodiments and figures disclosed herein are considered to be illustrative rather than limiting.

REFERENCE NUMBERS

Figure 1:
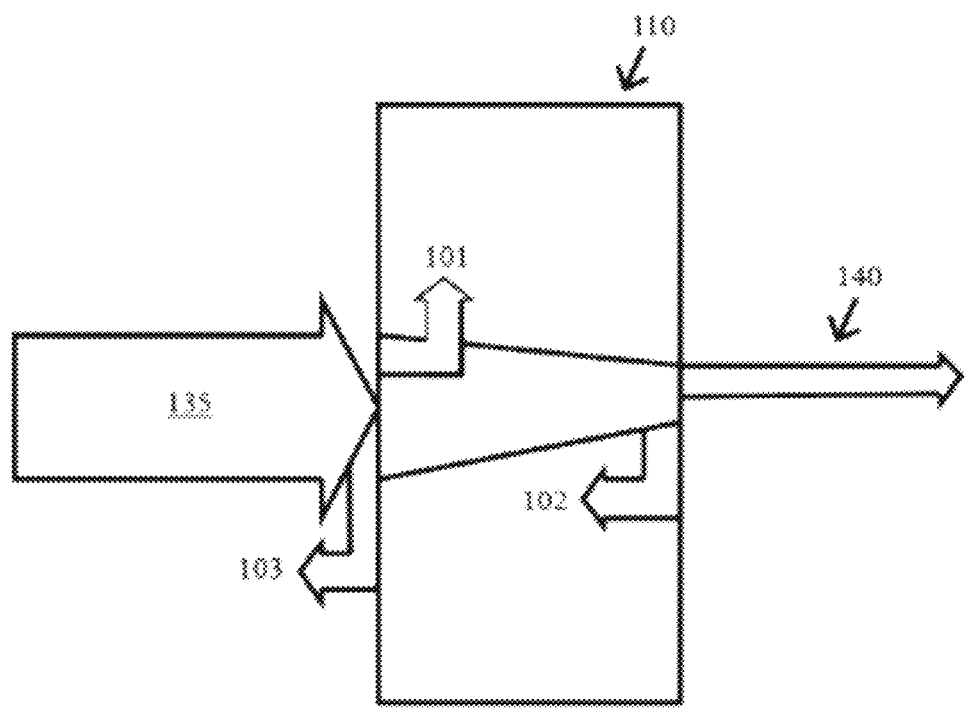
FIG. 1 illustrates the interaction of a light beam with a glass pane.

101 . . . absorbed light
102 . . . internally reflected light
103 . . . externally reflected light
110 . . . glass pane
135 . . . light beam 140 . . . transmitted light
200 . . . soiling detection unit
205 . . . light source
210 . . . collimator
215 . . . light detector
220 . . . control unit
225 . . . first wiring
230 . . . second wiring
300 . . . method
301 . . . taking a zero measurement
302 . . . turning on the light source
303 . . . taking a soiling measurement
304 . . . correcting the soiling measurement
305 . . . calculating a soiling metric
401 . . . photovoltaic cell
402 . . . heat sink
700 . . . integrating sphere
705 . . . incident beam
710 . . . soiled surface
715 . . . detectors
720 . . . reflectance port
725 . . . dispersed light

DETAILED DESCRIPTION

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

The present disclosure, among other things, provides methods, techniques, devices, and systems for analyzing the spectral components of soiling losses and investigating the impact of soiling on various photovoltaic technologies. The present disclosure uses a soiling detection unit to determine the soiling on a glass pane and then infer the soiling of a nearby photovoltaic cell and/or module. This present disclosure describes how transmittance measurements may be used to estimate the soiling losses of photovoltaic cells and/or modules and provides devices and methods to aid to determine various soiling metrics.

A method as described herein may be used to determine the base level of performance of a photovoltaic cell, the change in performance of the photovoltaic cell as a result of soiling, the presence of soiling, and/or the level of performance of a soiled photovoltaic cell. In certain embodiments the type of soiling and/or the amount of soiling may be identified by the change in performance.

As used herein, soiling may be dust, dirt, sand, gravel, mud, debris, pollen, particulate matter, dew, rain, water, snow, hail, slush, moisture, and/or other materials which may accumulate on a photovoltaic panel or module over time. Soiling may be any material, regardless of its physical state, the presence of which on the photovoltaic module may alter the performance of the photovoltaic module. Soiling typically results in a decrease in performance of the photovoltaic module and can generally be removed by cleaning the module. However, cleaning a module can be expensive and time consuming, so knowing when the soiling level requires the photovoltaic module to be cleaned can help make the process more efficient.

As used herein, photovoltaic cell, photovoltaic module, solar cell, solar module, photovoltaic panel, and solar panel may all be interpreted to have the same meaning: a device capable of converting solar energy into electrical energy.

FIG. 1 illustrates the interaction of a light beam 135 with a glass pane 110. The present disclosure utilizes the measurement of the fraction of the light beam 135 transmitted through the glass pane 110 to estimate the soiling of a photovoltaic cell and/or module (not shown). The light beam 135 may be provided by a light source (not shown) through the thickness of the glass pane 110 at an angle approximately orthogonal to the outer surface, though other angles fall within the scope of the present disclosure (e.g., $0°≤α≤180°$). As used herein, a light beam 135 may be light, radiance, or an amount of light or radiance. Among other things, a light beam 135 may be focused (e.g., focused on a distinct point on the glass pane 110) and/or a light beam 135 may be diffuse (e.g., radiating substantially all of the outer surface of glass pane 110). The amount of the light beam 135 that passes completely through the thickness of the glass pane is referred to as the transmitted light 140. Due to various losses, the transmitted light 140 is rarely equal to the original light beam 135 provided by the light source (not shown). For example, a first portion of the light beam 135 may be absorbed by the glass pane 110 as absorbed light 101. A second portion of the light beam 135 may be internally reflected in the glass pane 110 as internally reflected light 102. A third portion of the light beam 135 may be externally reflected by the glass pane 110 as externally reflected light 103. Soiling accumulated on the outer surface of the glass pane 110 may absorb part of the light beam 135 and/or may increase the amount of externally reflected light 103, which may decrease the intensity of the transmitted light 140. The division of the light beam 135 when contacting a glass pane 110 is why determining soiling metrics of photovoltaic cells has historically been so difficult. The present disclosure has a low noise to signal ratio due to the measurement of transmitted light 140 rather than reflected light (102 and 103) and is therefore very accurate.

Figure 2:
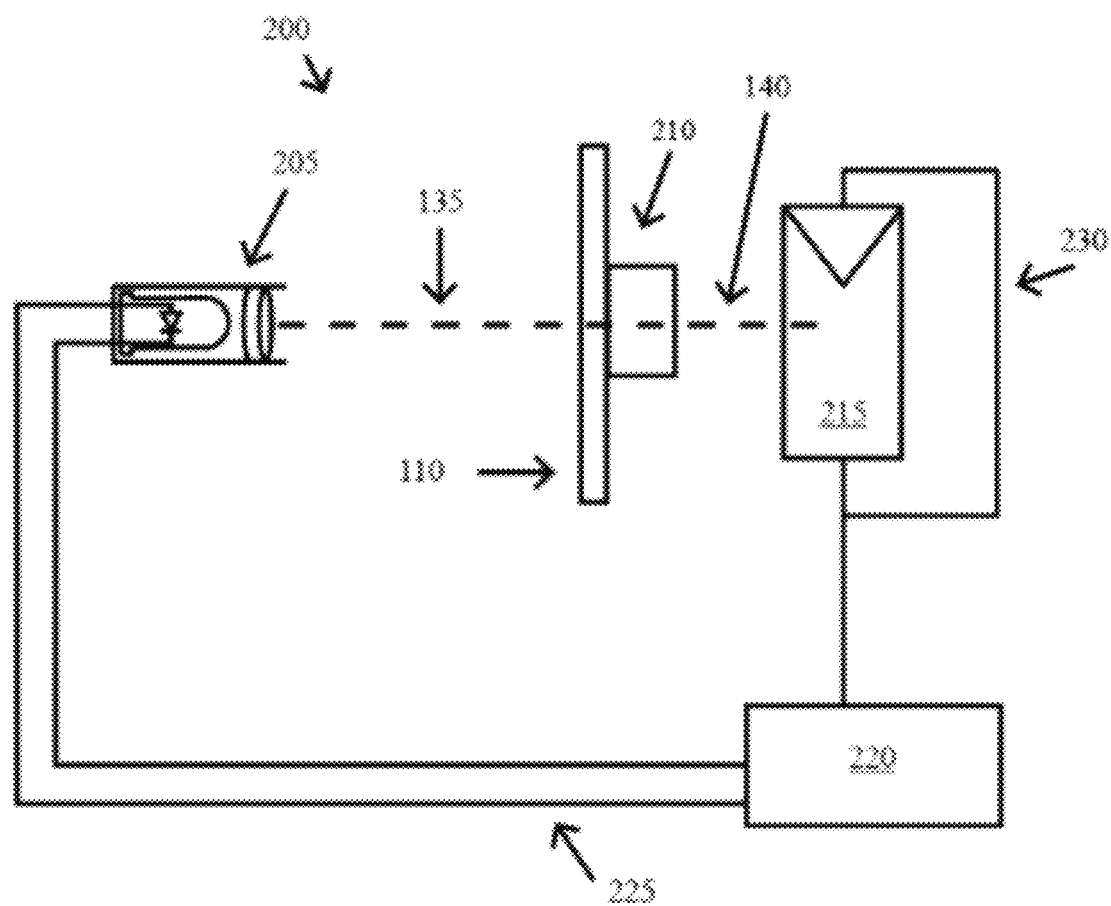
FIG. 2 illustrates a device for detecting and measuring soiling on a photovoltaic cell, as described by some embodiments of the present disclosure.

FIG. 2 illustrates a soiling detection unit 200 for detecting and measuring soiling on a glass pane 110, which may be used to estimate the soiling on a photovoltaic cell and/or module (not shown), as described by some embodiments of the present disclosure. In some embodiments, the soiling detection unit 200 may be located near a photovoltaic cell and/or module so as to soil at an approximately similar rate as the photovoltaic cell. In some embodiments, the soiling detection unit 200 may include a photovoltaic cell as light detector 215. As used herein, "nearby" may be interpreted to be in the same photovoltaic field or within a distance where the soiling on the soiling detection unit 200 may reasonably be inferd to be the soiling occurring on the photovoltaic cell.

In some embodiments, the soiling detection unit 200 may include a light source 205. At certain times, the light source 205 may emit a light beam 135. The soiling detection unit 200 may also include a glass pane 110 which may be oriented in the same way as the photovoltaic cell and/or module whose soiling is to be measured. That is, the pitch, angle, direction, and orientation of the glass pane 110 may be the same as the photovoltaic cells to be analyzed for soiling. The soiling detection unit 200 may also include a light detector 215, positioned behind the glass pane 110, which may absorb the transmitted light 140. In some embodiments, the soiling detection unit 200 may also include electrical connections in the form of a first wiring 225 and second wiring 230, and a control unit 220. The first wiring 225 may electronically connect the control unit 220 to the light source 205 and the second wiring 230 may electronically connect the light detector 215 to the control unit 220. The light source 205 may be positioned such that it emits light at a substantially right angle on to the surface of the glass pane 110. The light detector 215 may be in direct contact with the surface of the glass pane 110 that is farthest from the light source 205.

In some embodiments, the light beam 135 emitted by the light source 205 may be collimated. Collimated light is light which has rays that are approximately parallel. Light that is collimated will display little to no divergence (meaning it will spread or disperse minimally as it propagates). Light, such as the light beam 135 shown in FIG. 1 and FIG. 2, may be collimated by means of being generated by a light source 205 which emits collimated light (such as a laser or laser diode) or by being directed at a collimator which may orient the rays of the light beam 135 to parallel (such as a curved glass lens).

In some embodiments, the light beam 135 may be monochromatic or have a discrete wavelength. In some embodiments, the light beam 135 may include light having a wavelength between 500 and 600 nm. In some embodiments, the light beam 135 may include light that is at least one of cyan (wavelength 505 nm), green (wavelength 530 nm), lime (wavelength 567 nm), and/or amber (wavelength 591 nm). In some embodiments, the light source 205 may include at least one of a light emitting diode (LED) light, incandescent bulb, fluorescent light bulb, laser diode, and/or a laser. In some embodiments, the light source 205 may be protected from soiling by an enclosure, which may surround a portion of the light source. In some embodiments, the enclosure protecting the light source 205 from soiling may be a tubular structure with an end open for the light beam 135 to shine out and on to the glass pane 110. A power source (not shown) will supply electrical power to the light source 205. In some embodiments, the control unit 220 may act as the power source and supply electrical power to the light source 205.

In some embodiments, the glass pane 110 and light detector 215 may include at least one of a photovoltaic cell and/or module that is different than the photovoltaic cell and/or module of interest, whose soiling is to be measured and/or estimated. The electrical generation output of the photovoltaic cell and/or module as the light detector 215 may be used in place of the light intensity, as measured by a spectrophotometer, to determine the amount of soiling occurring on a photovoltaic cell and/or module.

In some embodiments, the light detector 215 may be positioned within an enclosure that protects it from soiling. The light detector 215 may be surrounded and/or encapsulated within an enclosure that is slightly larger than the light detector 215 and protects the light detector 215 from the elements. The glass pane 110 may act as the top surface of the enclosure. The enclosure may be a container made at least one of plastic, fiberglass, aluminum, steel, and/or concrete, and/or other suitable material that is capable of protecting the light detector from soiling. The enclosure may be insulated. In some embodiments, the control unit 220 may also be positioned within the enclosure with the light detector 215. In some embodiments, the control unit 220 may be in a separate enclosure from the light detector 215. The enclosures may be similar in that they protect the devices from soiling and from damage due to wind, temperature changes, and/or other environmental elements.

In some embodiments of the present disclosure, the glass pane 110 may accumulate soiling analogously and/or in proportion to the photovoltaic cell and/or module of interest (e.g., one, some, or all of the photovoltaic cells and/or modules in a solar farm). The glass pane 110, may be cleaned when the light-receiving surfaces of the photovoltaic cell and/or module of interest is cleaned, so as to accumulate soiling at the same rate as the photovoltaic cell and/or module of interest.

In some embodiments, the light detector 215 may detect certain wavelengths of the transmitted light 140 that passes through the thickness of the glass pane 110. This may be done by emitting a light beam 135 from the light source 205 at only certain specific wavelengths, utilizing a light detector 215 which may only detect certain specific wavelengths of the light beam 135, and/or including a filter (not shown) between the light source 205 and the light detector 215 which may remove all wavelengths except the wavelength the light detector 215 is designed to detect.

In some embodiments, the measurement may be taken at night when external light sources (i.e., light emitted from sources other than the light source 205) are at a minimum. A measurement of the transmitted light 140 may be taken by the light detector 215 when the glass pane 110 is clean to determine a baseline transmission measurement of the transmitted light 140 passing through the glass pane 110. After a certain period of time, a measurement of transmitted light 140 may be taken by the light detector 215. This measurement of the glass pane 110 after it has accumulated soiling is compared to the baseline transmission measurement to determine the effect of soiling on the glass pane 110. The relationship of the signal reduction to the baseline transmission of the surface of the photovoltaic module allows for the determination of the soiling transmission spectrum on the glass pane 110, which is a measure of the soiling that has occurred on the photovoltaic cell and/or module of interest.

In some embodiments, a collimator 210 may be adjacent to the second surface of the glass pane 110. The collimator 210 may be present when the light detector 215 is a concentrated photovoltaic cell or similar cell. The collimator 210 may collimate the light beam 135 so that the transmitted light 140 is collimated when it reaches the light detector 215. In some embodiments, the light emitted by the light source 205 may be collimated and the collimator 210 may further collimate the transmitted light 140.

Figure 3:
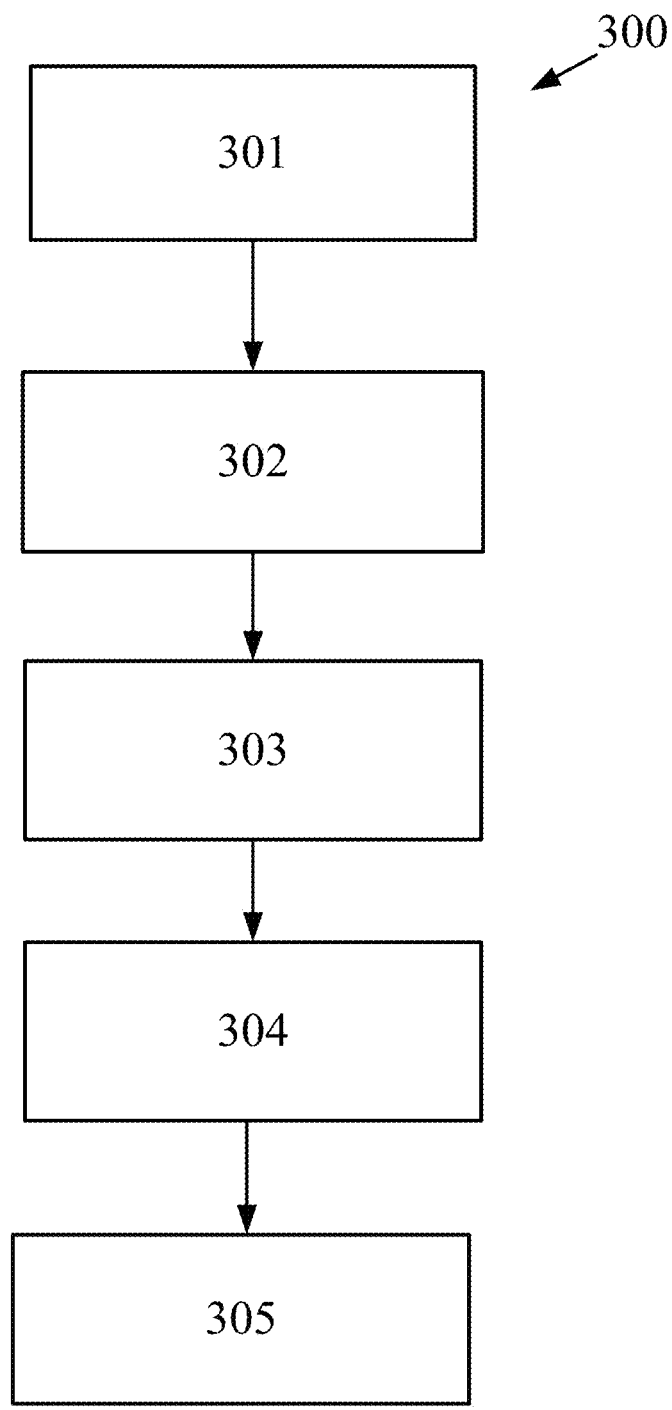
FIG. 3 illustrates a method of detecting soiling on a photovoltaic cell as described by some embodiments in the present disclosure.

FIG. 3 illustrates a method of detecting soiling on a photovoltaic cell using the detecting unit 200 shown in FIG. 1, as described by some embodiments in the present disclosure. This exemplary method 300 of detecting soiling includes five steps. The first step may include taking a zero measurement 301. Taking a zero measurement may involve utilizing the soiling detection unit 200 as shown in FIG. 2 and/or recording a light detector 215 reading while the light source 205 is turned off or inactivated. The recording may be done using the control unit 220. Taking of a zero measurement 301 may be done to determine the presence of external light sources (i.e., light source other than the light source 205). Taking a zero measurement 301 may be performed at night.

The second step may include turning on or activating the light source 205, 302 to emit a light beam 135 toward the glass coupon 110 and the light detector 215. The light source 205 may be turned on 302 for short time intervals multiple times during a study period. The time intervals may range from 30 seconds to 45 minutes. A study period may be an 8 to 12-hour period when measurements are going to be taken. The second step may be performed immediately after taking the zero measurement 301.

The third step may include taking the soiling measurement 303. In some embodiments, the taking the soiling measurement 303 may be done by recording the intensity of the light transmitted through the glass pane 110 detected by the light detector 215. The recording may be done using the control unit 220. The third step 303 may be performed while the light source 205 is turned on or activated during the second step. That is, the second step and third step may be performed concurrently.

The fourth step may include correcting the soiling measurement 304. Correcting the soiling measurement 304 may be done by subtracting the zero measurement (i.e., the reading from step 301) from the soiling measurement (i.e., the reading from step 303) to remove noise from the reading of the soiled coupon. This may reduce the impact of external light sources (i.e., noise) on the soiling analysis process.

The fifth step is calculating soiling metrics 305. Calculating a soiling metric 305 may involve determining the soiling ratio, which may be done by comparing the corrected soiling measurement from step 304 to a corrected baseline measurement. The corrected baseline measurement may be determined by performing steps 301, 302, 303, and 304 immediately after the system is installed and/or after each cleaning. The baseline measurement may be recorded by the control unit 220. The soiling ratio may be adjusted with inputs based on the type of photovoltaic cells being studied. Such adjustments may be aimed at the material the photovoltaic cells are made of (ex. CadTel, CIGS, etc.), the age of the photovoltaic cells, the geographic locations of the photovoltaic cells, the wiring of the photovoltaic cells, or other features that are specific to the type of photovoltaic cell and/or module being studied. Other soiling metrics, such as comparing the performance of a soiled photovoltaic cell to a baseline performance (wherein the photovoltaic cell is acting as both the glass pane and the light detector), may be determined.

In some embodiments, the photovoltaic cell and/or module of interest may be scheduled to be cleaned (and subsequently cleaned) based on the soiling metric determined. The glass pane should be cleaned at the same time as the photovoltaic cell and/or module of interest, so the glass pane and the photovoltaic cell and/or module of interest accumulate soiling at a substantially similar rate.

In some embodiments of the present disclosure, the taking a zero measurement 301 of the transmitted light 140 may be taken while the light source 205 is turned off to quantify the amount of light generated by external light sources; e.g. ambient light sources or external light sources. In some embodiments of the present disclosure, a final detecting of the transmitted light 140 may be taken after the light source 205 has been turned off to confirm the absence of light generated by external light sources (i.e., step 301 may be repeated after step 303). In some embodiments of the present disclosure, the method 300 may be conducted at night when external light sources are at a minimum. The light beam 135 may be emitted from the light source 205 during the taking of the soiling measurement 303 for a short period of time, and multiple measurements of the transmitted light 140 may be repeated multiple times to improve accuracy (i.e., steps 301, 302, and 303 may be repeated in multiple consecutive times during the practice of method 300). In some embodiments of the present disclosure, the recording of the reading by the light detector 215 during the taking of the zero measurement 301 and/or the taking of the soiling measurement 303 may take approximately 30 minutes.

In some embodiments, the light beam 135 may be on for a period of time prior to the recording of the readings. The period of time may range from 30 seconds to 45 minutes. This time allows the light beam 135 to stabilize so readings can be more accurate.

In some embodiments, the measurements may be taken during the night, or in conditions of minimal external light. The present disclosure may require the system to be re calibrated after each cleaning to take into account any potential degradation of the components.

In some embodiments, the method may also include a step for collimating the light. This may be done when the light detector is a concentrated photovoltaic cell. This may be done by using a laser diode as a light source to emit collimated light and/or to have a collimator adjacent to the second surface of the glass pane to collimate the transmitted light prior to it entering the light detector.

As used herein, the soiling ratio expresses the ratio of the electrical output of a soiled device to the electrical output of a clean device, which may be measured or a theoretical value. Thus, the soiling ratio has a value of 1 when the glass pane or photovoltaic cell and/or module of interest is completely clean, and the value of the soiling ratio decreases as the soiling increases and therefore the electrical output of the photovoltaic cell and/or module decreases (or the soiling of the glass pane increases).

Figure 4:
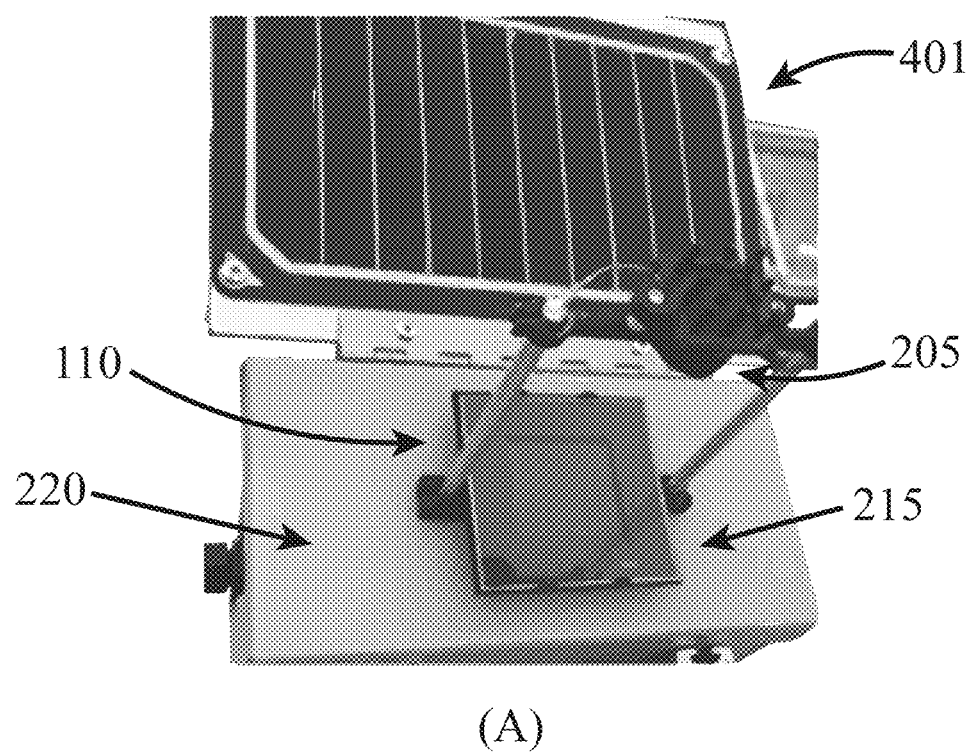
FIG. 4 illustrates an outdoor, mounted soiling detection unit for soiling spectral transmittance, as described by some embodiments in the present disclosure.
Figure 4:
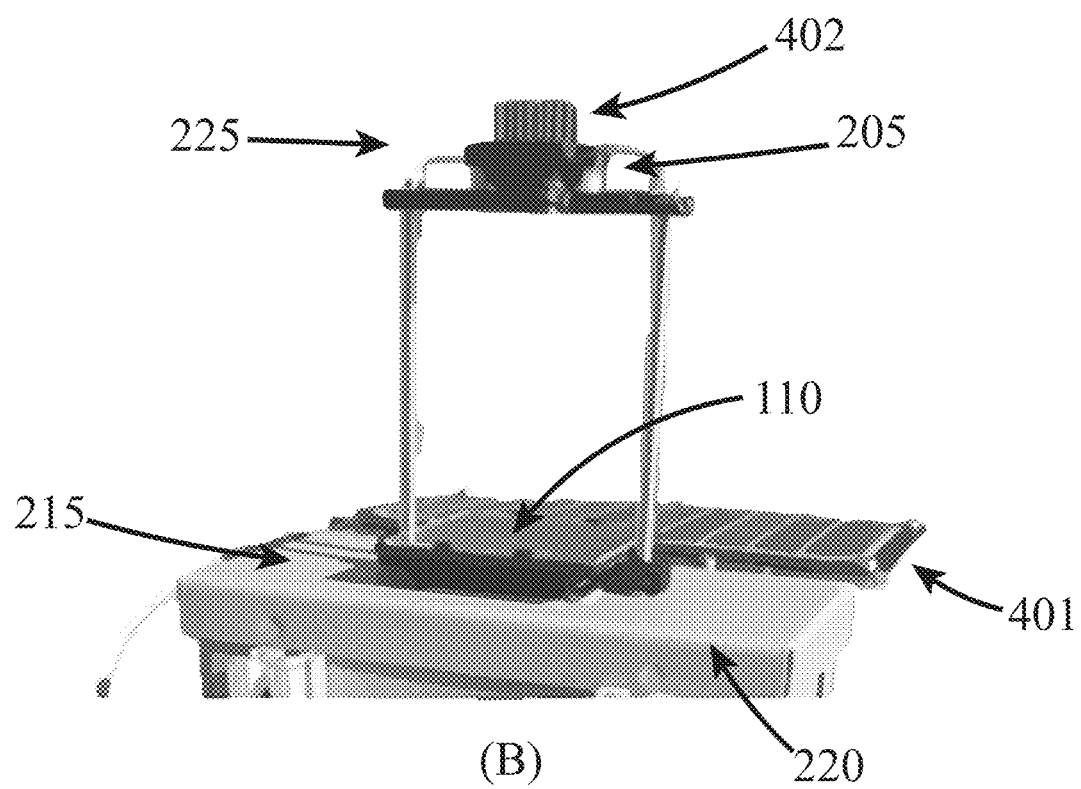

FIG. 4 illustrates an outdoor, mounted soiling detection unit for soiling spectral transmittance, as described by some embodiments in the present disclosure. Panel A of FIG. 4 shows a top view of an embodiment of the soiling detection unit 200 and Panel B of FIG. 4 shows a front view of an embodiment of the soiling detection unit 200. The prototype shown in FIG. 4 was installed in October 2018 at the National Renewable Energy Laboratory (NREL) campus in Golden, Colo. In this embodiment, the light source was a green LED and a photovoltaic cell acted as the light detector. A small, finned heat sink 402 was used to cool the light source 205 (which in this test was a LED) while operating. A photovoltaic cell and/or module 401 was used to charge the battery for the light source and the whole light detector. The photovoltaic cell and/or module 401 may also be the photovoltaic cell and/or module of interest or may act as a representative photovoltaic cell and/or module for a field of photovoltaic cells and/or modules. FIG. 4 shows the elements of the soiling detection unit 200 shown in FIG. 2 in their test setting. The light source 205 is configured to emit light onto the light detector 215, which is directly adjacent to the control unit 220. A first wiring 225 connects the light source 205 to the control unit 220.

Figure 5:
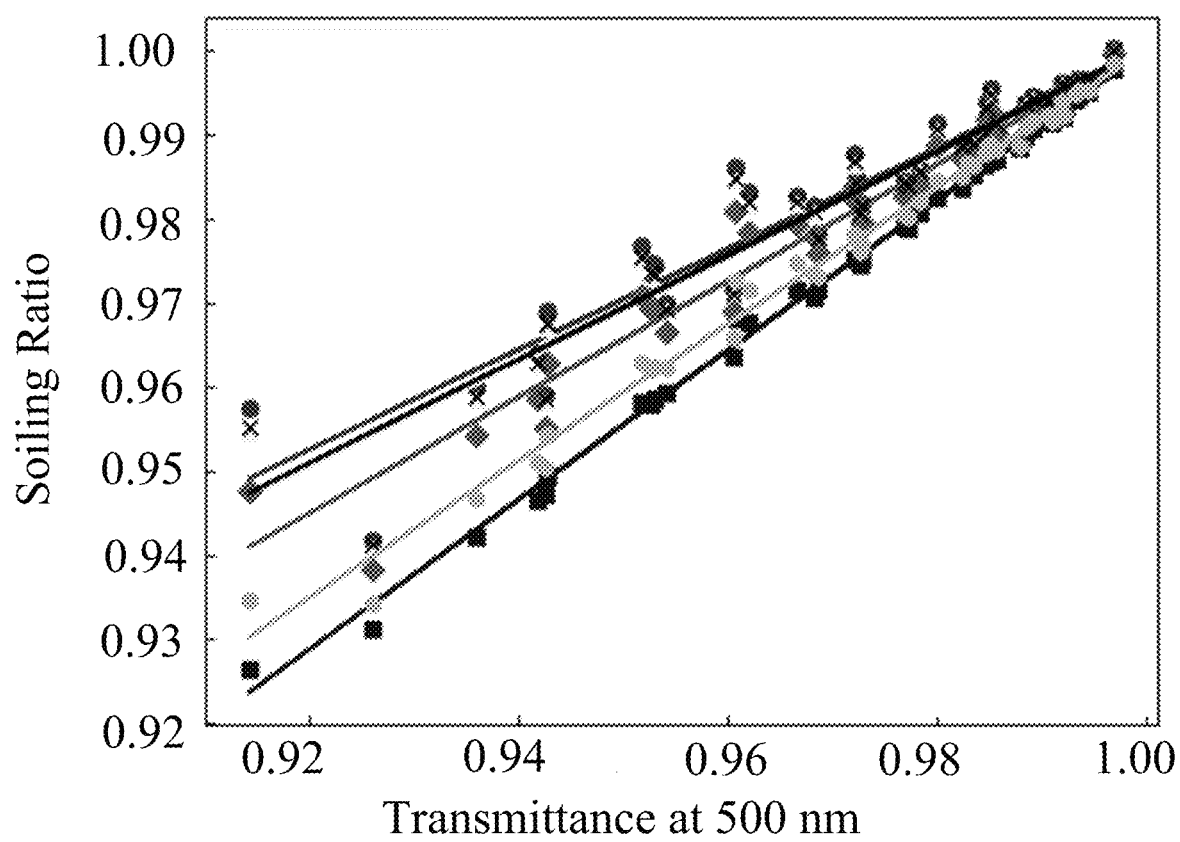
FIG. 5 illustrates the linear relationship between the measured transmittance at a wavelength of 500 nm and the soiling ratio of various photovoltaic cells according to some embodiments of the present disclosure.

FIG. 5 illustrates the linear relationship between transmittance at a wavelength of 500 nm (which corresponds to red light) and the soiling ratio according to some embodiments of the present disclosure. The graph demonstrates how the present disclosure may be used to measure soiling losses using a monochromatic light and how that measurement can be adjusted to estimate the soiling losses of different types of photovoltaic technologies. The types of photovoltaic modules tested in FIG. 5 include multi-crystalline silicon (m-Si, which is shown with circles with the top solid line of linear best fit), copper indium gallium selendite (CIGS, shown with X's with the second from the top line of linear best fit), poly-crystalline silicon (p-Si, shown as triangles with a very light gray line of linear best fit), cadmium telluride (CdTe, shown as diamonds with the third from the bottom line of linear best fit), perovskite (shown with hexagons and the second from the bottom line of linear best fit) and amorphous silicon (a-Si, shown with squares the bottom line of linear best fit). The linear regression of the data shown in FIG. 5 is shown in Table 1.

TABLE 1

R² of linear lines of best fit for FIG 5.

| Type of Photovoltaic Cell | R² Value |
|---|---|
| m-Si | 90.3% |
| p-Si | 92.3% |
| a-Si | 99.7% |
| CdTe | 95.4% |
| CIGS | 92.0% |
| perovskite | 98.9% |

The data shown in FIG. 5 was taken over the course of one year with a glass coupon being kept outdoors and tested in a wide variety of soiling conditions. The transmission over the full spectrum of light was measured every week for one year and used to calculate the soiling ratio by estimating the electrical output of different photovoltaic modules by considering the spectral response of each photovoltaic module type and the measured solar spectrum. From the full transmittance spectrum, the transmittance at 500 nm (green light) is extracted and plotted over the x-axis. Each data point corresponds to a weekly transmission measurement.

Figure 6:
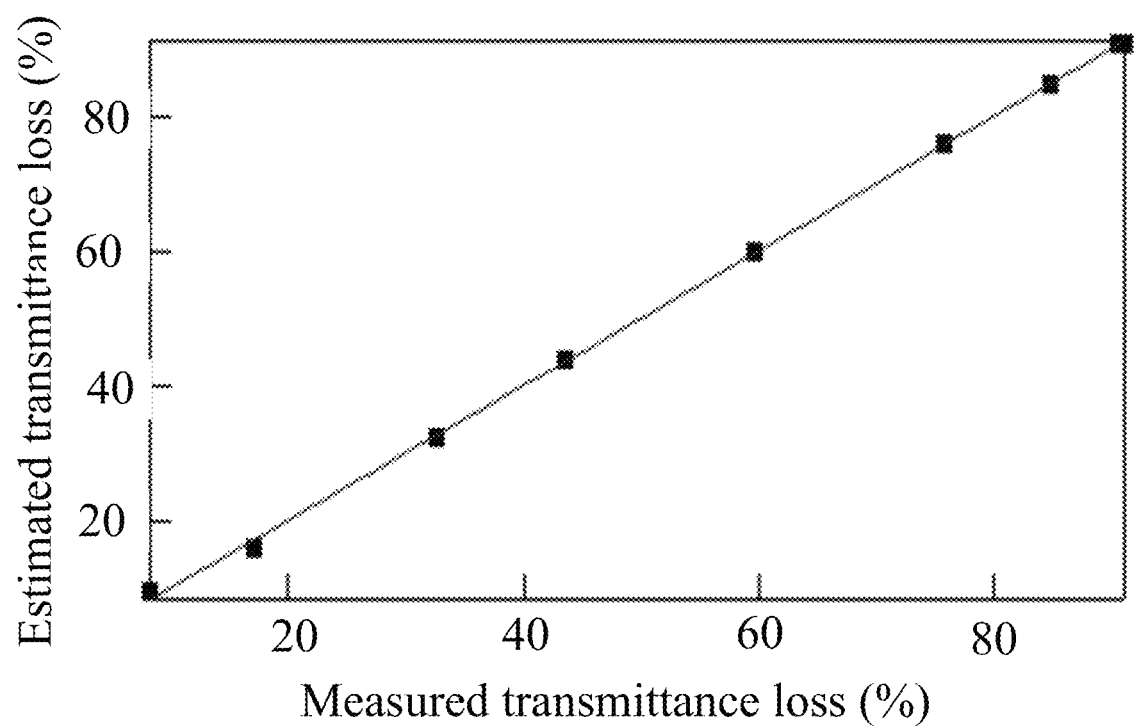
FIG. 6 illustrates a correlation between the transmission losses measured on photovoltaic modules and estimated transmission losses according to some embodiments of the present disclosure.

FIG. 6 illustrates a correlation between the transmission losses measured on photovoltaic modules compared to losses estimated according to some embodiments of the present disclosure. FIG. 6 shows the measured vs estimated transmittance loses taken with one embodiment of the present disclosure. A glass coupon was covered using different reference screening masks, whose transmittance have been measured using a spectrophotometer. The mask-covered glass was then placed between a red collimated light emitting source and a light detector to simulate the effect of soiling. Although red light was used in this example, any color light could be used. The transmittance through the glass coupon and each mask was measured by the light detector. The line shown in FIG. 6 represents the best linear fit for the dataset and achieved a R² value of 99.9% over transmission losses ranging from 8% to 92%. FIG. 6 demonstrates that the present disclosure can measure the transmittance of a glass pane with very high accuracy. Once it is demonstrated that the transmittance measurement is reliable (as shown in FIG. 6), the transmittance measurement may be translated into soiling losses using the equations for the lines of best fit in FIG. 5.

Jaen, Spain Testing and Validation

One metric to quantify the impact of soiling is the soiling ratio ($r_s$), which expresses the ratio between the electrical output of a soiled photovoltaic device and the output that the same device would generate in clean conditions. Previously, two similar photovoltaic modules were required to estimate this metric; if exposed under the same conditions, with one photovoltaic device kept clean ("control device") and one photovoltaic device left to naturally soil ("soiled device"). The short-circuit current may be used as a measure of soiling if the soiling is uniform, whereas the maximum power point may be a better estimate of soiling in case of non-uniform soiling. In this present disclosure, the non-uniform effects of soiling are not considered, and therefore, the instantaneous soiling ratio, $r_s(t)$ at any time t may be calculated as follows:

$$r_s(t) = \frac{Isc_{soil}(t)}{Isc_{ref}(t)} \quad \text{(Equation 1)}$$

In Equation 1, $Isc_{soil}$ and $Isc_{ref}$ are the short-circuit currents of a soiled photovoltaic device and of a control photovoltaic device. Bearing this in mind, the soiling ratio for a specific period of time (T), $r_s(t)$, may be obtained as the average of the measured instantaneous soiling ratios by means of the following expression, where N is the number of measurements taken over the period of time T.

$$\bar{r}_s(T) = \frac{1}{N}\sum_{i=1}^{N} r_s(t) \quad \text{(Equation 2)}$$

The time-dependent short-circuit currents of Equation 1, $Isc_{soil}$ and $Isc_{ref}$, could be obtained either experimentally from two monitored photovoltaic devices (one control device and one soiled device), or estimated by solving the following expressions:

$$Isc_{ref}(t) = A_{PV}\int_{\lambda_1}^{\lambda_2} E_G(\lambda,t) SR(\lambda) d\lambda \quad \text{(Equation 3)}$$

$$Isc_{soil}(t) = A_{PV}\int_{\lambda_1}^{\lambda_2} E_G(\lambda,t) \tau_{soiling}(\lambda,t) SR(\lambda) d\lambda \quad \text{(Equation 4)}$$

In Equations 2 and 3, $\lambda_1$ and $\lambda_2$ are the lower and upper limits of the absorption band of each photovoltaic device's absorber material (i.e., m-Si, CdTe, CIGS, etc.), $A_{PV}$ is its active area, $SR(\lambda)$ is the spectral response, $\tau_{soiling}(\lambda,t)$ is the spectral transmittance of soiling accumulated on the surface of the soiled device, and $E_G(\lambda,t)$ is the actual spectral distribution of the irradiance on the plane of the PV panels. In the present disclosure, the soiling spectral transmittance is obtained from the measurement as follows:

$$\tau_{soiling}(\lambda) = \frac{\tau_{soil}(\lambda)}{\tau_{ref}(\lambda)} \quad \text{(Equation 5)}$$

In Equation 5, $\tau_{soil}(\lambda)$ and $\tau_{ref}(\lambda)$ are, respectively, the measured spectral transmittance of a soiled glass coupon and the measured spectral transmittance of the same coupon in clean conditions (or of an equivalent clean coupon). The glass coupon may be a pane of glass. At the same time, the average spectral transmittance (AST) of soiling across a specific spectral waveband may be calculated with the following relationship:

$$AST_i(t) = \frac{1}{\lambda_{2i} - \lambda_{1i}} \int_{\lambda_{1i}}^{\lambda_{2i}} \tau_{soiling}(\lambda, t) d\lambda \quad \text{(Equation 6)}$$

In Equation 6, $\lambda_{1i}$ and $\lambda_{2i}$ are the shortest and the longest wavelengths in the selected waveband i, respectively. The various wavebands considered describe either a specific spectral region or an individual PV material absorption band and are shown in Table 2 below. These wavebands are intended for exemplary purposes only, other wavebands not listed may be used. It may be noted that the lower and upper limits of the spectral region bands are defined by considering the absorption bands of the PV materials: the lowest and longest wavelengths selected are, respectively, 300 nm for the UV and 1300 nm for the NIR regions.

TABLE 2

Wavebands considered in the present disclosure.

| | Waveband | $\lambda_1$ [nm] | $\lambda_2$ [nm] |
|---|---|---|---|
| Spectral Regions | Ultraviolet (UV) | 300 | 400 |
| | Visible (VIS) | 400 | 700 |
| | Near Infrared (NW) | 700 | 1300 |

TABLE 2-continued

Wavebands considered in the present disclosure.

| | Waveband | $\lambda_1$ [nm] | $\lambda_2$ [nm] |
|---|---|---|---|
| PV material absorption bands | Monocrystalline silicon (m-Si) | 340 | 1190 |
| | Polycrystalline silicon (p-Si) | 310 | 1180 |
| | Amorphous silicon (a-Si) | 300 | 790 |
| | Cadmium Telluride (CdTe) | 310 | 880 |
| | Copper indium gallium diselenide (CIGS) | 370 | 1240 |
| | Perovskite | 300 | 820 |

A one-year experiment, from January 2017 to January 2018, was conducted on the roof of the A3-building at the University of Jaén, in Jaén, Spain (latitude 37° 49'N, longitude 3° 48'W, elev. 457 m). Jaén is a medium size town located in southern Spain with a high annual energy resource, more than 1800 kWh/m², and extreme temperatures ranging from less than 5° C. in winter to more than 40° C. in summer. It presents low-medium values of precipitable water, turbidity and airborne particulate matter, even if this may periodically reach unusually high values due to specific and stochastic events such as Saharan dust storms or the burning of branches from olive tree groves in the region.

Figure 7:
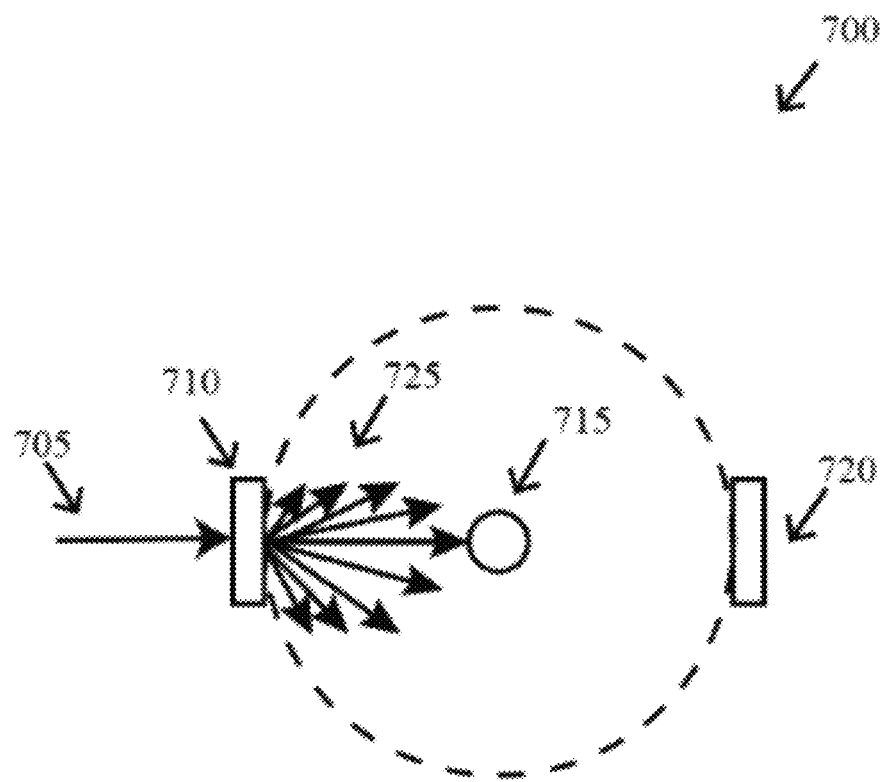
FIG. 7 illustrates the arrangement of the integrating sphere inside a spectrophotometer.

One 4 cm×4 cm sized and 3 mm thick Diamant® low-iron glass coupon from Saint-Gobain Glass was horizontally placed in outdoor conditions with the aim of capturing natural dust. This will be referred to herein as the "soiled coupon." This soiled coupon was not regularly cleaned, and its hemispherical transmittance was measured weekly within a wavelength range between 300 and 1300 nm, using a Lambda 950 spectrophotometer with a 60 mm wide integrating sphere. FIG. 7 illustrates the arrangement of the integrating sphere 700 inside a spectrophotometer. In the integrating sphere 700, the incident beam 735 may be generated by a light source. Another glass coupon was stored in a dust-free box to prevent its optical transmittance characteristics from being adversely affected from accidental soiling and used as baseline for each measurement; its transmittance also allowed to check the quality and the repeatability of the weekly measurements. This sample is referred to herein as the "control coupon."

The global spectral irradiance between the 350 and 1050 nm wavelength band was also measured at 5-minute intervals using a weatherproof spectroradiometer, EKO® MS700, south-oriented and tilted 30° above the horizontal. This angle was selected to mirror the orientation of the PV modules to maximize the collected irradiation over the year, however other orientations could be used. This instrument provides a spectral resolution of 10 nm and a temperature dependency within ±1% for temperatures ranging from −20° C. to +50° C. The expanded uncertainties of the instrument are, respectively, ±10.90%, ±4.20%, and ±4.10% for the 350-450 nm, 450-900 nm and 900-1050 nm wavebands, according to the certificate of calibration provided by the manufacturer.

Figure 8:
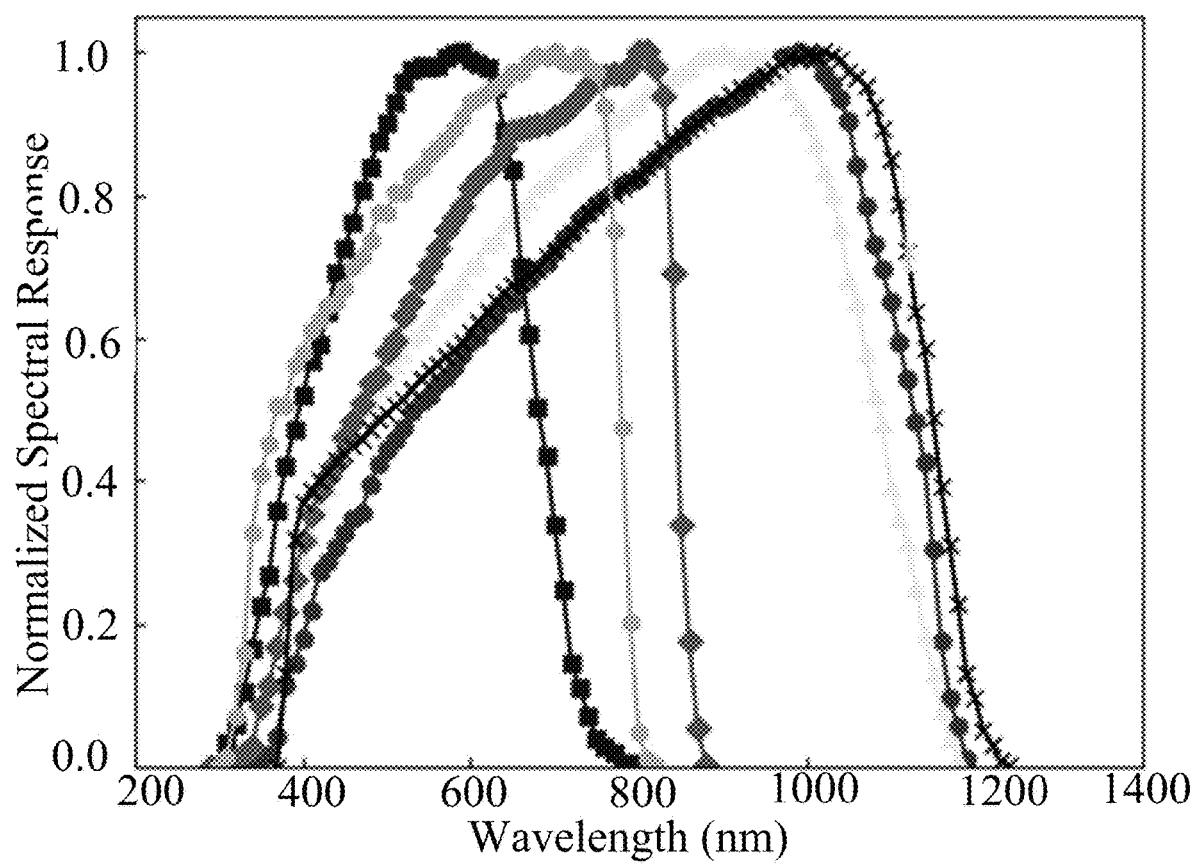
FIG. 8 illustrates the normalized spectral response of six photovoltaic materials at different wavelengths, according to some embodiments of the present disclosure.

FIG. 8 illustrates normalized spectral response of the six photovoltaic materials at different wavelengths, according to some embodiments of the present disclosure. The six photovoltaic materials are: mono-crystalline silicon (m-Si, shown as circles), poly-crystalline silicon (p-Si, shown as triangles), amorphous silicon (a-Si, shown as squares), cadmium telluride (CdTe, shown as diamonds), copper indium gallium diselenide (CIGS, shown as X's), and perovskite (shown as hexagons). The absorption bands of some photovoltaic devices may go beyond the measurement range of the spectroradiometer. This limitation may be overcome by estimating the missing wavebands by scaling the AM1.5G reference spectrum according to the ratio between the integrated actual and referenced spectral irradiance in the range of 700-1050 nm. This methodology may be used to elucidate the impact of the spectral mismatch factor (MM) on the average photon energy (APE). In addition, the measurements recorded at irradiance levels below 300 W/m² were not considered to avoid the non-linear performance of photovoltaic cells as such low irradiance values. Nevertheless, these low irradiance levels do not play a relevant role in the annual electrical output of photovoltaic systems at locations with high energy solar resource as is the case in this study. In addition, the measurements with an incident angle equal to or greater than 60° have also been removed to reduce the impact of the increased glass reflection. This approach also automatically excludes conditions in which the impact of soiling has been found to be strongly related to the angle of incidence.

Photovoltaic materials having different spectral abortion bands and different spectral responses, as shown in FIG. 8 for the six technologies, were investigated in this study and demonstrated that the transmittance of soiling has a non-uniform spectral distribution, with higher losses at shorter wavelengths. This means that soiling may have different effects on the various photovoltaic materials, as results of the combination of their spectral response with the time-dependent irradiance and soiling transmittance spectra. Initially, the following procedure was established and employed to conduct the analysis presented herein:

Measuring the spectral transmittance of soiling ($\tau_{soiling}(\lambda)$) collected on the Soiled Coupon once per week by using Equation 5.

Calculating the soiling ratios by using Equations 1, 2, 3 and 4. The spectral response of each photovoltaic device, the $\tau_{soiling}(\lambda)$ obtained in step 1 and the irradiance spectra recorded during the same day are used as inputs to these equations.

Estimating the average transmittance of soiling (AST($\lambda$)) for different regions of the spectrum and various photovoltaic devices using Equation 6 and $\tau_{soiling}(\lambda)$.

Comparing the soiling ratios obtained in step 2 for the different wavebands investigated in steps 3 and 4 by using different statistical metrics.

As described herein, two different analysis were carried out. First, the soiling ratio is compared to the average soiling transmittance of soiling for three different spectral regions and for a region specific to the spectral response band of each material. Second, the estimation was conducted using a single wavelength, with the aim of facilitating the quantification of the spectral impact of soiling as accurately as possible with a simple measurement. Each analysis was conducted by using different statistical indexes: the coefficient of determination ($R^2$), the mean absolute percentage error (MAPE) and the mean percentage error (MPE). These magnitudes were calculated using the following expressions:

$$R^2 = \left( \frac{\sum_{i=1}^{n}(r_s - \bar{r}_s)(Z - \bar{Z})}{\sqrt{\sum_{i=1}^{n}(r_s - \bar{r}_s)^2 \sum_{i=1}^{n}(Z - \bar{Z})^2}} \right)^2 \quad \text{(Equation 7)}$$

-continued $$MAPE(\%) = \frac{100}{n}\sum_{i=1}^{n}\left|\frac{Z-r_s}{r_s}\right| \quad \text{(Equation 8)}$$

$$MPE(\%) = \frac{100}{n}\sum_{i=1}^{n}\frac{Z-r_s}{r_s} \quad \text{(Equation 9)}$$

In Equations 7-9, n is the number of soiling ratio data points and Z represents the soiling value predicted through the average spectral transmittance or a single wavelength transmittance. The coefficient of determination measures the quality of the fit between the soiling ratios and the Z values: it has a value of 1 if the Z points predict the soiling ratios with a linear equation with no error and it has a value of 0 if no linear correlation exists between the soiling ratios and the Z point. The MAPE measures the average value of the absolute errors between the soiling ratios and their calculated values (Z points): it has a value of 0 if the soiling ratios and the Z values are the same and increases depending on the number and the magnitudes of the errors in the prediction. The MPE is metric calculated similarly to MAPE but considers the actual values of the errors, instead of their absolute values, and gives information on any systematic bias in the prediction: it is positive if the predicted values tend to overestimate soiling and negative otherwise.

Figure 9:
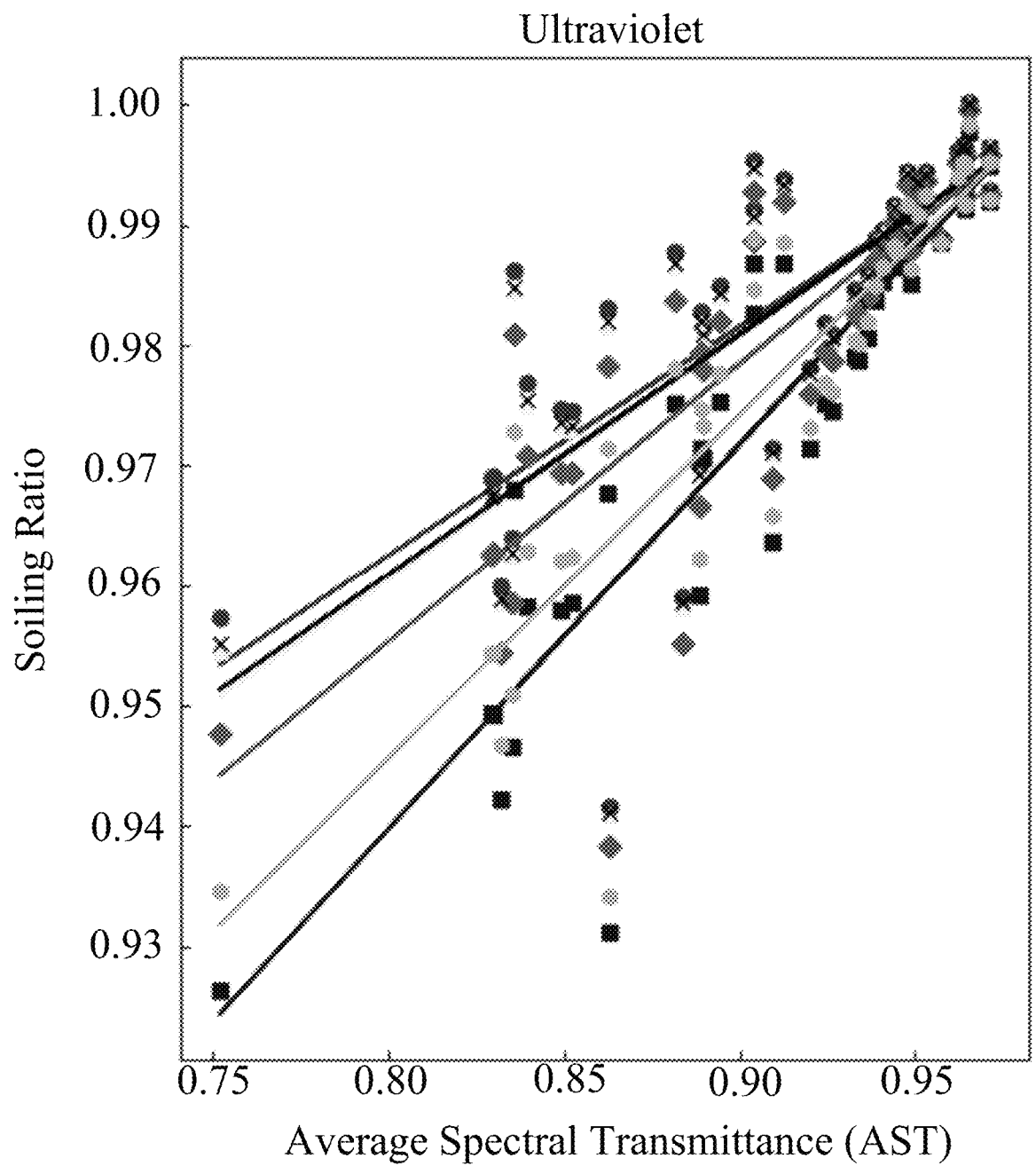
FIG. 9 illustrates the relationship between soiling ratios and average spectral transmittance in the ultraviolet spectral region for six photovoltaic materials, according to some embodiments of the present disclosure.
Figure 10:
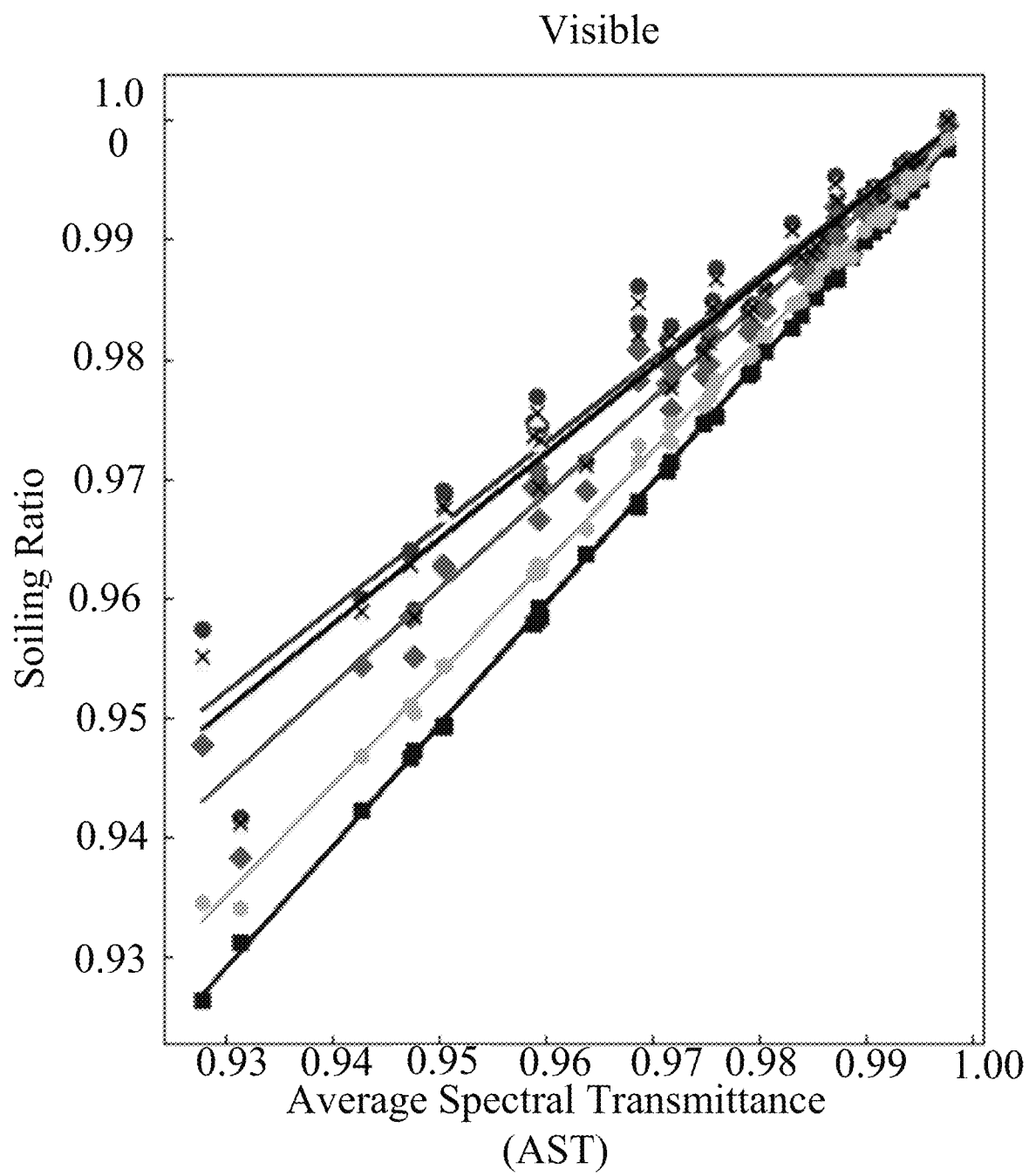
FIG. 10 illustrates the relationship between soiling ratios and average spectral transmittance in the visible spectral region for six photovoltaic materials, according to some embodiments of the present disclosure.
Figure 11:
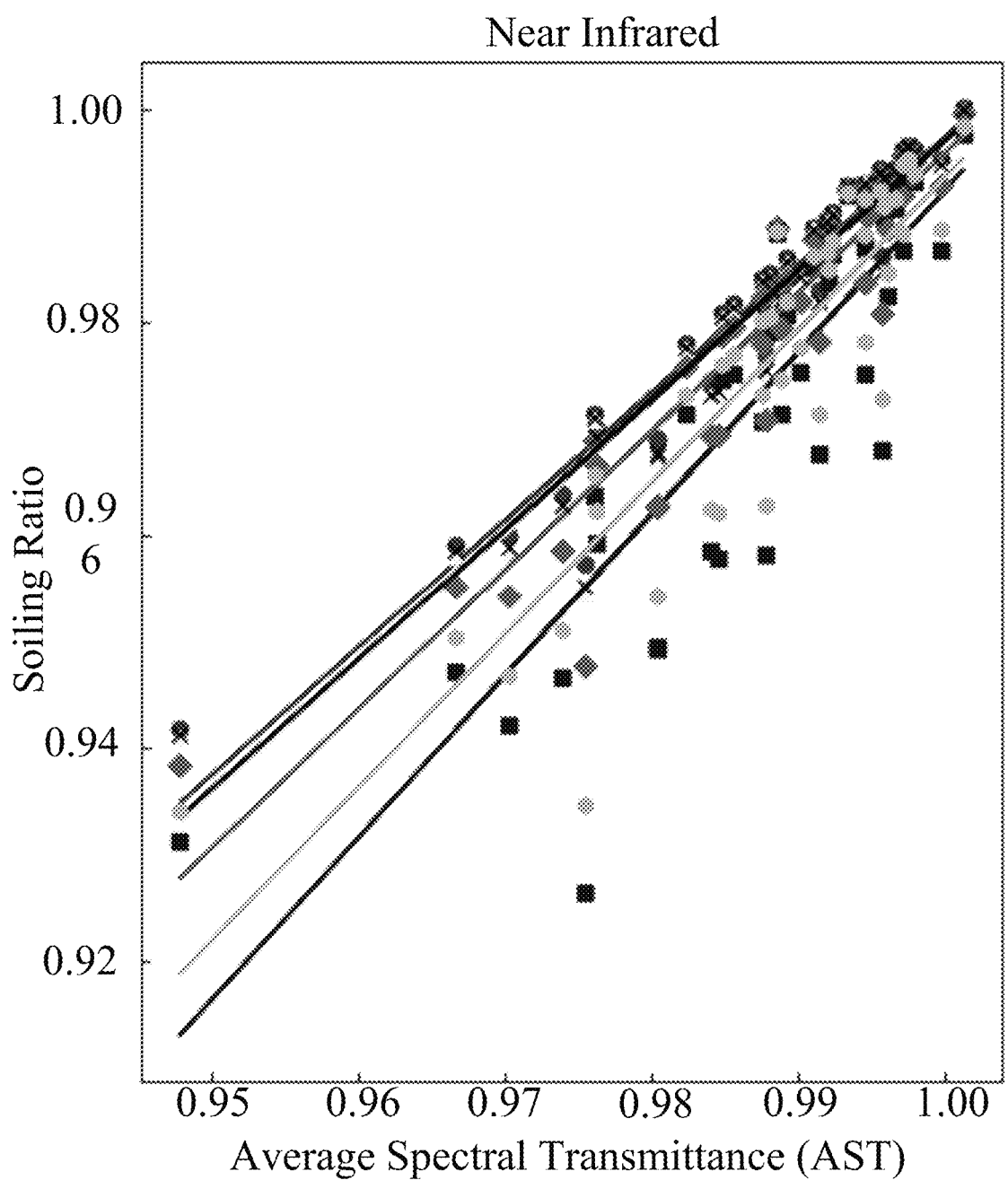
FIG. 11 illustrates the relationship between soiling ratios and average spectral transmittance in the near infrared spectral region for six photovoltaic materials, according to some embodiments of the present disclosure.

This present disclosure aims to investigate the correlations between the average spectral transmittance across different spectral bands and the soiling ratio. In FIG. 9-11, the soiling ratio, calculated weekly using Equation 2, is plotted against the average spectral transmittance of the ultraviolet, visible and near infrared regions, from Equation 6. The best linear fits and the coefficients of determination obtained for each PV technology in each region are also reported in the legends for each respective figure. FIG. 11 shows the density of current of the six PV materials exposed to a reference AM1.5 global irradiance. The MAPE (mean average percentage error) and MPE (mean percentage error) values for each PV material/type evaluated are reported in Table 3. In FIG. 9-11, the results are shown for the following types of photovoltaic cells: mono-crystalline silicon (m-Si, shown as circles), poly-crystalline silicon (p-Si, shown as triangles), amorphous silicon (a-Si, shown as squares), cadmium telluride (CdTe, shown as diamonds), copper indium gallium diselenide (CIGS, shown as X's), and perovskite (shown as hexagons).

spectral transmittance in the visible spectral region, and FIG. 11 shows soiling ratios versus average spectral transmittance in the infrared spectral region. As shown in FIG. 9-11 and in Table 2, the best fit varies with both the spectral region and the type of photovoltaic material tested.

Figure 12:
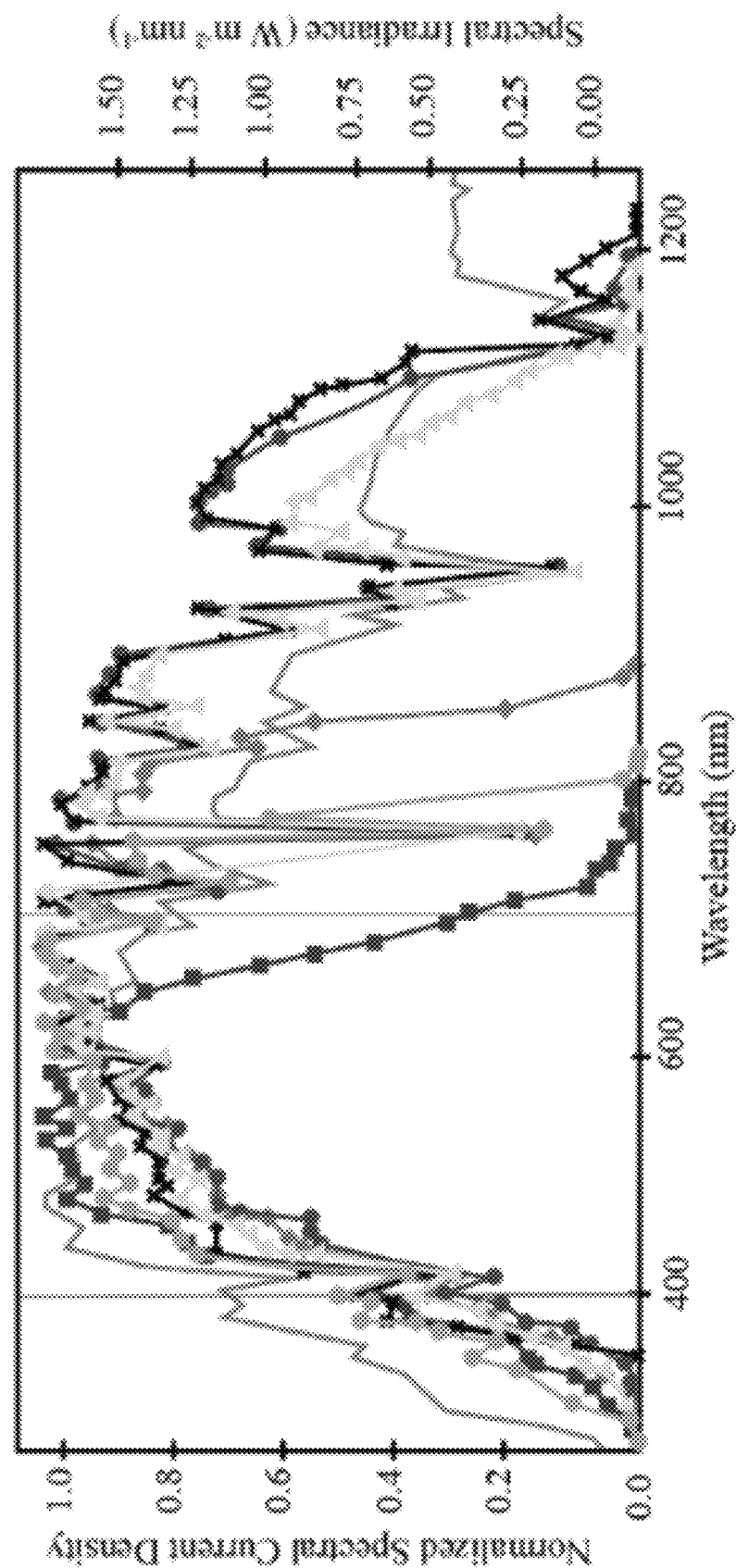
FIG. 12 illustrates the current density of six photovoltaic materials under a standard AM1.5 global irradiance and the spectral response of each material, according to some embodiments of the present disclosure.

FIG. 12 illustrates current density of the six photovoltaic materials under a standard AM1.5 global irradiance and the spectral response of each material, according to some embodiments of the present disclosure. The irradiance spectrum (solid line without data points) is plotted on the right y-axis. The data cover three spectral regions: ultraviolet (UV, wavelengths less than 400 nm), visible (VIS, wavelengths between 400 and 700 nm)), and near infrared (NIR, wavelengths between 700 and 1300 nm). Six types of solar cells were tested: mono-crystalline silicon (m-Si, shown as circles), poly-crystalline silicon (p-Si, shown as triangles), amorphous silicon (a-Si, shown as squares), cadmium telluride (CdTe, shown as diamonds), copper indium gallium diselenide (CIGS, shown as X's), and perovskite (shown as hexagons).

Using the ultraviolet portion of the light lowered the quality of the correlations (best fit) for all the technologies, with MAPE values of 7% or higher. The MPE were all found to be negative, meaning that AST returns lower values than the actual soiling ratios. This is not surprising because the ultraviolet region minimally contributes to the current generation in PV modules as it represents a small portion of the solar irradiance spectrum (FIG. 12). Moreover, the photovoltaic materials tested herein had low spectral responses in this region (FIG. 12) while soiling caused dramatic transmittance drops. The photovoltaic material a-Si had the highest absorption in the UV region (FIG. 12).

Overall, the maximum coefficient of determination achieved by a-Si, perovskite and CdTe technologies were for visible AST, as most of their absorption takes place in this region (FIG. 12). All the technologies demonstrated low MAPE (<1%) with a-Si reaching values lower than 0.1%. Thus, using the methods and systems described herein, soiling losses of a-Si technologies may be predicted with extreme accuracy by measuring the visible AST.

The low-energy band gap materials (m-Si, p-Si, CIGS) are technologies that have coefficients of determination above 90% in both the visible and the near infrared regions. This is due to the fact the solar irradiance is high and their spectral response is significant both in the visible wave-

TABLE 3

The coefficient of determination ($R^2$), mean absolute percentage error (MAPE) and mean percentage error (MPE) between soiling ratio and transmittance in three spectral regions for the six photovoltaic materials considered, according to some embodiments of the present disclosure.

| | Ultraviolet (300-400 nm) | | | Visible (400-700 nm) | | | Near Infrared (700-1300 nm) | | |
|---|---|---|---|---|---|---|---|---|---|
| Material | $R^2$ (%) | MAPE (%) | MPE (%) | $R^2$ (%) | MAPE (%) | MPE (%) | $R^2$ (%) | MAPE (%) | MPE (%) |
| m-Si | 57.8 | 7.76 | −7.76 | 93.7 | 0.88 | −0.88 | 93.4 | 0.52 | 0.52 |
| p-Si | 61.3 | 7.69 | −7.69 | 95.4 | 0.8 | −0.8 | 91.5 | 0.6 | 0.6 |
| a-Si | 81.4 | 6.94 | −6.94 | 100 | 0.04 | 0.03 | 74.9 | 1.45 | 1.45 |
| CdTe | 67.4 | 7.5 | −7.5 | 97.7 | 0.59 | −0.59 | 87.5 | 0.81 | 0.81 |
| CIGS | 60.7 | 7.71 | −7.71 | 95.1 | 0.82 | −0.82 | 91.9 | 0.58 | 0.58 |
| Perovskite | 77.6 | 7.15 | −7.15 | 99.8 | 0.2 | −0.2 | 79.0 | 1.21 | 1.21 |

FIG. 9 shows soiling ratios versus average spectral transmittance in the ultraviolet spectral region for six photovoltaic materials, FIG. 10 shows soiling ratios versus average lengths of light and at higher wavelengths (FIG. 12). Their MAPE was lower in the NIR than in the visible. On the other hand, the coefficient of determination decreased and the MAPE increased for a-Si in the near infrared because of the extremely limited spectral response in this region.

Figure 13:
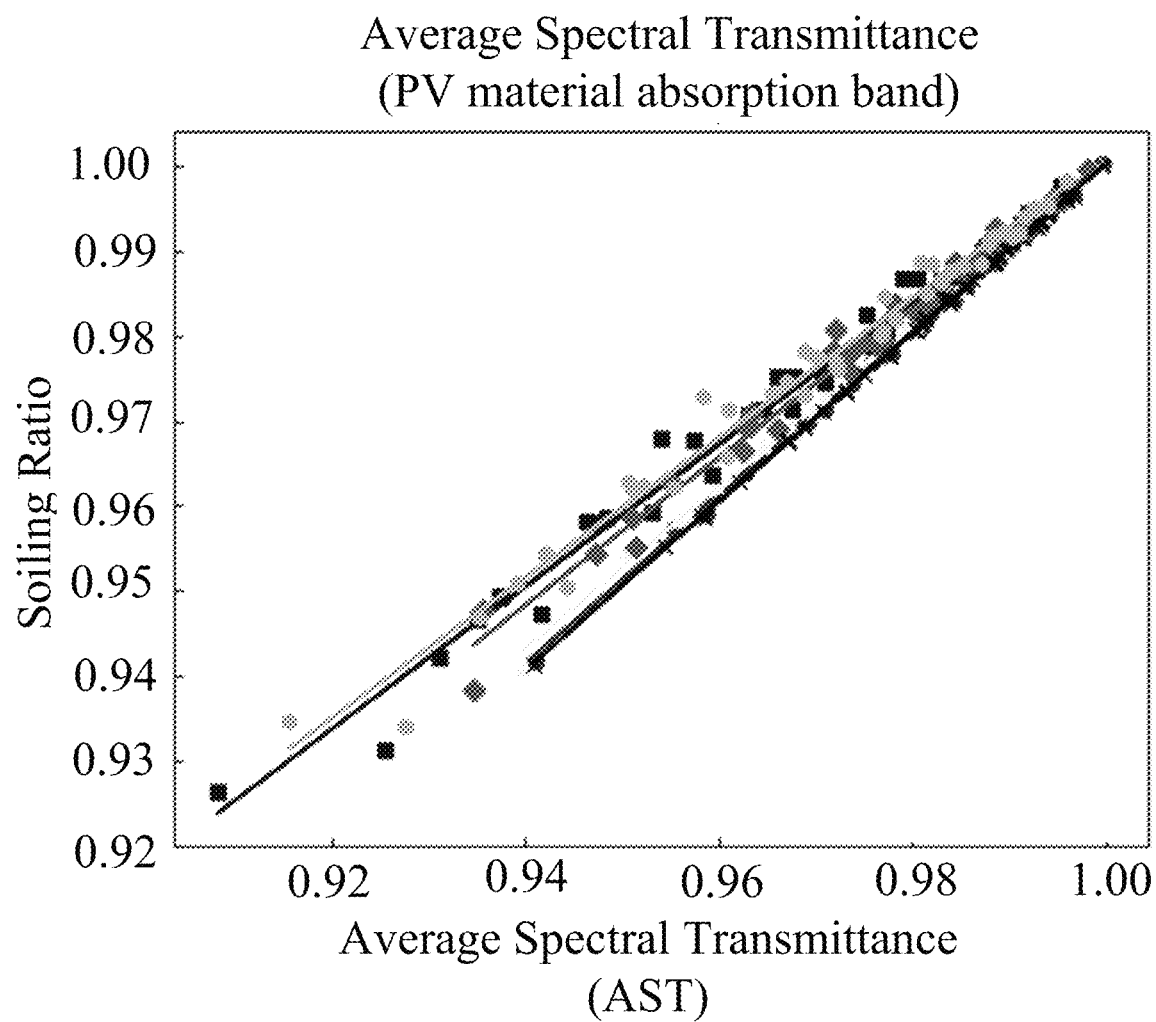
FIG. 13 illustrates soiling ratios versus average spectral transmittance (AST) of soiling over six photovoltaic material absorption bands, according to some embodiments of the present disclosure.

FIG. 13 illustrates soiling ratios versus average spectral transmittance (AST) of soiling over the six photovoltaic material absorption bands, according to some embodiments of the present disclosure. Six types of solar cells are shown: mono-crystalline silicon (m-Si, shown as circles), poly-crystalline silicon (p-Si, shown as triangles), amorphous silicon (a-Si, shown as squares), cadmium telluride (CdTe, shown as diamonds), copper indium gallium diselenide (CIGS, shown as X's), and perovskite (shown as hexagons). The visible portion of the spectrum returns the best results if materials from various energy band gaps are investigated, even if it introduces a significant negative offset (MAPE≥0.8%) for low energy gap materials. The results of some technologies may be enhanced by using the specific material absorption band instead of a spectral region for the calculation of AST (FIG. 13). Indeed, coefficients of determination of at least 98% for all the materials and negative MPE up to 0.65% (with the worst values for a-Si and perovskite) resulted from using the PV absorption bands in the calculation of AST. The negative bias is due to the fact the spectral response of each materials slowly grows with the wavelength until it peaks, and subsequently dramatically drops after it (see FIG. 7). MPE gives the same weight to all the wavelength in the spectral range, and for this reason, it is affected by the large pre-peak region of numerous short wavelengths with limited spectral response. In addition, it may be considered that the irradiance in the blue region of the spectrum has the lowest intensity (FIG. 12).

Disclosed herein are methods using the average transmittance of a waveband to estimate the soiling losses occurring over the whole irradiance spectrum for a variety of photovoltaic technologies. The present disclosure utilizes the transmittance of a single wavelength as a way to estimate soiling losses. Proving that the transmittance of a single wavelength can be used to quantify soiling losses enables the use monochromatic lights as light sources, such as lasers and LED. Non-monochromatic light sources emit light with various spectra: light is emitted at different intensities depending on the wavelength. Because of the light detector's spectral response, the soiling spectral measurement might vary because of both variations' spectral intensity of the light as well as in the emission spectra of the light source. Using a monochromatic light instead excludes the impact of variation in the light source's spectra on the estimation of soiling, enabling to correlate variation in the measurements directly to variations in light intensity due to transmittance losses.

Figure 14:
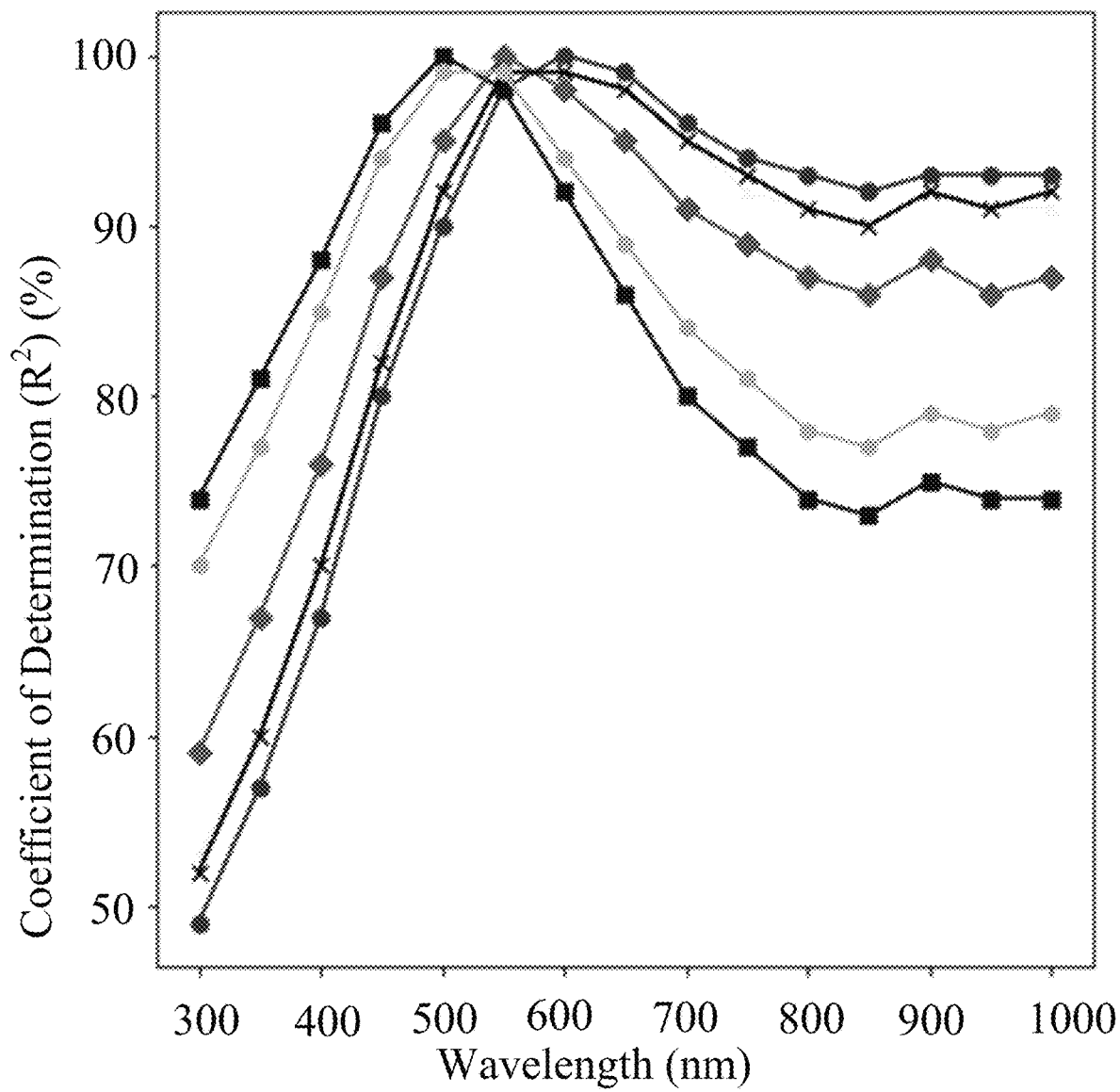
FIG. 14 illustrates coefficients of determination ($R^2$) obtained when soiling losses for various photovoltaic technologies were estimated using a single transmittance wavelength, according to some embodiments of the present disclosure.
Figure 15:
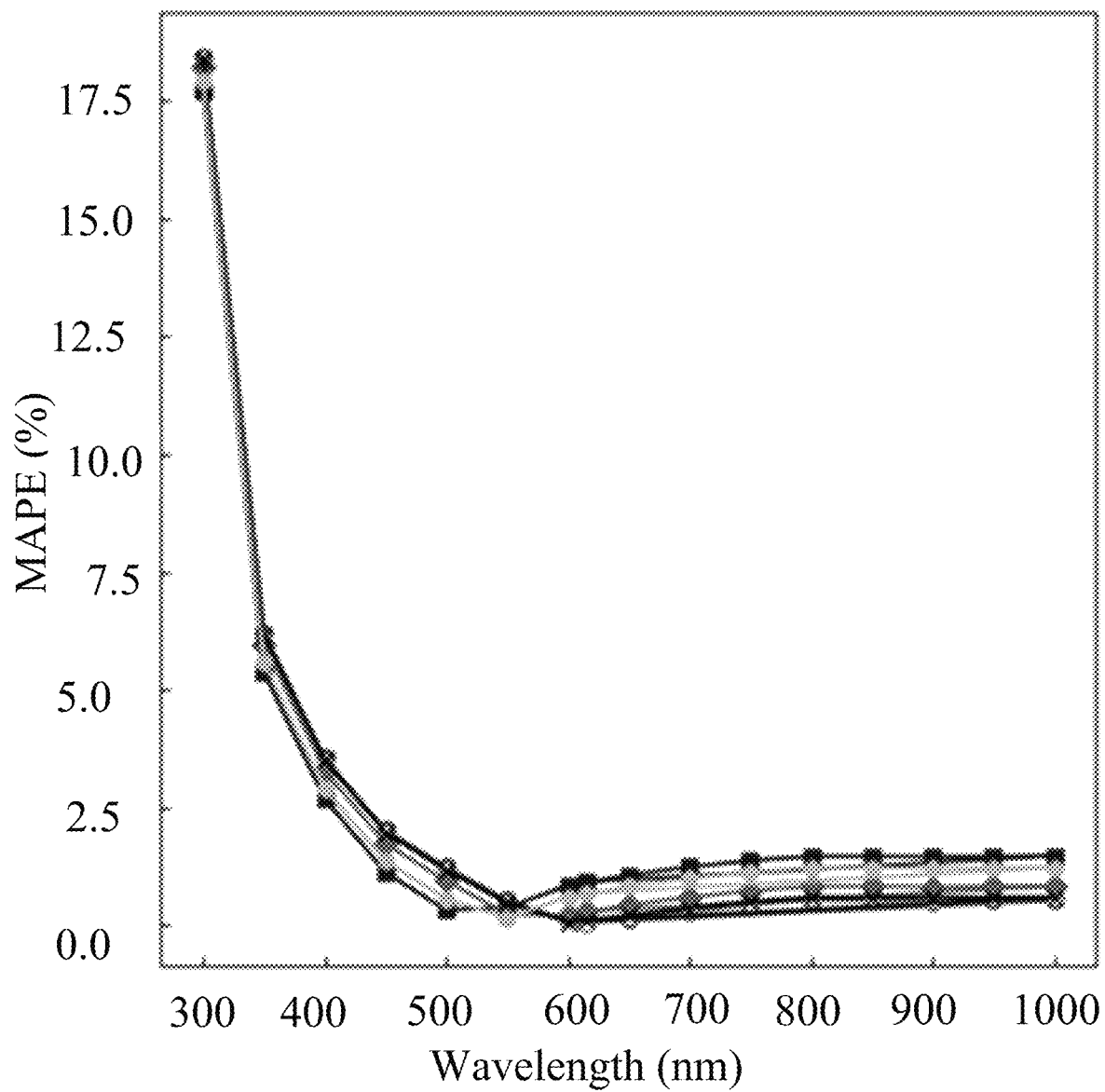
FIG. 15 illustrates mean absolute percentage error (MAPE) obtained when soiling losses for various photovoltaic technologies were estimated using a single transmittance wavelength, according to some embodiments of the present disclosure.

FIG. 14 illustrates coefficients of determination ($R^2$) obtained when soiling losses for various photovoltaic technologies were estimated using a single transmittance wavelength, according to some embodiments of the present disclosure. FIG. 15 illustrates mean absolute percentage error (MAPE) obtained when soiling losses for various photovoltaic technologies were estimated using a single transmittance wavelength, according to some embodiments of the present disclosure. The same analysis presented earlier has been repeated using wavelengths at 50 nm steps between 300 nm and 1000 nm. The results are plotted in FIG. 14 and FIG. 15: as it may be seen, maximum coefficients of determination (≥99%) and minimum MAPE were obtained using the transmittance at single wavelengths between 500 and 650 nm and estimates of soiling losses of photovoltaic materials were obtained.

The use of a single wavelength simplified the estimation of soiling losses because it uses inexpensive and reliable monochromatic light sources, such as lasers or LEDs. Non-monochromatic light sources, such as xenon or tungsten lamps, emit light with different intensities as a function of wavelength. In addition, light detectors show a different spectral response to light intensity with wavelength. Therefore, the accuracy of soiling spectral measurements could be affected by changes in the spectra emitted by the light sources and their inherent impact of the output of the detector. Using a monochromatic light instead excludes the impact of variation in the light sources and the inherent impact on the output of the detector. Using a monochromatic light instead excludes the impact of variation in the light source's spectra on the estimation of soiling, allowing us to correlate variation in the measurements directly to variations in light intensity due to transmittance losses.

The wavelengths utilized in these experiments for each material tested are reported in Table 3: apart from CdTe, the wavelengths that maximize the coefficients of determination of a material are those that minimize the MAPE as well (CdTE's MAPE=0.21% and $R^2$=98.3% at 600 nm). The results show that $R^2$ equal or higher than 99% and MAPE lower than 0.35% may be achieved for any photovoltaic technology if the transmittance of soiling at a specific wavelength is considered. This means that the soiling losses of each material may be predicted by using a single wavelength measurement with high accuracy. Table 4 suggests that the most appropriate wavelength of each technology may be selected by considering their energy bands: 500 nm for high (a-Si), 550 nm to 600 nm for intermediate (CdTe and perovskite) and 600 nm for low (m-Si, p-Si and CIGS) energy band gaps. All the materials, apart from a-Si, show lower MAPE if the transmittance of a single wavelength is used instead of the AST of any of the wavebands investigated herein.

TABLE 4

Single wavelengths that maximized the coefficient of determination ($R^2$) for each photovoltaic technology, according to some embodiments of the present disclosure.

| Material | Maximum $R^2$ | | |
|---|---|---|---|
| | Wavelength [nm] | $R^2$ (%) | MAPE (%) |
| m-Si | 600 | 99.7 | 0.10 |
| p-Si | 600 | 99.4 | 0.08 |
| a-Si | 500 | 99.7 | 0.33 |
| CdTe | 550 | 99.8 | 0.25 |
| CIGS | 600 | 99.5 | 0.08 |
| perovskite | 550 | 99.0 | 0.16 |

If soiling is desired to be determined for more than one photovoltaic technology with the same measurement, it is of interest to find a single wavelength that minimizes the error. The coefficients of determination, MAPE and MPE for each PV technology at the most significant wavelengths found earlier (500, 550 and 600 nm) are reported in Table 5. The transmittance measured at any of the selected wavelengths achieves coefficients of determination equal to or higher than 90% when compared to the soiling ratio of any material. Despite that, the average coefficients of determination are lower at the extremes of the selected range: 500 nm favors a-Si and perovskite, but returns worse predictions for other technology, whereas 600 nm maximizes high energy band materials but negatively affects a-Si and perovskite. Moreover, 500 nm shows negative MPE for all the technologies (transmittance systematically lower than soiling ratio) and, in some cases, MAPE higher than 1%. So, 500 nm seems to be beneficial only for determining the soiling occurring in a-Si PV devices. On the other hand, 600 nm may be a suitable wavelength for determining the soiling in higher energy band gap materials and/or PV devices. Acceptable results are returned at 600 nm for CdTe, even if 550 maximizes its results.

The data collected for this research took place over 48 weeks in a location that experiences various types of soiling (Saharan dust, olive tree pollen, ashes, urban particulate matter, etc.) but similar investigations could be performed in different locations with substantially similar results.

TABLE 5

Coefficient of determination ($R^2$), mean absolute percentage error (MAPE) and mean percentage error (MPE) between soiling ratio and the transmittance of soiling at three single wavelengths for the six PV materials considered, according to some embodiments of the present disclosure.

| | 500 nm | | | 550 nm | | | 600 nm | | |
|---|---|---|---|---|---|---|---|---|---|
| Material | $R^2$ (%) | MAPE (%) | MPE (%) | $R^2$ (%) | MAPE (%) | MPE (%) | $R^2$ (%) | MAPE (%) | MPE (%) |
| m-Si | 90.3 | 1.24 | −1.24 | 98.3 | 0.54 | −0.54 | 99.7 | 0.1 | −0.08 |
| p-Si | 92.3 | 1.16 | −1.16 | 99.1 | 0.46 | −0.46 | 99.4 | 0.08 | 0 |
| a-Si | 99.7 | 0.33 | −0.33 | 97.9 | 0.38 | 0.38 | 91.6 | 0.85 | 0.85 |
| CdTe | 95.4 | 0.95 | −0.95 | 99.8 | 0.25 | −0.25 | 98.3 | 0.21 | 0.21 |
| CIGS | 92.0 | 1.18 | −1.18 | 99.0 | 0.48 | −0.48 | 99.5 | 0.08 | −0.02 |
| perovskite | 98.9 | 0.57 | −0.57 | 99.0 | 0.16 | 0.14 | 94.0 | 0.61 | 0.61 |

The results suggest that soiling detection could be performed by using average waveband or single wavelength transmittance measurements. This may lead to the development of innovative soiling detecting systems, based on transmittance measurements, that might be able to quantify the impact of soiling on different PV technologies.

Figure 16:
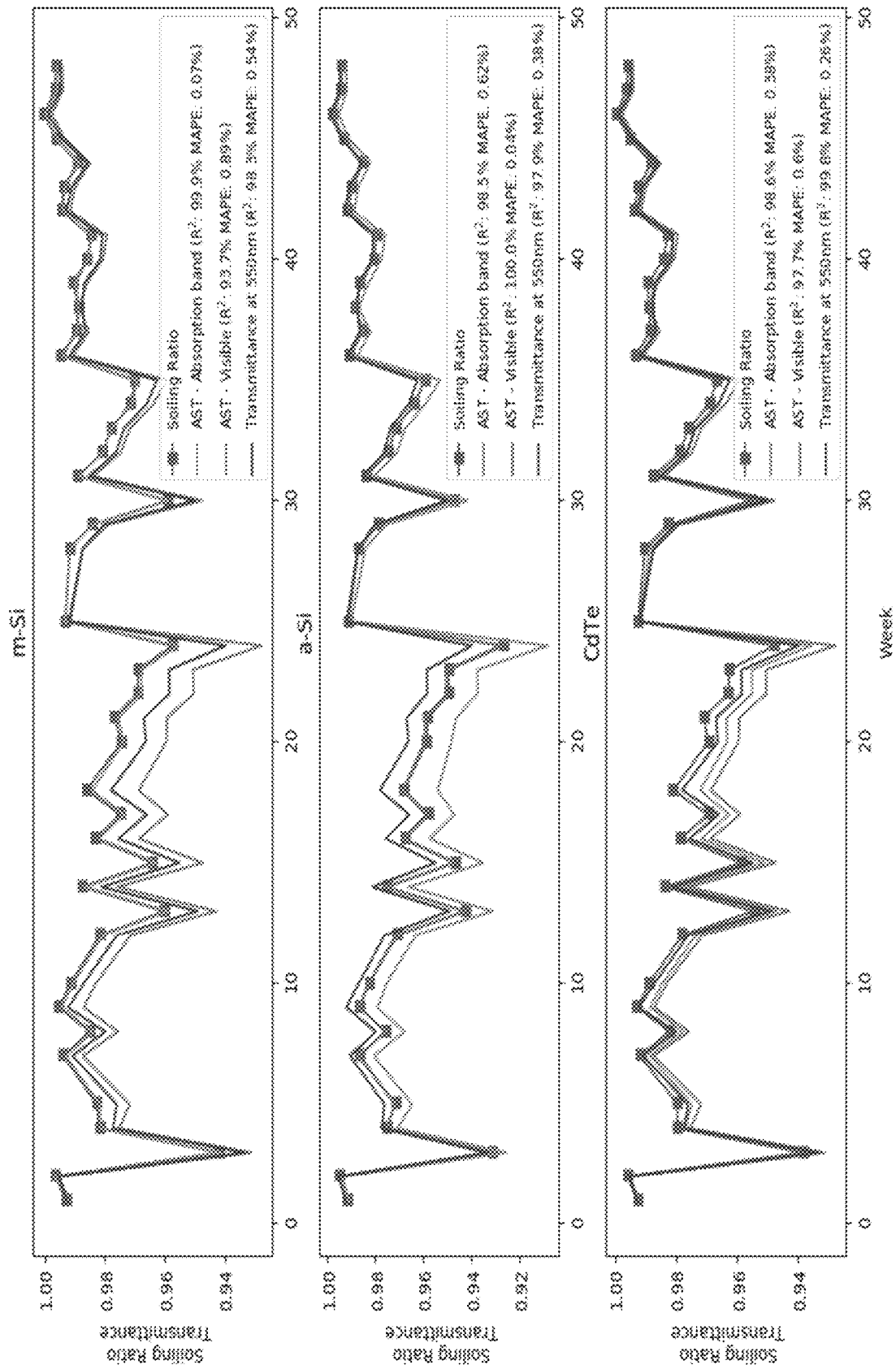
FIG. 16 illustrates soiling ratio transmittance measurements taken from three types of PV cells, according to some embodiments of the present disclosure: multi-crystalline silicon (m-Si), amorphous silicon (a-Si), and cadmium telluride (CdTe).

Each material has a parameter that appears to maximize the soiling loss prediction, as summarized in Table 6. In most cases, the best estimations are obtained if the transmittance is measured at a wavelength within 500 and 600 nm. Each energy band level shows a range in which the results are optimized: 500 nm for low (a-Si), 550 nm to 600 nm for intermediate (CdTe and perovskite) and 600 nm for high (m-Si, p-Si and CIGS) energy band gaps. Alternatively, the AST over the specific material absorption band returns best soiling estimations than the average transmittance of the spectral regions for all materials, except for amorphous silicon and perovskite cells. Among the three regions of the solar irradiance, the best results are obtained for the visible band ($R^2 \geq 94\%$ for all the materials), even if this introduce a systematic offset in the calculation of the soiling ratio for high energy band gap materials (see m-Si time series in FIG. 16).

TABLE 6

Summary of the best correlations obtained for each material between the soiling ratios and the various parameters investigated.

| Material | Best results |
|---|---|
| m-Si | Transmittance at 600 nm or AST at specific absorption band. |
| p-Si | Transmittance at 600 nm. |
| a-Si | AST in the visible. |
| CdTe | Transmittance at 550 or 600 nm. |
| CIGS | AST at specific absorption band followed by transmittance at 600 nm |
| perovskite | Transmittance at 550 nm followed by AST in the visible. |

As explained in this present disclosure, the impact of soiling on the electrical output of PV cells may be estimated with good accuracy, using broadband or even single wavelength optical transmittance measurements. These results may lead to the development of innovative spectral soiling detector devices.

Indoor Testing and Validation

The choice of the monochromatic light emitter's wavelength is based on the analysis presented in Example One. For this example, a monochromatic diode emitting light at 630 nm (green light) was selected for the prototype. An optical structure was used to collimate the light onto the light detector.

An encapsulated solar cell was employed as a light detector and a Fluke 289 multimeter was used to measure the current generated by the cell (i.e., as the control unit). In other embodiments, a data logger could replace the Fluke multimeter. The on/off switch of the diode was controlled by a timer. Power for the entire station was supplied by a lithium ion USB power bank.

Five 4 cm×4 cm sized and 3 mm thick Diamant low-iron glass coupons were artificially soiled by using different amounts of Kaolinite. Their hemispherical transmittances were measured between 250 and 1300 nm, at 1-nm steps, using a Cary 5000 dual-beam ultraviolet-visible-near infrared (UA-VIS-NIR) spectrophotometer equipped with a DRA-2500 integrating sphere.

The validation of this prototype was conducted by powering the green diode at 510 mA and 3.025 V. The measurements were started 30 minutes after the light source had been switched on to let the light beam stabilize. In order to minimize the impact of external light sources, a test was conducted in the dark and a zero calibration was performed. The zero reading of the detector was 0.011 mA.

Figure 17:
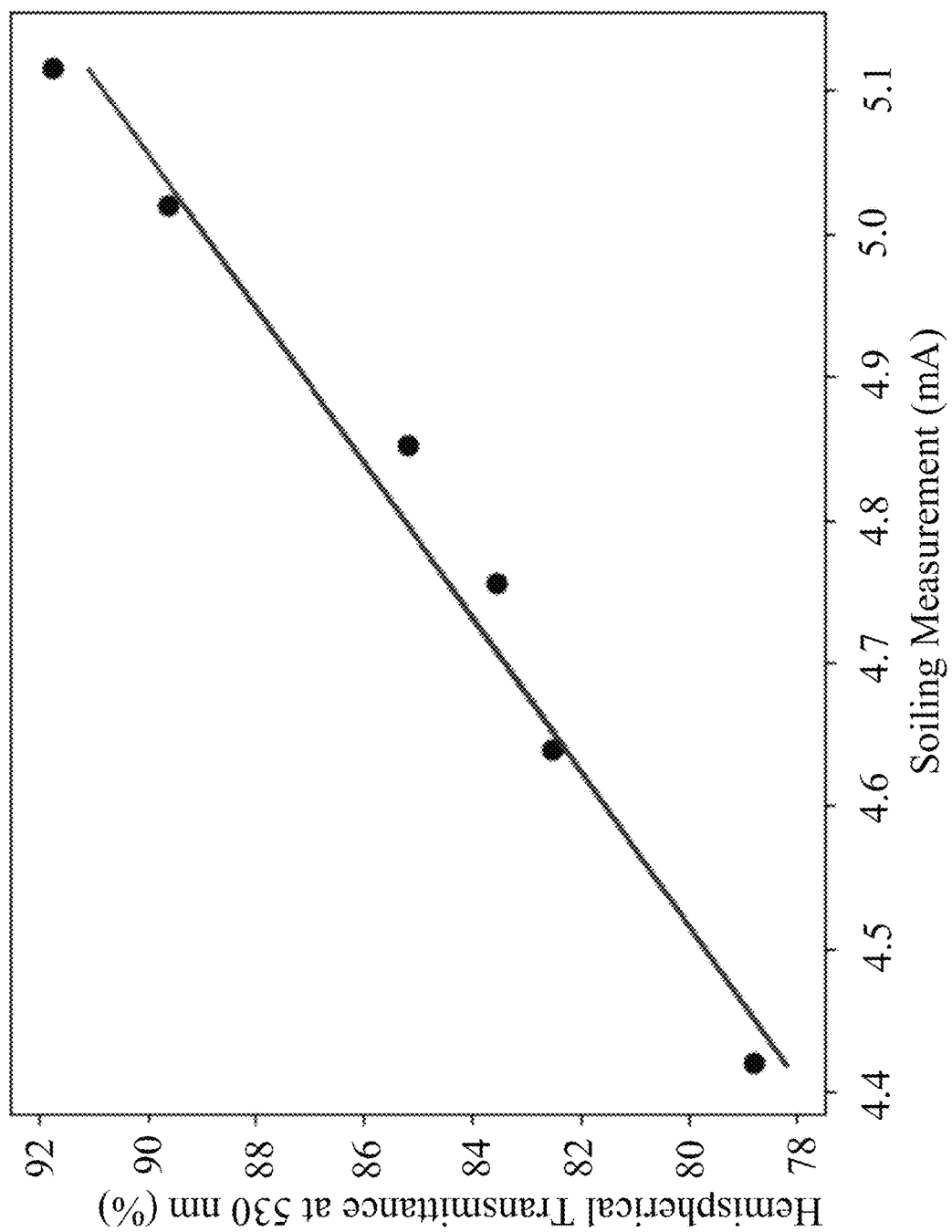
FIG. 17 illustrates the readings of a soiling detection unit for soiling spectral transmittance compared to the hemispherical transmittance at 530 nm (green light), measured with a spectrophotometer, of soiled and clean photovoltaic glasses, according to some embodiments of the present disclosure.

The intensity of the light emitted by the diode and recorded by the light detector under a clean glass resulted in a baseline of 5.127 mA. The intensities of the light transmitted through each soiled glass were measured and, along with the baseline, corrected according to the zero measurement. The ratios between the light intensity through each soiled glass and the baseline clean glass (i.e., the light intensity ratio) were compared with the hemispherical transmittance of the same glass at 530 nm, previously measured using the spectrophotometer. FIG. 17 illustrates the readings of a soiling detection unit for soiling spectral transmittance compared to the hemispherical transmittance at 530 nm, measured with a spectrophotometer, of soiled and clean photovoltaic glasses, according to some embodiments of the present disclosure. The two measurements have a coefficient of determination ($R^2$) of 97.6% proving a strong linear correlation between the measurement utilizing the present disclosure and the actual hemispherical transmittance of the glasses.

The quality of the measurement of the light transmitted through a soiled glass coupon can be determined as shown in FIG. 17 by comparing the light intensity ratio with the soiling relative transmittance (i.e., the ratio of the hemispherical transmittance at 530 nm of the soiled glasses with respect to the clean glass). Similar to the soiling ratio, the soiling relative transmittance and the light intensity ratio for a monochromatic light and the soiling relative transmittance at that same wavelength should be the same. In this example, the best fit between light intensity ratio and the soiling relative transmittance has a slope of 1.03 (dashed line in FIG. 18), demonstrating the excellent linear correlation between the two measurements and proving therefore the reliability of the prototype.

Soiling has a non-linear impact on the irradiance spectra, with the blue region of the light being more affected than the red region. This means that the soiling ratio is the result of a complex interaction among the irradiance spectrum, the soiling transmittance spectrum, and the spectral response of the photovoltaic material. This interaction can be modeled for reference as shown in Equation 10.

$$r_s = \frac{\int_{\lambda_1}^{\lambda_2} E_G(\lambda, t) \tau_{soiling}(\lambda, t) SR(\lambda) d\lambda}{\int_{\lambda_1}^{\lambda_2} E_G(\lambda, t) SR(\lambda) d\lambda}$$ (Equation 10)

In Equation 10, $E_G$ is the spectral distribution of the global irradiance, $\tau_{soiling}$ is the hemispherical transmittance of soiling, SR is the spectral response, and $\lambda_1$ and $\lambda_2$ are the lower and upper limits of the absorption band of the cell.

Figure 18:
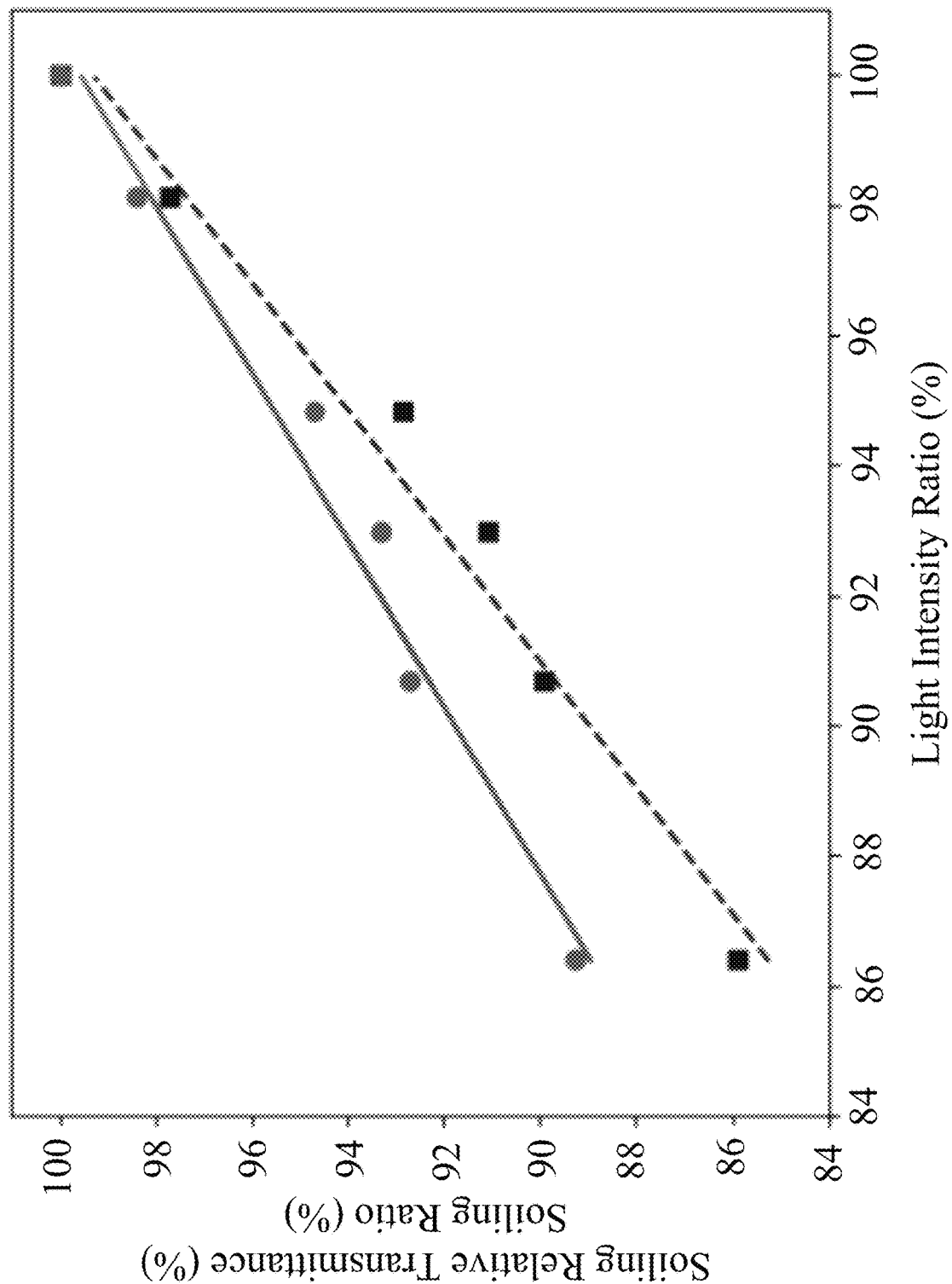
FIG. 18 shows the light intensity ratio from the present disclosure against the soiling relative transmittance at 530 nm (amber light) and the soiling ratio of a mono-crystalline cell placed behind a glass pane, modeled according to Equation 10 under a global irradiance spectrum.

FIG. 18 shows the light intensity ratio from the present disclosure against the soiling relative transmittance at 530 nm and the soiling ratio of a mono-crystalline cell placed behind each glass, modeled according to Equation 10 under a global irradiance spectrum. The solid line of FIG. 18 shows the relation between the light intensity ratio and the soiling ratio (modeled as shown in Equation 10) for the glass coupons under investigation. The slope is substantially less than 1 due to the fact that the present disclosure measures only a single wavelength, while the soiling ratio is calculated over the whole absorption band of the cell. This discrepancy can be corrected by applying a calibration to the light intensity ratio, in order to take into account the spectral response of each photovoltaic material.

Figure 19:
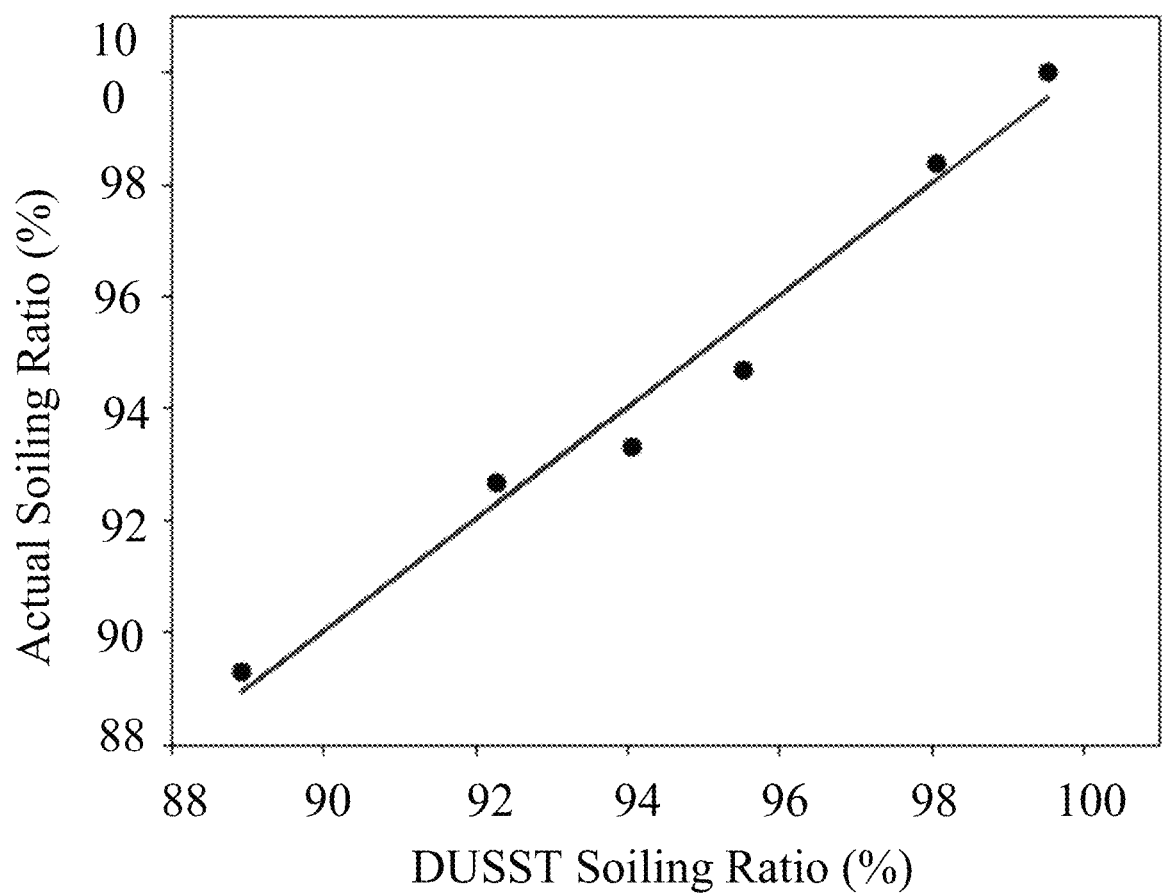
FIG. 19 shows the calculated light intensity ratio measured using an embodiment of this invention outdoors.

Applying a calibration factor for mono crystalline cells determined per the line of best fit in FIG. 18 results in accurate soiling ratios determined using the present disclosure. Overall, a MAPE of 0.6% was found between the actual soiling ratios and the values of the best fit line calculated at the determined soiling ratios (see FIG. 19). The MAPE expresses the average absolute error between actual soiling ratios and the best fit line. This error is within the uncertainty ranges of the spectrophotometer and is lower than the expected errors of irregularly cleaned traditional soiling stations.

Indoor and Outdoor Testing and Validation

Figure 20:
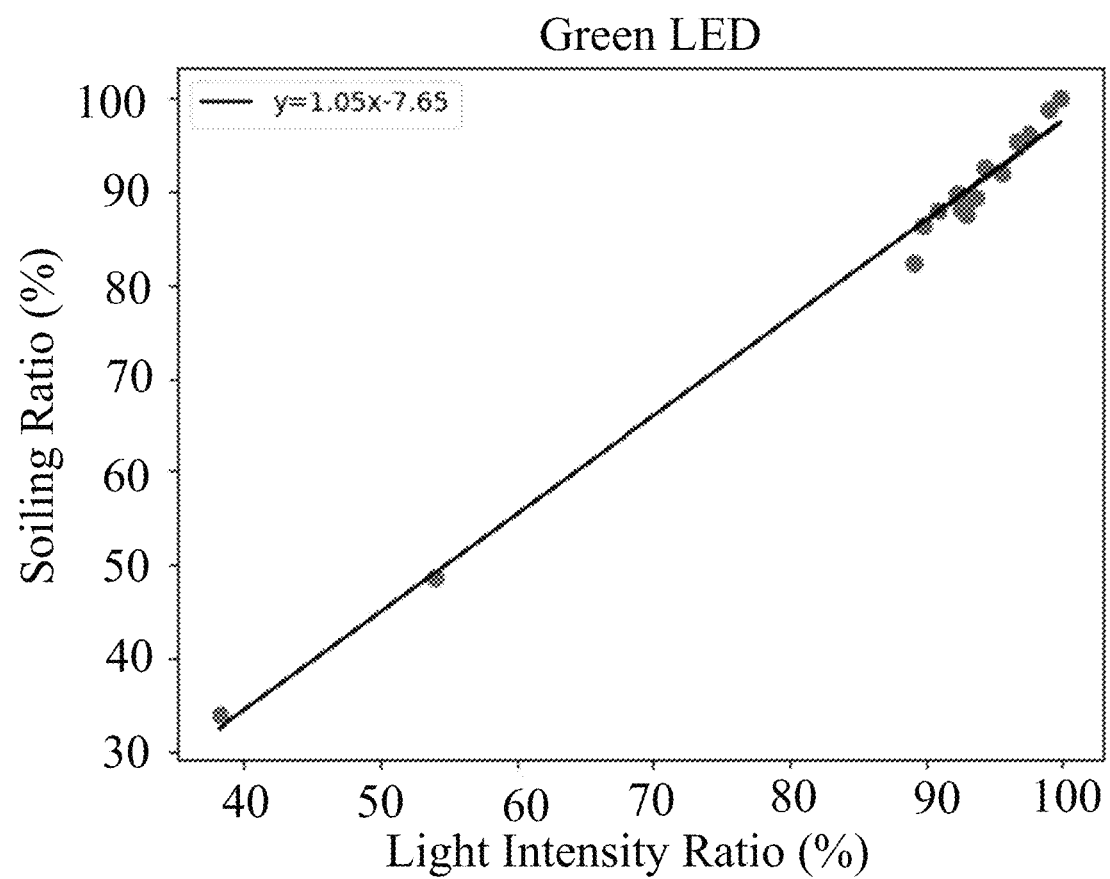
FIG. 20 shows indoor results for testing of the soiling detection unit at 530 nm wavelength (green).
Figure 21:
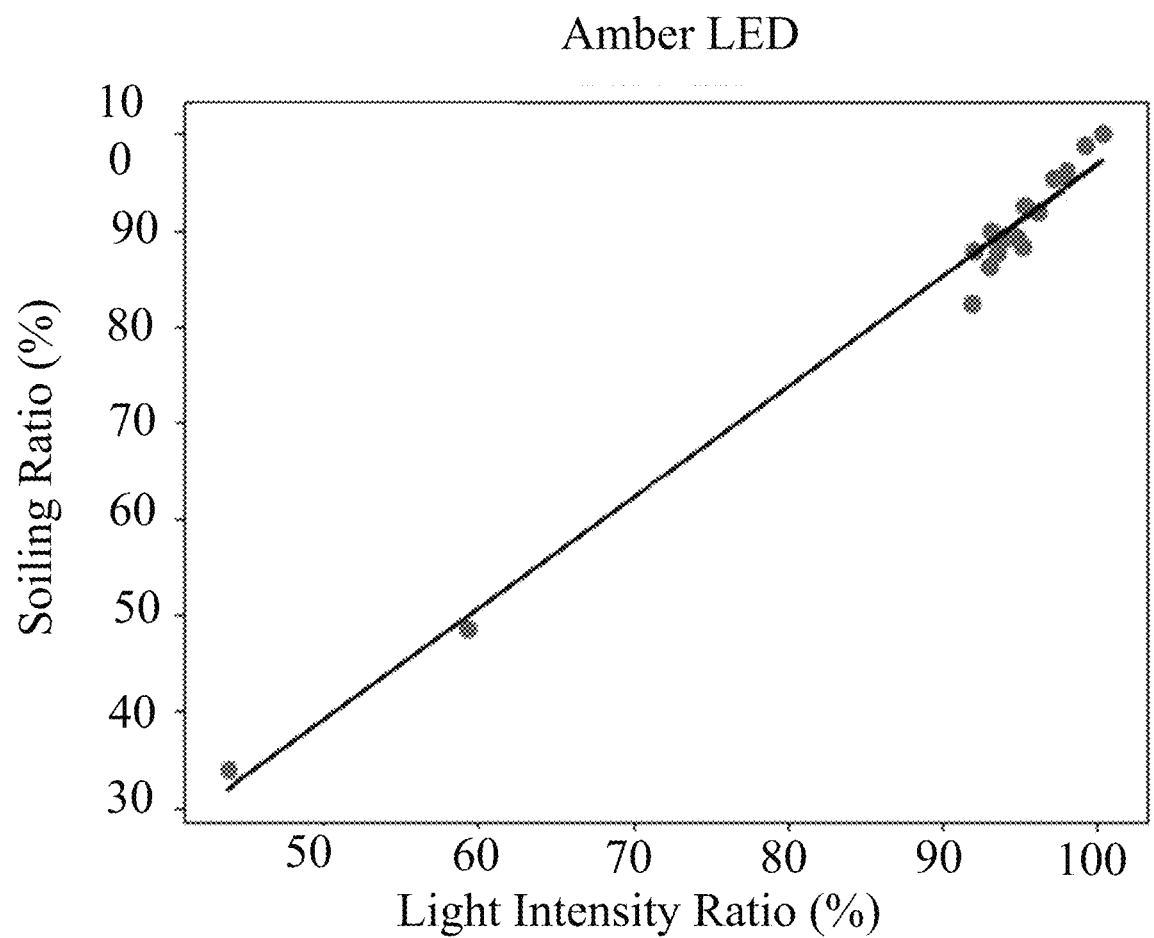
FIG. 21 shows indoor results for testing of the soiling detection unit at 591 nm wavelength (amber).

As previously mentioned, the present disclosure demonstrates how transmission losses under monochromatic light can be used to accurately determine overall losses in photovoltaic devices that responds across a wide spectral range. It was determined that light sources with wavelengths ranging between 500 and 600 nm would provide the best results for accurately determining soiling losses in the most widely used photovoltaic semiconductors. After making this determination, initial indoor testing of the present disclosure was conducted using 505 nm (cyan), 530 nm (green), 567 nm (lime), and 591 nm (amber) LEDs behind a collimating lens and with a monocrystalline silicon (m-Si) photovoltaic cell as the light detector. Diamant low-iron glass coupons, 4×4×m sized and 3 mm thick, were artificially soiled with three dust types: Arizona red dust, kaolinite, and polygorskite. The hemispherical transmittances of the soiled and baseline glasses were measured between 250 and 1300 using a Cary 5000 dual-beam ultraviolet-visible-near infrared (UV-VIS-NIR) spectrophotometer equipped with a DRA-2500 integrating sphere. Soiling ratios were calculated for each coupon using the transmittance data, standardized solar irradiance, and the spectral response for a typical m-Si cell. The soiling detection unit was calibrated with each LED paired with a clean coupon overlaid on a m-Si cell. FIG. 20 and FIG. 21 present the soiling detection unit measured light intensity ratio (LIR) under green and amber LEDs for all coupons and dust types versus the soiling ratio calculated for each coupon. All LEDs tested showed a $R^2$ greater than 98% demonstrating that a light intensity ratio can easily be translated to the appropriate soiling ratio by using a simple linear relationship. Linear fit equations for the soiling ratio (SR) based on the LEDs were as follows: cyan SR=1.02*LIR−5.10, green SR=1.05*LIR−7.65, lime SR=1.18*LIR−20.11, and amber SR=1.15*LIR−18.66. All dust types were included and no difference in linearity was evident between Arizona road dust, kaolinite, or polygorskite. The green LED showed the highest $R^2$ and the fit with the slope closest to land therefore it was selected for further outdoor testing.

An outdoor prototype of the soiling detection unit was deployed in October of 2018 at the National Renewable Energy Laboratory (NREL) in Golden, Colo., as shown in FIG. 4. The outdoor prototype included the same optical components as the indoor prototype but also included a solar panel for battery charging and an outdoor rated electrical enclosure (which houses a data logger and battery for activation of the LED and measuring and storing short-circuit current measurements from the m-Si cell).

Figure 22:
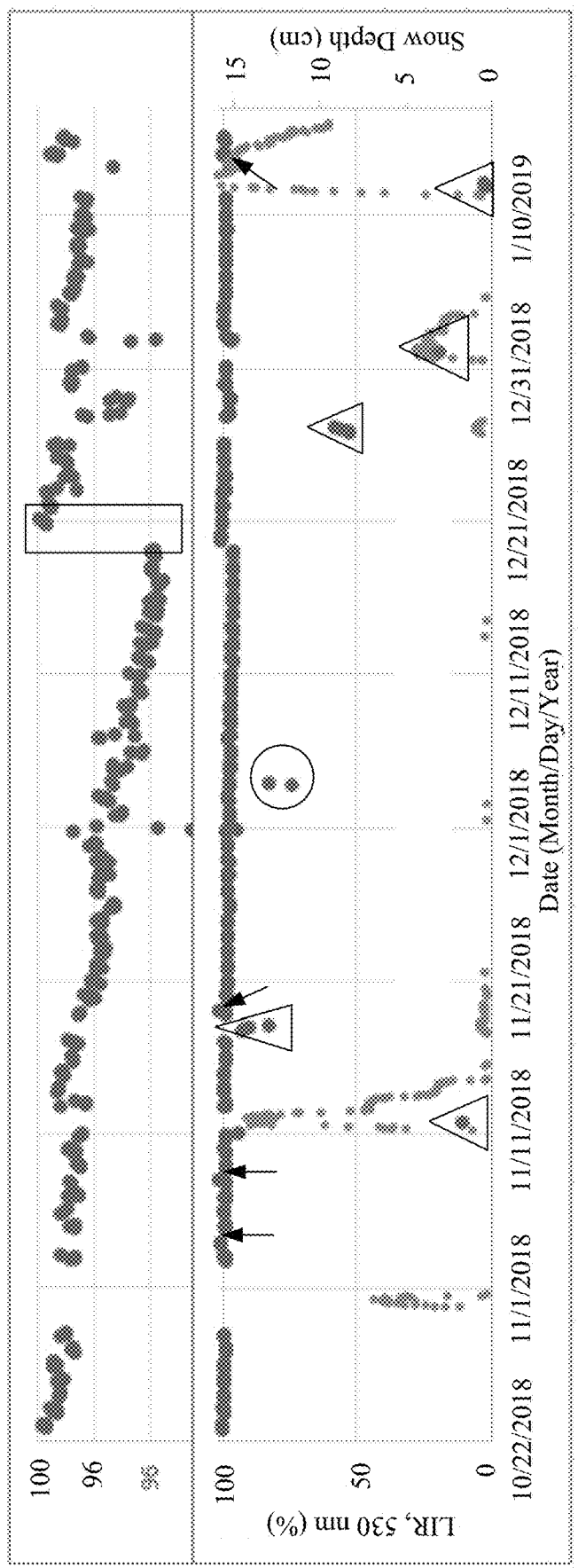
FIG. 22 shows outdoor test results for the soiling detection unit over time and the snow depth in the outdoor test area.

FIG. 22 presents the outdoor measured light intensity ratio (LIR) from a green LED from Oct. 22, 2018 through Jan. 15, 2019. The light intensity ratio is shown as dark circles and the snow depth is shown as lighter circles. The soiling ratio for a given photovoltaic device is equal to the light intensity ratio multiplied by a calibration factor. Arrows indicate light intensity ratios great than 100, which shows meteorological data showing ice or moisture on the detector. Triangles indicate time periods where varying snow depth was suggested on the detector. Measurements within the circle are during a period of active rainfall. The rectangle shows a cleaning of the sensor that occurred when active moisture/precipitation was only measured for a few minutes.

The top portion of FIG. 22 is a closeup of the major trends in the light intensity ratio, showing minor soiling and recovery trends on the order of 1-2% up until November 12$^{th}$ followed by a more linear soiling trend resulting in losses of near 5% by December 19$^{th}$ through January 15$^{th}$ shows multiple minor soiling and recovery periods. The lower portion of FIG. 22 shows measured snow depth at NREL on the right axis (snow being more common than rain during this time period). The data shows that during periods of changing snow depth significantly lower light intensity ratios are recorded (0-90% indicated with triangles). This suggests that the light intensity ratio dropped because of the snow accumulation on the sensor and the soiling detection unit effectively measured reductions in transmittance that vary with snow layer thickness. FIG. 22 also shows several data points where the light intensity ratio is greater than 100, indicated with arrows. Inspection of these time periods in conjunction with the measurements of snow depth at NREL, moisture/precipitation, or precipitation accumulation suggests that the detector either has lingering ice, or liquid water on the soiling detection unit during these times. This suggests that ice and water films are potentially enhancing light capture by the solar cell. The light intensity ratios values of between 60%/o and 90% within the red circle were confirmed to be periods of active rainfall while light intensity ratio measurements were being recorded. The soiling detection unit performed various measurements each night. Meteorological events such as dew or frost formation take place for short periods of time and are therefore likely to affect only a portion of nightly measurements. The rectangle is full recovery on December 19$^{th}$. During this time period NREL's NovaLynx 260-2590 moisture and precipitation detector recorded moisture for only a few minutes while no accumulated precipitation was recorded. This exemplifies how, in the right scenarios, the smallest precipitation events can fully clean solar glass while other rain and snow events in the same data set do not fully clean the glass. These results suggest that the soiling detection unit as described by some embodiments herein can also measure optical transmittance in response to varying levels of snow accumulation on the light detector.

Figure 23:
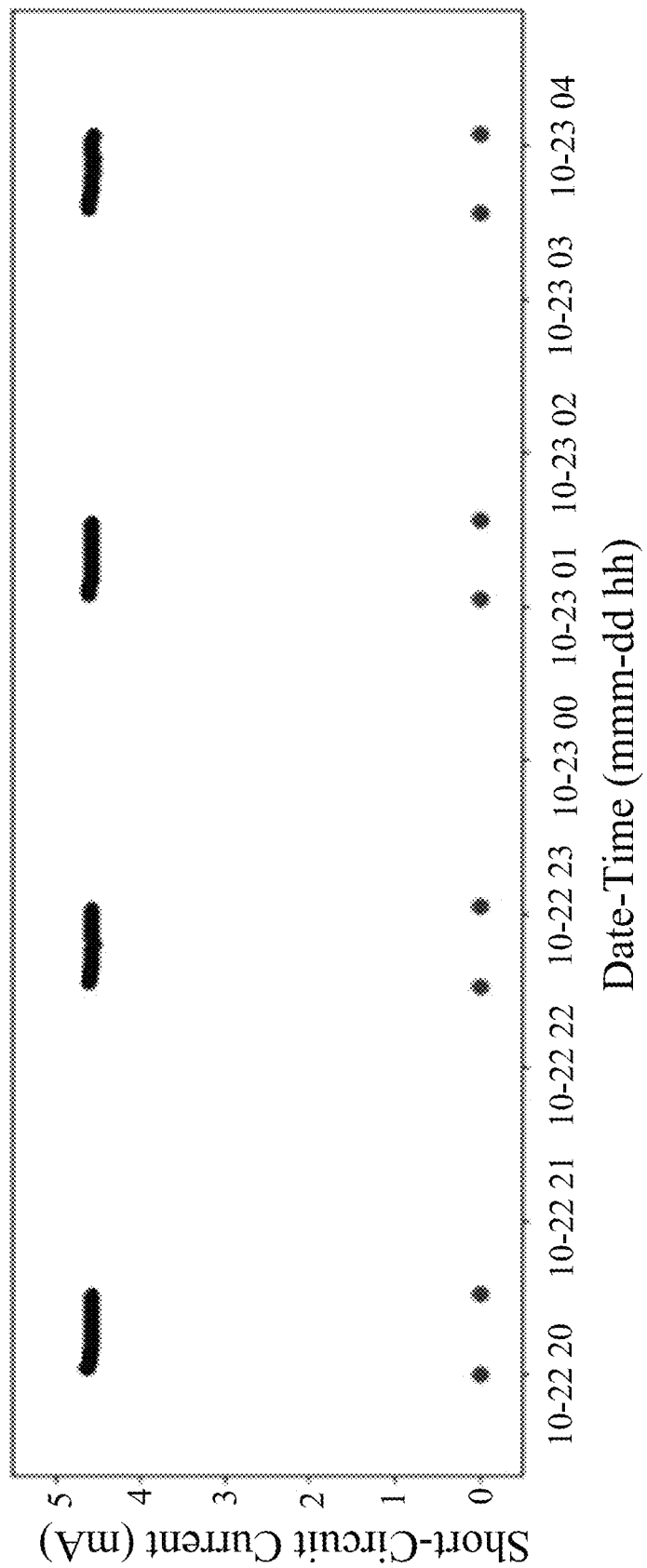
FIG. 23 shows four soiling measurements taken outdoors during the night between Oct. 22 and 23, 2018 during an outdoor test of the present disclosure.

FIG. 23 shows four soiling measurements taken outdoors during the night between Oct. 22 and 23, 2018. Measurements were taken at four different moments each night, by emitting monochromatic light for periods of 30 minutes onto a glass where soiling accumulates. The LED was turned on for 30 minutes at four different times at night (data for the night between Oct. 22, 2018 and Oct. 23, 2018 shown in FIG. 23). Measurements taken with the light on are the dark lines at the top of the graph; measurements taken with the light off are the dots lower on the graph.

Figure 24:
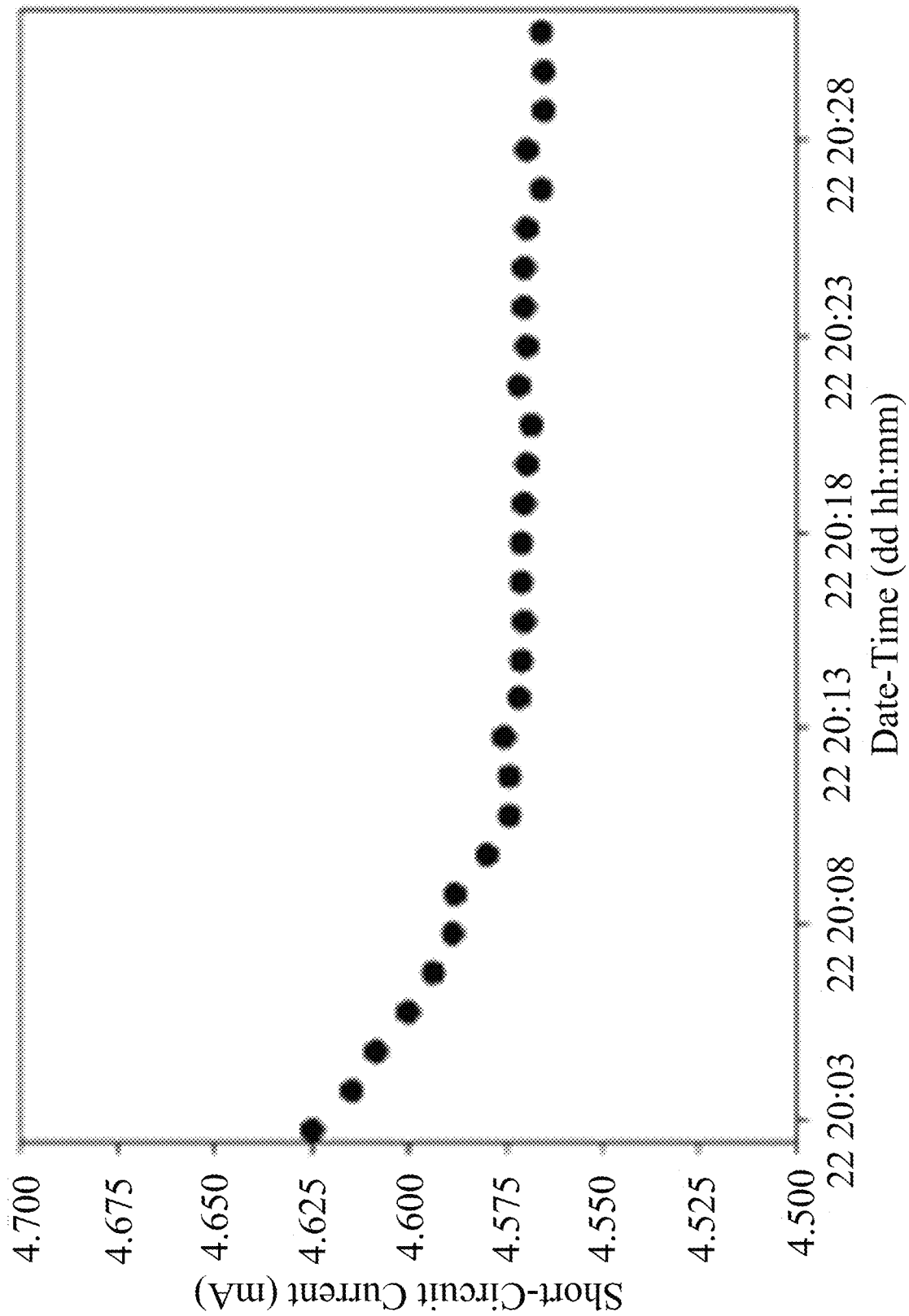
FIG. 24 shows the short-circuit current measurements during the first 30-minute interval on the night of Oct. 22, 2018 during an outdoor test of the present disclosure.

FIG. 24 shows the short-circuit current measurements during the first 30-minute interval on the night of Oct. 22, 2018. Zero measurements were taken before and after each measurement to assess the intensity of any external light noise. Each 30-minute measurement takes some time to stabilize (as shown in FIG. 24). As shown in FIG. 24, after an initial peak, the measurement reaches a steady current value after about 10 minutes. For this reason, the daily soiling ratio was calculated by averaging the mean values of the last 10 minutes of each 30-minute measurement.

Figure 25:
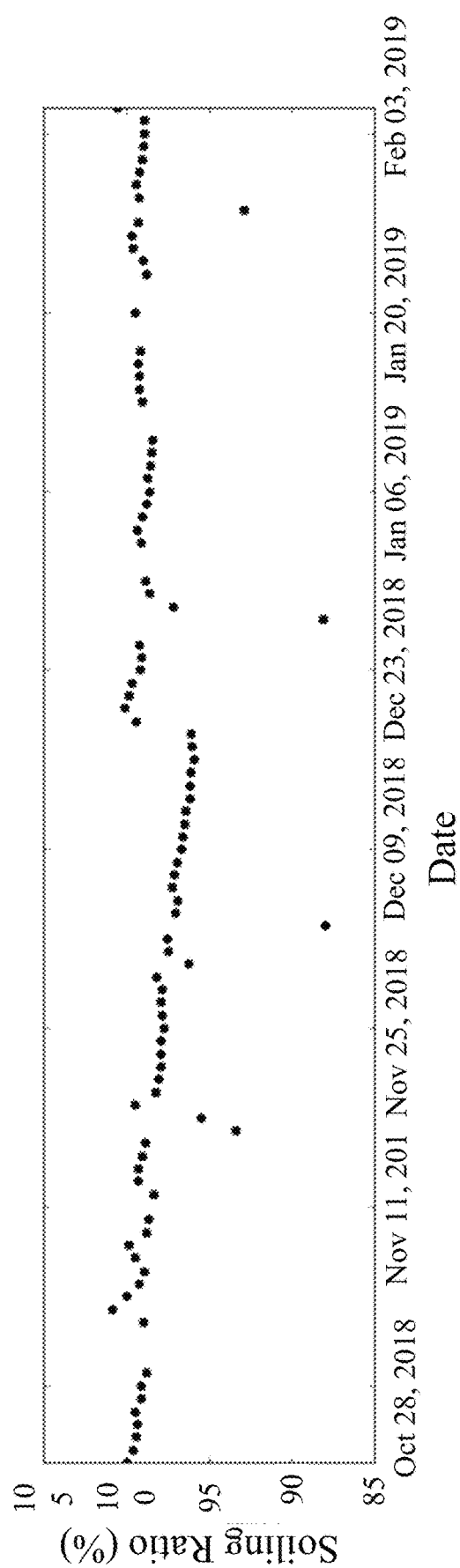
FIG. 25 shows the daily soiling ratios measured by a soiling detection unit installed at the National Renewable Energy Laboratory (NREL) from Oct. 22, 2018 to Feb. 5, 2019.

The soiling ratios, defined as the ratio between the current of a soiling photovoltaic device and the current same device in clean conditions, measured by the light detector prototype at NREL from Oct. 22, 2018 to Feb. 5, 2019 are shown in FIG. 25. The soiling ratios were calculated by averaging the mean values of the last 10 minutes of each measurement. In some embodiments, the measurement could be shortened, improving the durability of the LED because it would be employed for less time each night. Also, because the performance of LEDs can change with the outdoor temperature, a limited operating time would reduce the amount of heat generated by the LED itself, and therefore any variation in temperature that may impact the intensity of the emitted light.

Figure 26:
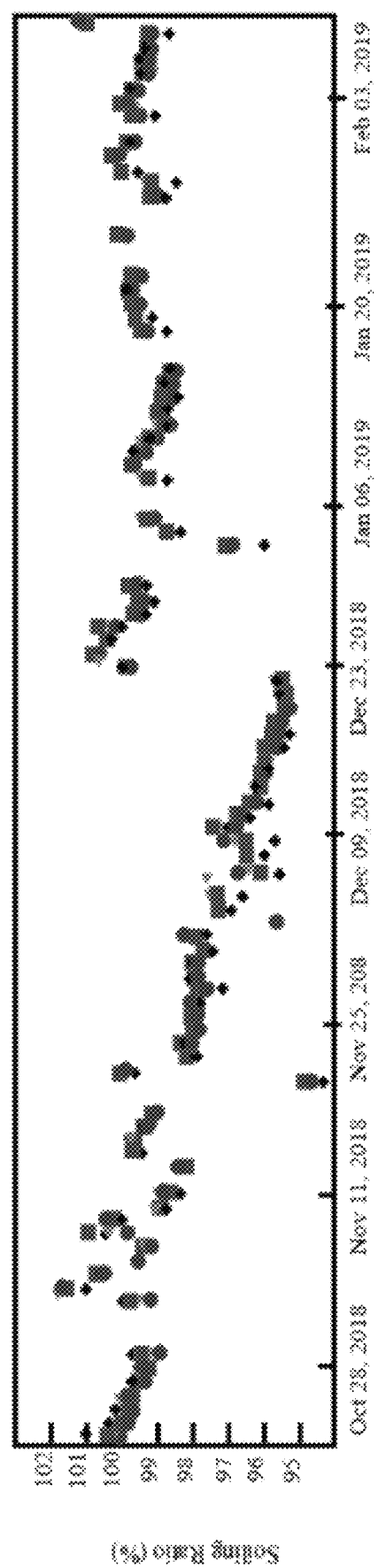
FIG. 26 shows the dialing soiling ratios measured by a soiling detection unit considering various measurement time periods.

The initial results of the investigation are shown in FIG. 26. The results shown in FIG. 26 demonstrate that using different measurement times does not seem to affect the soiling ratio profile significantly. Using the intensity of the light during the first minute (plus signs) or the first 10 minutes (squares) of each measurement returns profiles that match the trend calculated by using the last 10 minutes of measurements only (circles).

Concentrator Photovoltaics Example

Concentrator photovoltaics (CPV) has achieved the highest conversion efficiencies among all the PV technologies, and a noteworthy potential to deliver high-energy yields and low-cost of electricity at locations with high solar energy resource. CPVs use lenses to concentrate sunlight to deliver this improved performance. The use of III-V multi-junction (MJ) solar cells maximizes the absorption of the incident spectrum. In addition, the use of concentrator optics reduces the amount of semiconductor material and contributes to increase the overall efficiency of the system. One of the most relevant differences between the performance of MJ-based CPV and single-junction PV systems is related with their spectral dependence. The series connection of various semiconductors with different energy gaps makes CPV technology much more sensitive to the key parameters that affect the input spectrum, namely: air mass, aerosols, and precipitable water. In this sense, it has been found that MJ-based CPV systems present annual spectral losses around 5%-10% higher than conventional PVs. Indeed, several doubts raise when trying to develop MJ solar cells with more than four band-gaps due to subcell current limiting issues produced by the inherent spectral variations outdoors.

Bearing the above in mind, it can be expected that soiling modifies the spectral performance of MJ CPV systems and introduces additional non-negligible losses in the system. Previously, the impact of soiling has been investigated by considering artificial soiling and a set of simulated spectra. This study is of great value to understand the spectral effects of soiling and demonstrated for the first time that soiling can affect the current balance among the subcells in a MJ solar cell. However, further investigations are needed to better understand the spectral impact of soiling under real working conditions, where the type and amount of soiling, as well as the characteristics of the spectral irradiance, vary with time.

The present disclosure is intended to fill the gap concerning the spectral nature of soiling and its impact on MJ-based CPV systems as a function of the time-varying input spectrum. To address this issue, the spectral transmittance of soiling and the spectral irradiance recorded over a course of a year in a location in Southern Spain have been used. Based on these data, the effects of soiling on the key wavebands of a typical multijunction solar cell are analyzed and discussed. In addition, by using a set of novel equations, the impact of the spectral transmittance of soiling in the current balance of the subcells and in the performance of the system are quantified and discussed in detail for the first time. This present disclosure offers the first investigation concerning the spectral impact of soiling in multijunction-based CPV systems under real operating conditions.

Even if the ratio of the short-circuit currents in Equation 4 neglects the influence of non-uniform soiling, it is widely accepted as a suitable approach to quantify the impact of soiling. In the case of multijunction-based CPV systems, the current densities of Equation 4 can be expressed as:

$$J_{sc}, \text{cleaned} = \min(\int_{\lambda_{min}^i}^{\lambda_{max}^i} E_b(\lambda) SR_i(\lambda) d\lambda) = \min(J_{sc,cleaned}^i) \quad \text{(Equation 11)}$$

$$J_{sc}, \text{soiled} = \min(\int_{\lambda_{min}^i}^{\lambda_{max}^i} E_b(\lambda) \tau_{soiling}(\lambda) SR_i(\lambda) d\lambda) = \min(J_{sc,soiled}^i) \quad \text{(Equation 12)}$$

In Equations 11 and 12, $SR_i(\lambda)$ and $J_{sc}^i$ are, respectively, the spectral response and the short-circuit current density of the ith-junction, $E_b(\lambda)$ is the spectral distribution of the direct normal irradiance (DNI), $\tau_{soiling}(\lambda)$ is the direct spectral transmittance of the soiling accumulated on the surface of the CPV device, and $\lambda_{max}$ and $\lambda_{min}$ are, respectively, the longest and shortest wavelengths of the $i^{th}$-junction.

The SRatio, as defined in Equations 4, 11 and 12, expresses the effects of both the broadband attenuation and the spectral variation of the irradiance profile produced by soiling. The broadband attenuation considers the average reduction of the light intensity in the absorption band of the MJ cell, while the spectral effects are due to the non-flat spectral transmittance profile of soiling as a function of wavelength. If only the broadband effects want to be considered, Equation 4 may be rewritten as:

$$BSRatio = \frac{\int_{\lambda_{min}^{MJ}}^{\lambda_{max}^{MJ}} E_b(\lambda)\tau_{soiling}(\lambda)d\lambda}{\int_{\lambda_{min}^{MJ}}^{\lambda_{max}^{MJ}} E_b(\lambda)d\lambda} \quad \text{(Equation 13)}$$

In Equation 13, BSRatio is defined as the Broadband Soiling Ratio, and $\lambda_{max}^{MJ}$ and $\lambda_{min}^{MJ}$ are, respectively, the longest and shortest wavelength of the MJ solar cell. This expression is obtained by combining Equations 1 to 3 and considering a flat and perfect spectral response for all the junctions of the MJ cell, i.e. $SR_i(\lambda)=1$. On the other hand, if only the spectral effects of soiling aim to be considered, Equation 1 may be rearranged as:

$$SSRatio = \frac{SRatio}{BSRatio} = \frac{\min\left(\int_{\lambda_{min}^{i}}^{\lambda_{max}^{i}} E_b(\lambda)SR_i(\lambda)d\lambda\right)}{\min\left(\int_{\lambda_{min}^{i}}^{\lambda_{max}^{i}} E_b(\lambda)\tau_{soiling}(\lambda)SR_i(\lambda)d\lambda\right)} \cdot \frac{\int_{\lambda_{min}^{MJ}}^{\lambda_{max}^{MJ}} E_b(\lambda)d\lambda}{\int_{\lambda_{min}^{MJ}}^{\lambda_{max}^{MJ}} E_b(\lambda)\tau_{soiling}(\lambda)d\lambda} \quad \text{(Equation 14)}$$

In Equation 14, SSratio is defined as the Spectral Soiling Ratio. This expression accounts only for the impact of the soiling spectral profile on the performance of MJ CPV systems. In this sense, if the current decreases in a larger extent than the irradiance, the SSRatio presents a value lower than one, which means a worse spectral performance. On the other hand, if the current decreases in a lesser extent than the irradiance, the SSRatio presents a value higher than one, which means a better spectral performance. In other words, the SSRatio is higher/lower than one if the attenuation of soiling is lower/higher in those portions of the spectrum where the irradiance and the SR of the subcells are less/more intense.

As mentioned, soiling has been found to produce a higher attenuation at shorter wavelengths. Hence, it is expected to modify the current balance among the subcells of MJ solar cells, and therefore, to affect the spectral performance of the system. The relative spectral impact between the top and middle junctions of a reference cleaned MJ solar cell can be evaluated through Spectral Matching Ratio (SMR) as:

$$SMR_{cleaned} = \frac{J_{sc,cleaned}^{top}}{J_{sc,cleaned}^{mid}} \cdot \frac{J_{sc,cleaned}^{mid*}}{J_{sc,cleaned}^{top*}} \quad \text{(Equation 15)}$$

In Equation 15, "*" refers to the current densities under the reference spectrum AM1.5d ASTM G-173-03 at which multijunction solar cells and PCV systems are rated. For a soiled device, equation 15 may be rewritten as:

$$SMR_{soiled} = \frac{J_{sc,soiled}^{top}}{J_{sc,soiled}^{mid}} \cdot \frac{J_{sc,soiled}^{mid*}}{J_{sc,soiled}^{top*}} \quad \text{(Equation 16)}$$

Equation 16 quantifies the possible effects of soiling on the current balance, however, it also considers the inherent effects of the input spectral irradiance. Hence, this expression is not valid if only the spectral effects produced by soiling aim to be investigated. By combining equations 14 and 15, it is possible to define a new metric denoted as Soiling Mismatch radio (SMratio) as:

$$SMratio = \frac{SMR_{soiled}}{SMR_{cleaned}} = \frac{J_{sc,soiled}^{top}}{J_{sc,soiled}^{mid}} \cdot \frac{J_{sc,cleaned}^{mid}}{J_{sc,cleaned}^{top}} \quad \text{(Equation 17)}$$

The SMratio is a normalized index that accounts for the additional spectral effects produced by soiling on the current balance among the top and middle subcell. In this sense, an SMratio lower than one represents more soiling spectral losses for the top junction respect to the middle junction, (i.e. more losses in the blue region), and a value higher than one represents more soiling spectral losses for the middle junction respect to the top junction (i.e. more losses in the red region).

The $SM_{ratio}$, as well as the $SMR_{cleaned}$ and $SMR_{soiled}$, could be formulated to evaluate the relative spectral impact among all the junctions of MJ cells made up of three or more junctions. However, CPV systems are nowadays widely based on III-V triple-junction solar cells grown on Germanium substrates. As a consequence, the impact of soiling on the bottom subcell can be discarded because this subcell produces around 30% more current than the top and middle subcells. Hence, it is unlikely for it to become the limiting subcell of the stack because of soiling, given also the limited attenuation that soiling causes at higher wavelengths previously found.

Figure 28:
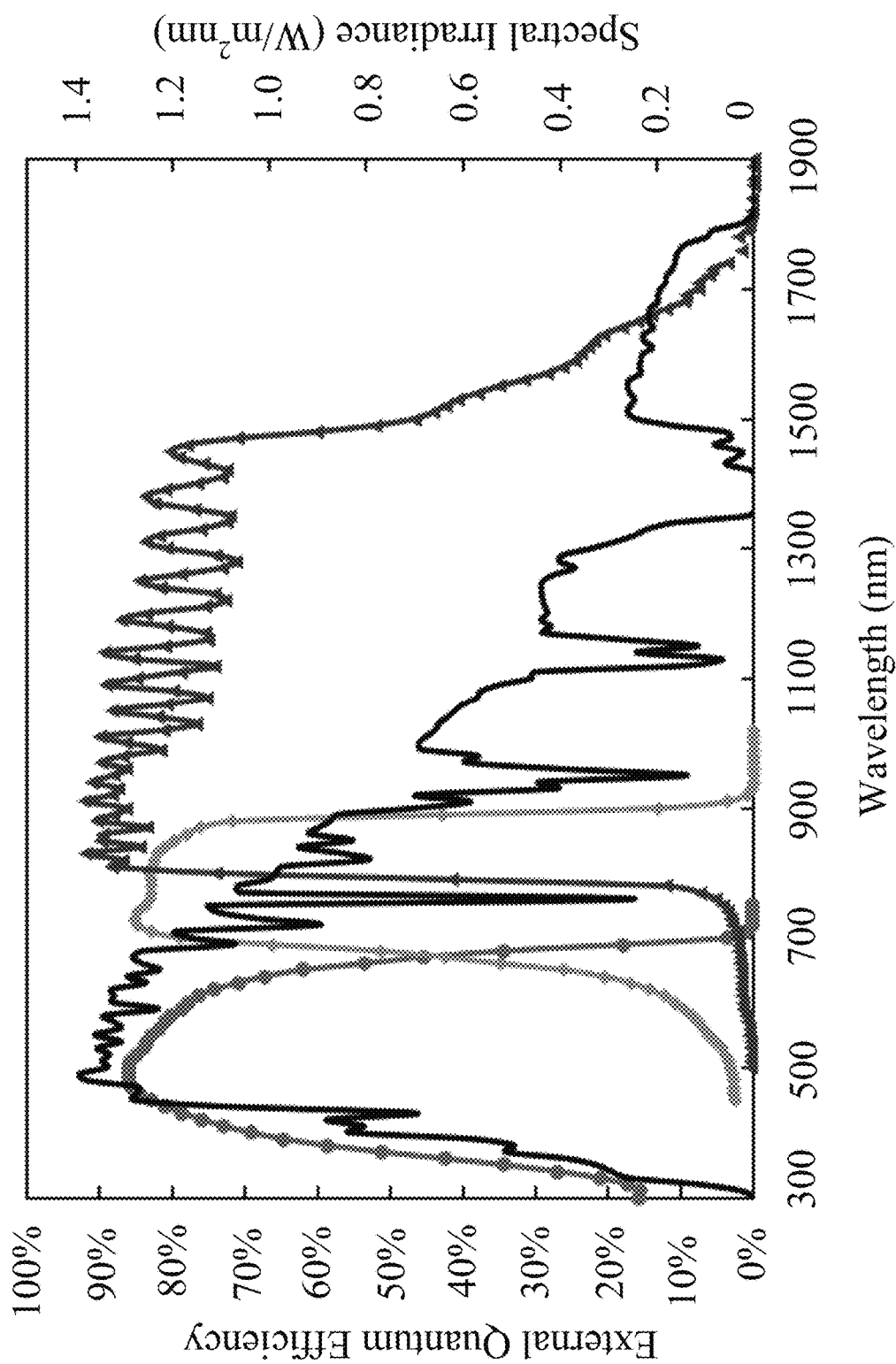
FIG. 28 shows the external quantum efficiency, wavelength, and spectral irradiance of a multi-junction (MJ) solar cell used in an test of the present disclosure.

The Average Spectral Transmittance (AST) of soiling across a specific spectral region may be calculated by means of Equation 5. In this example, the spectral regions of a typical lattice-matched GaInP/GaInAs/Ge solar cell have been used. Table 7 shows the bandwidth interval of each junction, as well as for the whole MJ solar cell considered. FIG. 28 shows the external quantum efficiency of the triple-junction lattice-matched GaInP/GaInAs/Ge solar cell considered in this example. The top is shown with circles, middle with diamonds, bottom with triangles, and the AM1.5D is shown as a solid line.

TABLE 7

Wavebands of the lattice-matched GaInP/GaInAs/Ge solar cell considered (see FIG. 28 for the spectral limits).

| Waveband | Material | $\lambda_{min}$ (nm) | $\lambda_{max}$ (nm) |
|---|---|---|---|
| MJ | GaInP/GaInAs/Ge | 300 | 1810 |
| top | GaInP | 300 | 720 |
| middle | GaInAs | 720 | 920 |
| bottom | Ge | 920 | 1810 |

To conduct this study, a one-year (January 2017 to January 2018) outdoor experimental campaign was conducted at the Centro de Estudios Avanzados en Energía y Medio Ambiente (CEAEMA) of the University of Jaén, in Jaén, Southern Spain (latitude 37° 49'N, longitude 3° 48'W, elev. 457 m). Jaén is a non-industrialized medium-size city with a high annual energy resource, >1,800 kWh/m$_2$, and extreme range of air temperatures that usually go from less than 5° C. in winter to more than 40° C. in summer. It also presents low-medium values of precipitable water and aerosols, although the second ones can periodically reach unusually high values due to specific and stochastic events, such as Saharan dust storms or the burning of olive trees branches in the region. Indeed, Jaen is the largest producer of Olive oil in Spain and worldwide with a 50% and 20% of the total production respectively. Therefore, the present disclosure involves different amounts and types of dust. This increases the interest of the study and opens the way to extract conclusions valid for other locations worldwide.

Figure 27:
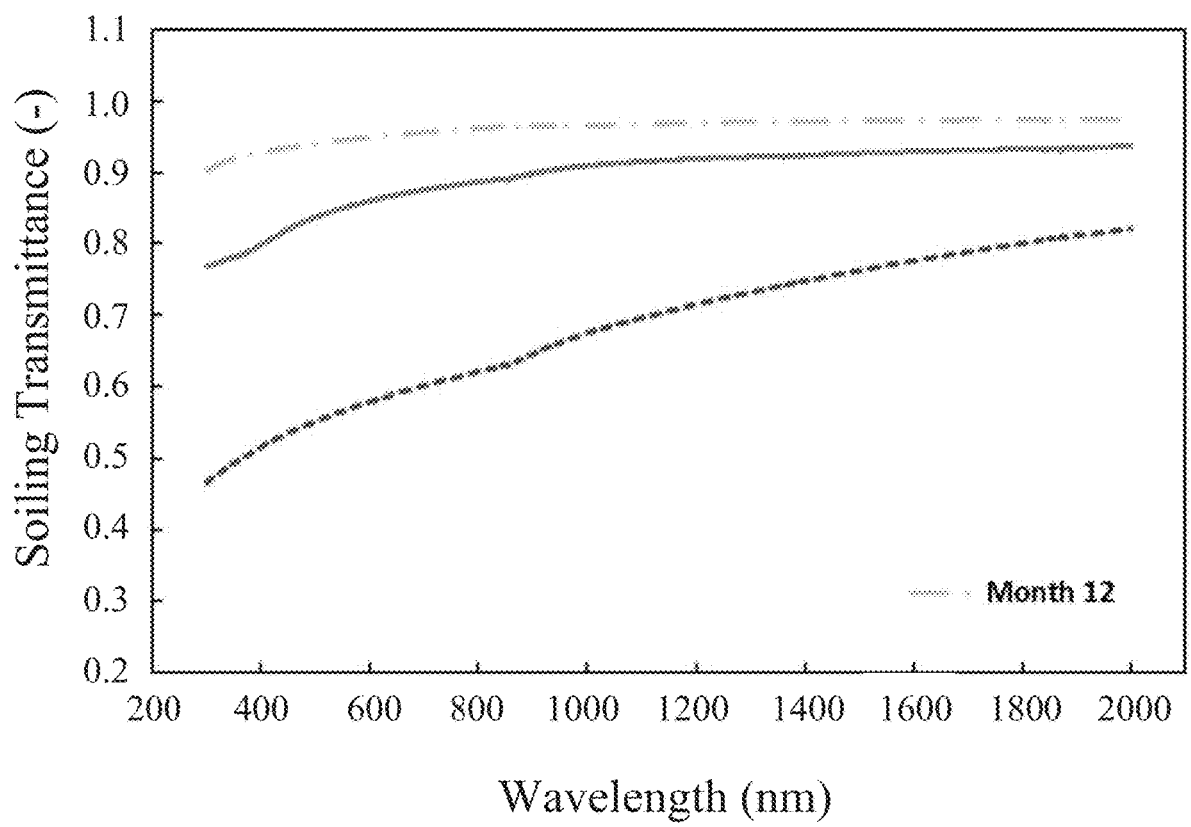
FIG. 27 shows soiling transmittance measured by a soiling detection unit after one (1), six (6), and twelve (12) months of outdoor exposure.

One Diamant® low-iron glass coupon 4 cm×4 cm in size and 3 mm thick from Saint-Gobain Glass was placed horizontally outdoors to capture as much as possible natural dust. This coupon, denoted as Soiled Coupon, was never cleaned and its direct transmittance was measured weekly within a wavelength range between 300 and 2,000 nm, using a Lambda 950 UV/Vis spectrophotometer at the Center of Scientific-Technical Instrumentation (CICT of the University of Jaén. Another sample, denoted as Control Coupon, was stored in a dust-free box to prevent its optical transmittance characteristics from being adversely affected from accidental soiling. Also, this coupon was used as the baseline for each measurement and to check the quality and repeatability of weekly measurements. The soiling transmittance was obtained from the transmittance measurement by means of Equation 4, where $\tau_{soiled}(\lambda)$ and $\tau_{cleaned}(\lambda)$ are, respectively, the spectral transmittance of the Soiled Coupon and the Control Coupon. As an example, FIG. 27 shows the soiling transmittance after one (1), six (6), and twelve (12) months of outdoor exposure. The solid line shows one (1) month, the lower dashed line shows six (6) months, and the top dotted and dashed line shows twelve (12) months. Independently of their average reduction in intensity, a higher attenuation at shorter wavelengths may be clearly seen for all three cases.

An atmospheric station MTD 3000 from Geonica S.A. located on the rooftop of the CEAEMA recorded the direct normal (DNI), global horizontal (GHI), global normal (GNI) and diffuse horizontal (DHI) irradiances, as well as other relevant parameters such as rainfall, air temperature, wind speed and direction or relative humidity. In addition, a solar spectral irradiance meter (SolarSIM-D2) from Spectrafy Inc. mounted on a high-accurate two axis CPV tracker from BSQ Solar S.L. was also used to record the spectral distribution of the direct normal irradiance. All these parameters were recorded every 5 minutes and were available over the same period than the transmission measurements of coupons. The daily values of Particulate Matter 10 (PM10) were gathered from a station, located around 1 km from the experimental set-up, of the Andalucia air quality monitoring and control network.

The indexes described above were obtained weekly considering the SR or the absorption bands of a typical triple-junction solar cell, the $\tau_{soiling}(\lambda)$ calculated with Equation 4 and the spectra recorded during the same day. This MJ solar cell has been selected since it represents the most industrialized and used concentrator solar cell nowadays. Moreover, this architecture meets the recommended absorption bands detailed in the IEC 62670-3 standard concerning the spectral evaluation of MJ-based CPV systems, i.e. top=1.9 eV, middle=1.4 eV and bottom=0.7 eV. Hence, the present disclosure can be applicable to a variety of current concentrator systems.

The weekly soiling transmission measurements were performed three times consecutively. Based on this, the weeks that presented a difference higher than 1% in the $AST_{MJ}$ between the maximum and minimum measurement have been removed from the analysis to avoid noise due to non-uniform soiling or possible measurement errors. Also, in case of cloudy days, the spectra recorded one day before or after the soiling measurements were used to perform the calculations. In this present disclosure, days are considered cloudy when the ratio of the total DNI to the total GNI collected during the day is lower than 0.75, i.e. $\Sigma_{day}DNI/\Sigma_{day}GNI<0.75$.

Finally, this present disclosure is based on the direct transmittance of soiling accumulated on the surface of a glass coupon or pane. In case of considering the concentrator optics, other effects such as additional scattering phenomena produced in the rings of Fresnel lenses or on the surface of parabolic mirrors could have an additional impact. Also, the use of secondary optics to improve the acceptance angle of CPV modules could diminish the losses produced by the scattering. This present disclosure increases the understanding of the wavelength dependence of the attenuation of soiling and its impact on the spectral performance of MJ-based CPV systems. In this sense, soiling is here considered as a stand-alone optical element, as previously considered by other authors. The investigation of the scattering that may be produced between soiling and the concentrator optics would imply to gather detailed information regarding the size and distribution of soiling across the surface of the CPV system under consideration. In that situation, weekly ray-tracing simulations as a function of the recorded input spectra would be necessary.

Figure 29:
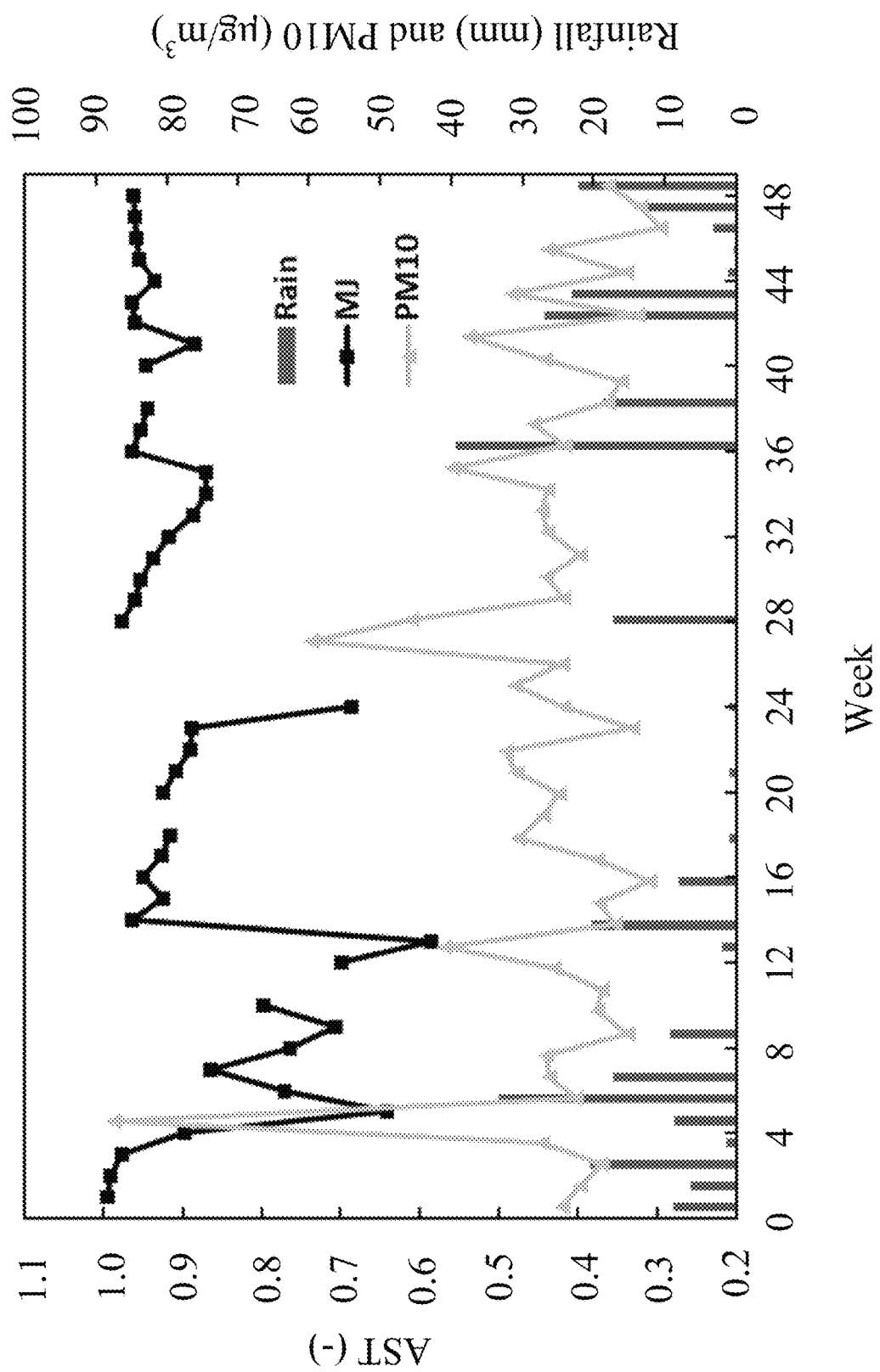
FIG. 29 shows a weekly time series of the average spectral transmittance (AST) of soiling across the spectral region of the multi-junction (MJ) solar cell considered, particular matter 10 (PM10), and rainfall gathered during a one-year outdoor test.

FIG. 29 shows the evolution of the $AST_{MJ}$, rainfall and PM10 over the experimental campaign in order to relate the measured transmittance of soiling with the key weather variables. This could be useful to contribute to future studies regarding this issue, as well as to check the consistency of the recorded data. The $AST_{MJ}$ collected presents an average of 0.891, a maximum of 0.995 and a minimum of 0.585. As shown, the $AST_{MJ}$ is closely related with the rainfall and PM10 trends. In this sense, different events could be highlighted. For instance, the $AST_{MJ}$ strongly decreases on week 5, dropping from 0.897 on week 4 to 0.639, due to an extreme soiling event, i.e. the PM10 recorded during that week reaches an extreme value of 87.5 µg/m$^3$. Another noteworthy soiling event occurs from weeks 28 to 36. As can be seen, the $AST_{MJ}$ decreases with a linear behavior, from a value of 0.977 on week 28 to a minimum value of 0.871 on week 35 ($R^2=0.97$). This value corresponds to the Soiling Rate in the PV field and is produced by the absence of rain over a specific period of time. Finally, another relevant event happens on week 36, where a total of 39.4 mm of rainfall was recorded. As a consequence, the $AST_{MJ}$ drastically increases up to 0.964. This discussion gives evidences regarding the quality of the soiling data collection.

Figure 30:
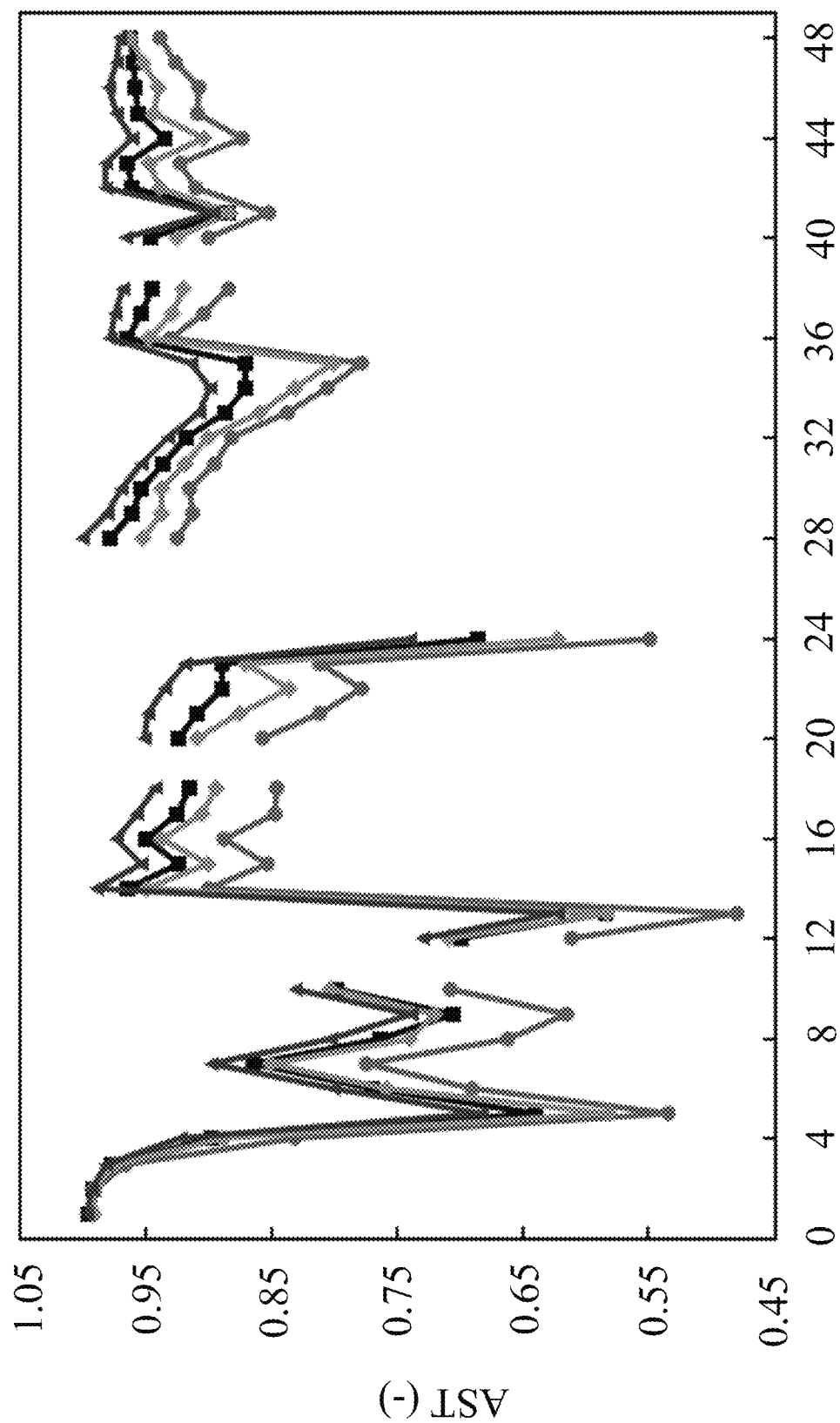
FIG. 30 shows a weekly time series of the average spectral transmittance (AST) of soiling across the spectral region of top, middle, and bottom junctions, and the multi-junction (MJ) solar cell considered gathered during a one-year outdoor test.

FIG. 30 shows the AST on each band of the MJ cell. Top is shown with circles, mid with diamonds, and bot with triangles. Also, for a better readability and comparison purposes, the $AST_{MJ}$ is again included as ssquares. As can be seen, all the transmittances qualitatively present the same evolution over time. Despite this, the average transmittance of soiling is systematically different in each spectral band.

As shown, $AST_{top}$ presents the lowest transmittance values with an average of 0.829, a maximum of 0.991 and a minimum of 0.480. On the contrary, the $AST_{bot}$ shows the highest transmittance values, with an average of 0.961, a maximum of 1.000 and a minimum of 0.623. Finally, the $AST_{mid}$ presents intermediate values with an average of 0.872, a maximum of 0.992 and a minimum of 0.582. These results are important since they prove that soiling can affect the current balance between the top and middle junctions. The lower impact of soiling on the waveband of the bottom subcell and its typical excess in current are not expected to modify the behavior of the system. However, the soiling transmittance losses on the top subcell are around 4% higher than in the middle. This is relevant considering that the spectral behavior of MJ-based CPV systems is mainly driven by the top junction since it is the current-limiting subcell in the majority of the cases. Hence, the inherent spectral nature of soiling and its lower transmittance at shorter wavelengths is expected to introduce additional spectral losses on the systems. This will be further discussed in the next sub-section.

Figure 31:
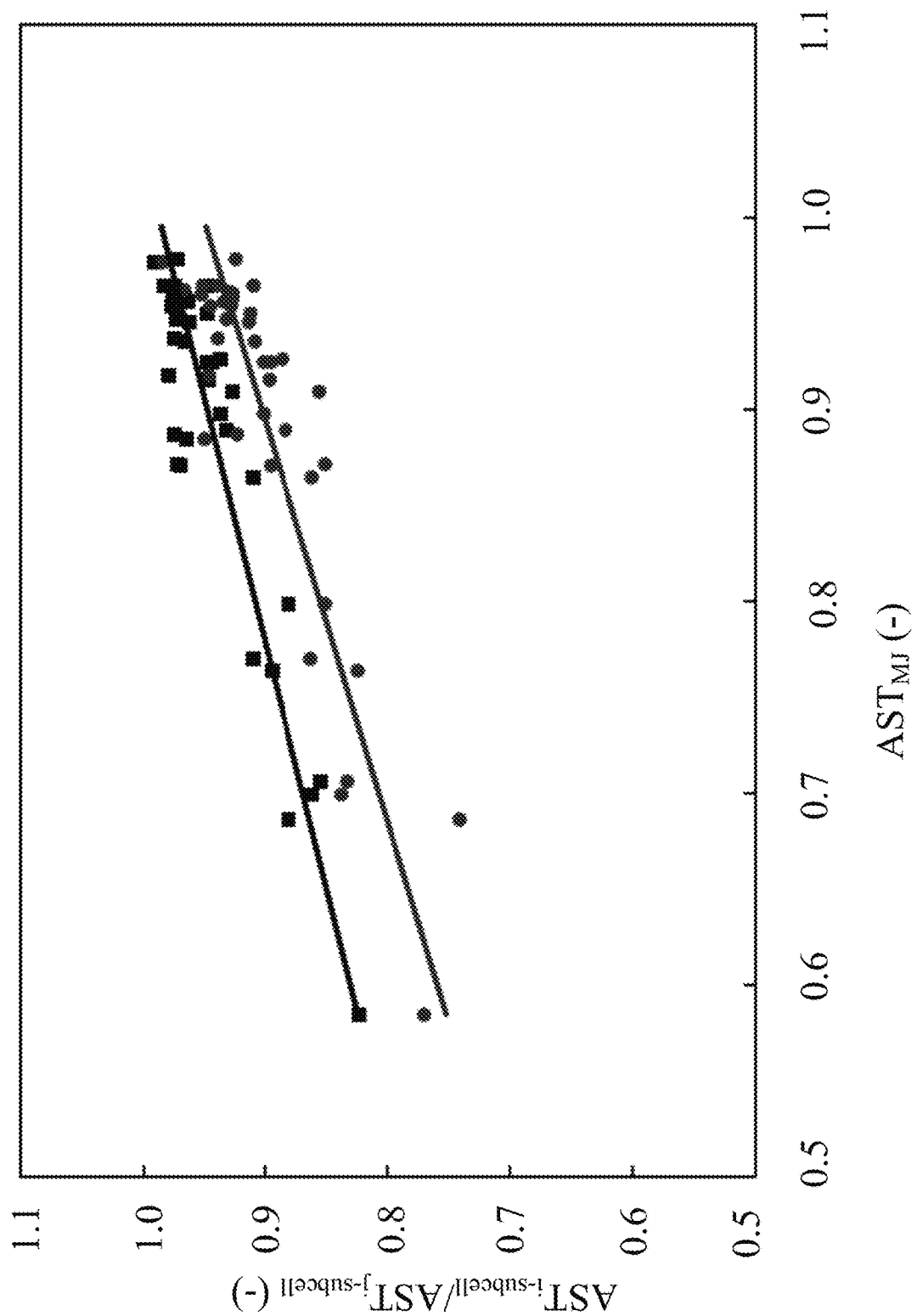
FIG. 31 shows the ratio of the average spectral transmittance (AST) for the i-subcell ($AST_{i\text{-}subcell}$) to the AST for the j-subcell ($AST_{j\text{-}subcell}$) versus the AST of soiling across the spectral region of the multi-junction (MJ) solar cell considered.

In addition to the discussion above, the relation between the AST of each subcell and in the whole wavelength range of the cell has been investigated. FIG. 31 shows the ratios of the average transmittance of the top to the middle subcell ($AST_{top}/AST_{mid}$, indicated with squares) and to the bottom subcell ($AST_{top}/AST_{bot}$, indicated with circles) plotted against the $AST_{MJ}$. As can be seen, these ratios are not constant and tend to decrease with the broadband reduction of $AST_{MJ}$. This means that the $AST_{top}$ decreases in a larger extent than the AST of the other two junctions as the $AST_{MJ}$ decreases. As can be seen, the $AST_{top}/AST_{mid}$ and $AST_{top}/AST_{bot}$ ratios decrease with the $AST_{MJ}$ following a noticeable linear behavior. Linear lines of best fit have a goodness of fit of $R^2=0.84$ for $AST_{top}/AST_{mid}$ and $R^2=0.77$ for $AST_{top}/AST_{bot}$. This linear trend indicates that both ratios can be predicted with a low margin of error from the $AST_{MJ}$ by using a simple linear relationship. Indeed, the estimation of the $AST_{top}/AST_{mid}$ ratio shows a MAPE=1.59% and a MPE=0.04%, and the estimation of the $AST_{top}/AST_{bot}$ a MAPE=2.55% and a MPE=0.28%. The relation of the $AST_{top}/AST_{mid}$ ratio with $AST_{MJ}$ is a remarkable conclusion. This indicates that the more the attenuation caused by soiling in the input irradiance, the more the attenuation in the top subcell respects to the middle. This is relevant since the additional spectral impact caused by soiling is expected to grow with the amount of soiling accumulated on the surface of CPV systems.

Figure 32:
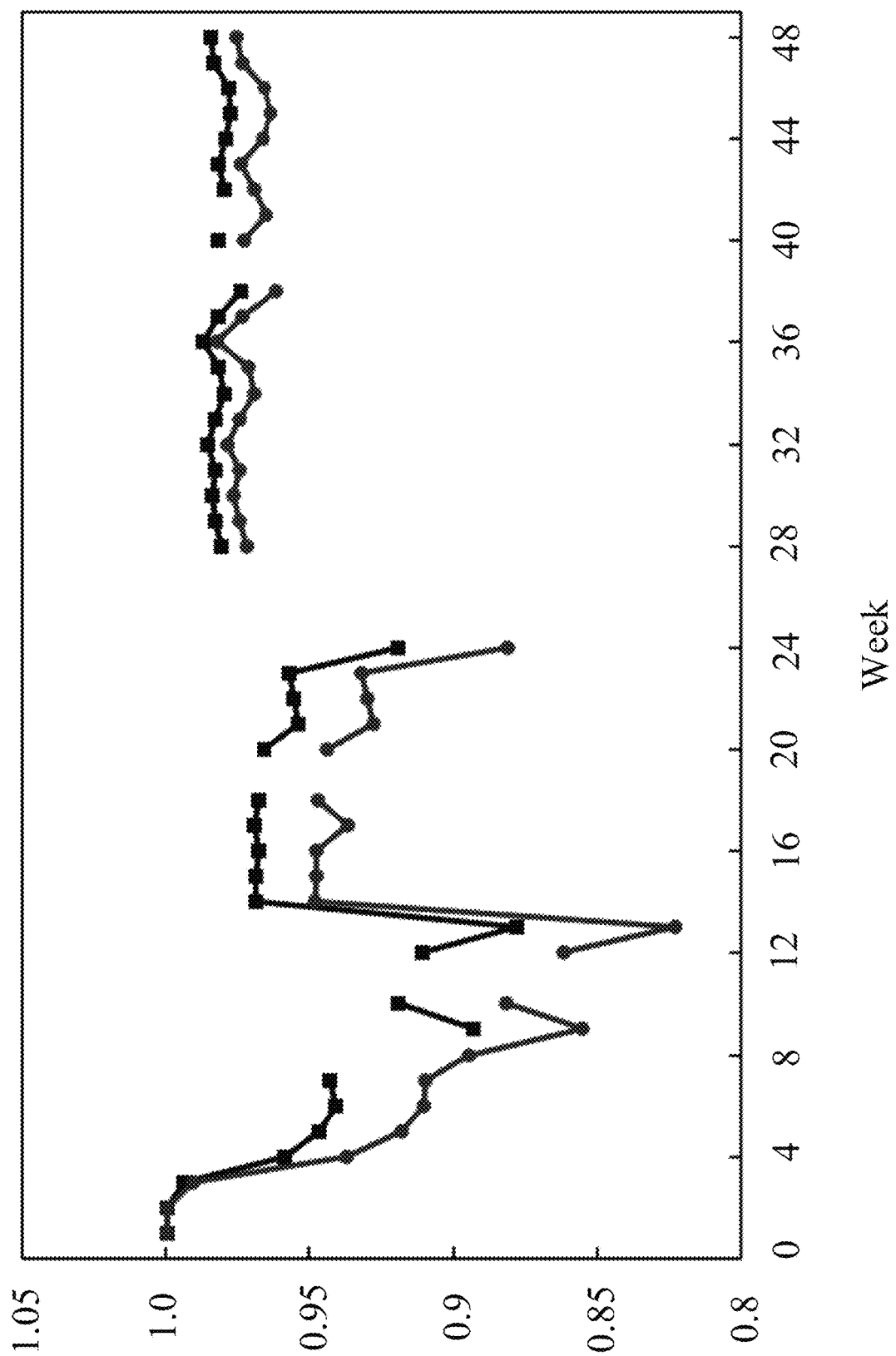
FIG. 32 shows a weekly time series for the soiling mismatch ratio (SMratio), and the ratio of the AST for the top to the AST for the middle subcells ($AST_{top}/AST_{mid}$) gathered during the one-year outdoor test of the present disclosure.
Figure 33:
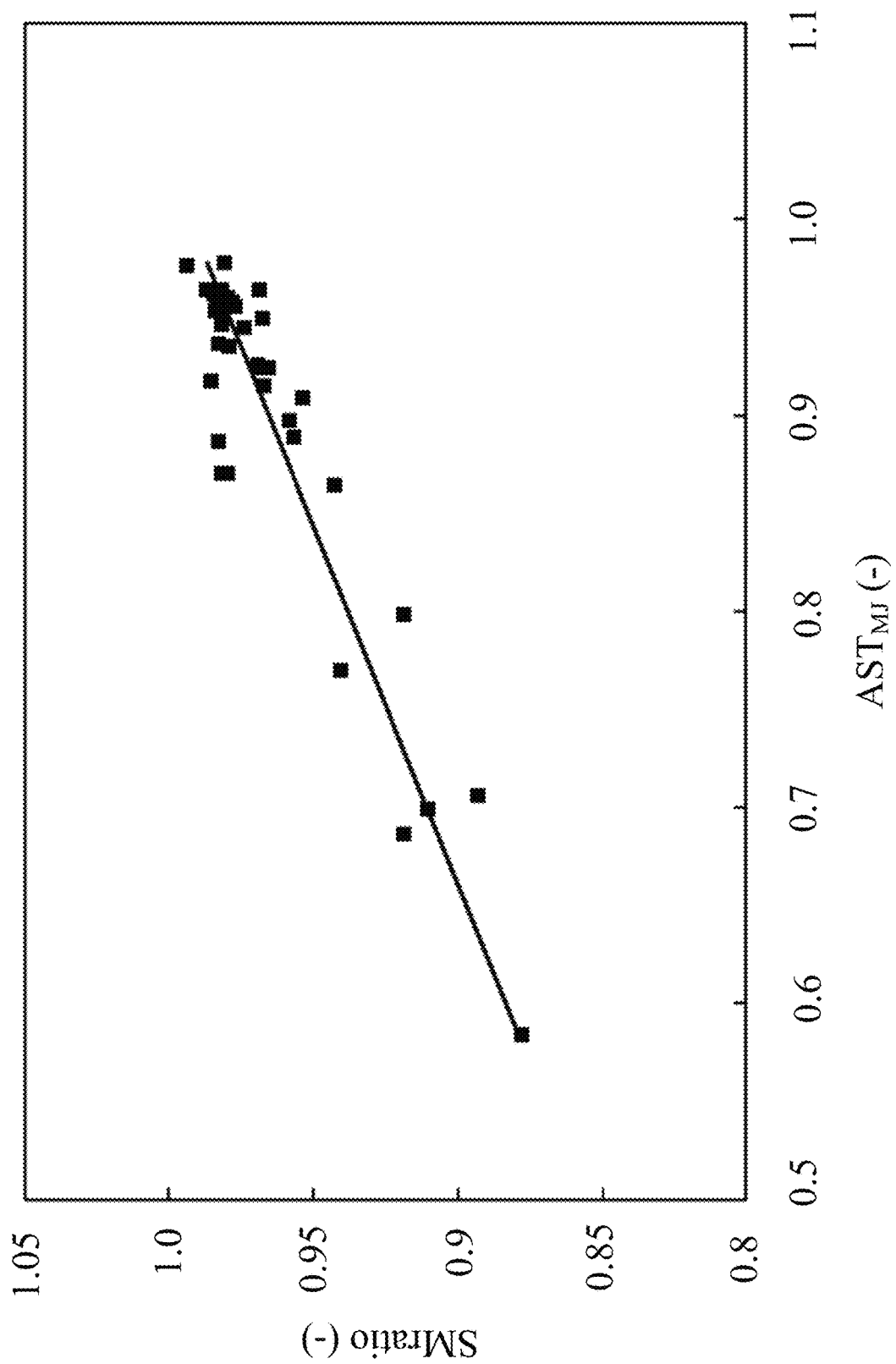
FIG. 33 shows the soiling mismatch ratio (SMratio) versus the AST of soiling across the spectral region of a multi-junction (MJ) solar cell.

FIG. 32 shows the evolution of the impact of soiling on the current balance between the top and middle junctions through the SMratio index. The SMratio is shown with squares and the $AST_{top}/AST_{mid}$ is show with circles. In addition, the ratio of the $AST_{top}$ to the $AST_{mid}$ subcells ($AST_{top}/AST_{mid}$) is shown. As can be seen, both magnitudes qualitatively present the same evolution over time. As expected, the presence of soiling tends to decrease the current generated by the top junction to the current generated by the middle junction. The SMratio presents an average value of 0.966, a maximum of 0.999 and a minimum value of 0.878. On the other hand, the $AST_{top}/AST_{mid}$ is more affected by soiling than the SMratio. It presents an average value 0.947, a maximum value of 0.999 and a minimum value 0.823. This indicates that the impact of soiling on the current balance among the subcells cannot only be explained considering the attenuation of soiling on each specific spectral band. It is going to be necessary to consider the coupling among the spectral transmittance of soiling, the input spectrum, and the spectral response of each junction. The lower impact of soiling on the SMratio respect to the $AST_{top}/AST_{mid}$ can be understood considering that the irradiance in the waveband of the top subcell is lower than in the middle in the majority of the cases. For instance, it is around 50% lower at AM=10. As a consequence, under the standard irradiance, the spectral transmittance of soiling relatively affects the current of the top junction in a lesser extent than the current of the middle junction. Hence, the SMratio is expected to be always higher than the $AST_{top}/AST_{mid}$. Despite this issue, the SMratio can be determined from the $AST_{MJ}$ with a low margin of error. As can be seen in FIG. 33, the SMratio shows a linear tendency as the broadband transmittance decreases, an $R^2=0.86$, and shows a MAPE=0.96% and a MPE=0.02%.

Figure 34:
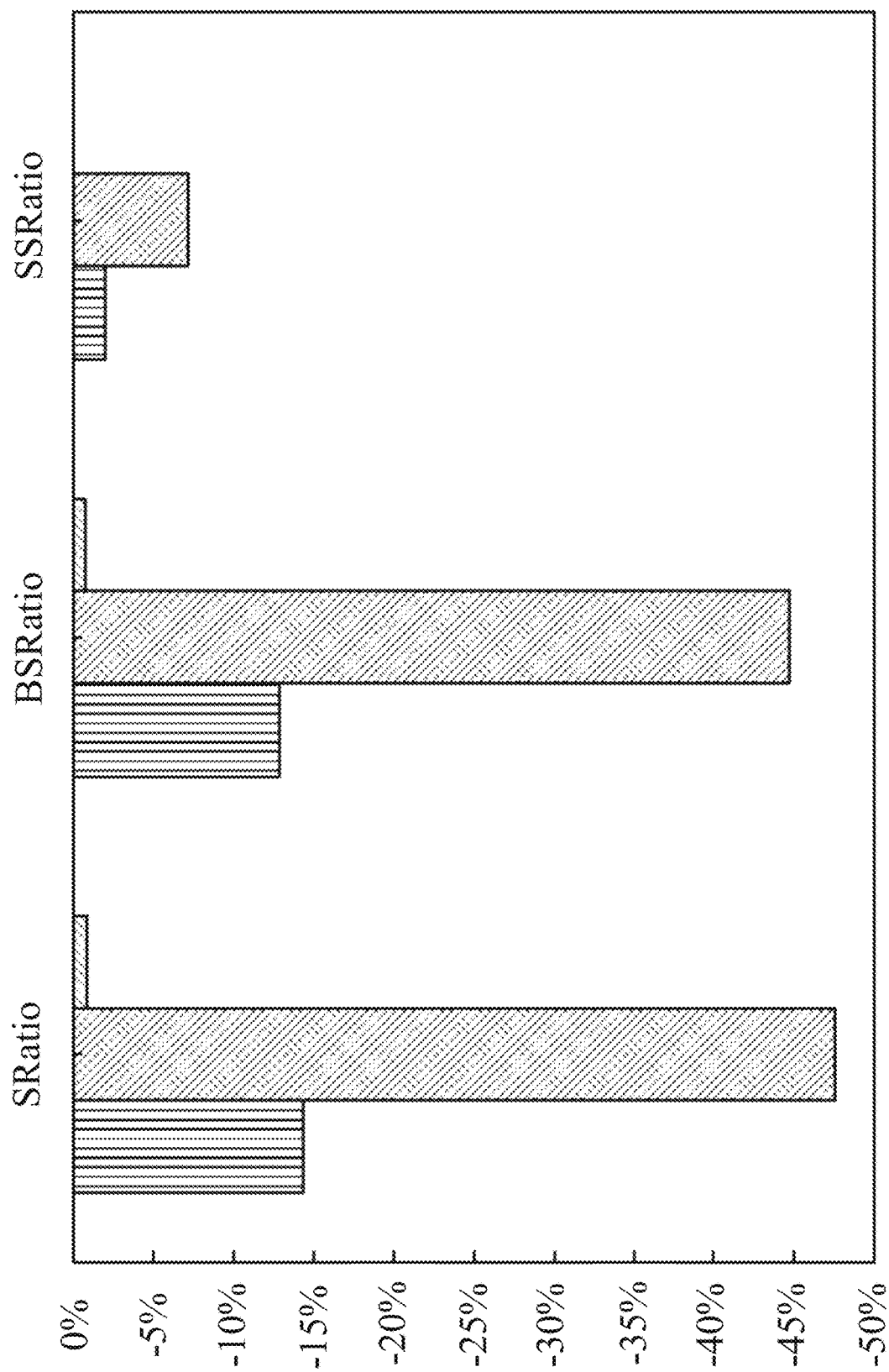
FIG. 34 shows the maximum, minimum, and average (mean) Soiling Ratio (SRatio), Broadband Soiling Ratio (BSRatio), and Spectral Soiling Ratio (SSRatio) obtained during a one-year outdoor test of the present disclosure.

The study of the SMratio above demonstrates that soiling affects the current balance between the top and middle junction of MJ-based CPV systems under real working conditions. In order to investigate how this is translated to soiling losses, FIG. 34 shows the average (vertical hatching), maximum (left angled hatching), and minimum (right angled hatching) value of the SRatio, BSRatio and SSratio collected during the whole experimental campaign. As shown in FIG. 34, the SRatio is dominated by the broadband attenuation of soiling. The total soiling losses present an average value of −14.4%, a maximum of −47.5% and a minimum of −0.8%, while the broadband losses show an average of value of −12.7%, a maximum of −44.7% and approximately the same minimum losses. On the other hand, the additional spectral losses caused by soiling present an average value of −2.0%, a maximum of −7.2% and a minimum of around 0%. The contribution to the total losses of the spectral nature of soiling may seem negligible. However, it is worth mentioning that the annual spectral losses of cleaned MJ-based CPV systems are typically around −5%. This means that soiling can be responsible of an increase of about 40% in the annual spectral losses of CPV. This could affect the cost of electricity and competitiveness of MegaWatt size CPV power plants and should be further investigated in future work.

Figure 35:
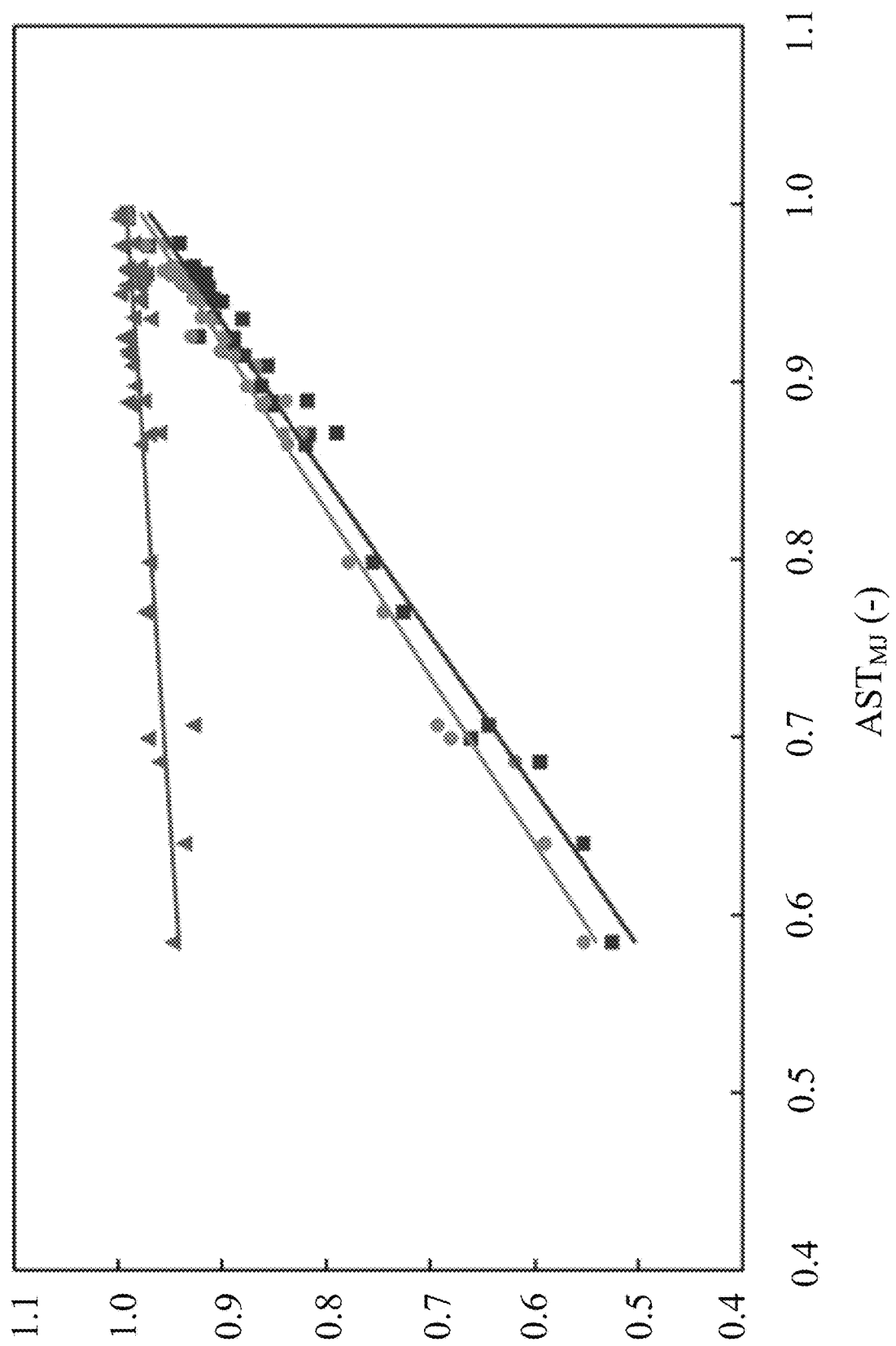
FIG. 35 shows the Soiling Ratio (SRatio), Broadband Soiling Ratio (BSRatio), and Spectral Soiling Ratio (SSRatio) versus the AST of soiling across the spectral region of a multi-junction (MJ) solar cell considered during a one-year outdoor test of the present disclosure.

FIG. 35 shows the SRatio, BSRatio, and SSratio versus the AST of soiling on wavelength region of the whole MJ cell. SRatio is indicated by squares, BSRatio is indicated by circles, and SSRatio is indicated by triangles. Each data series has a linear line of best fit. The SRratio and the BSratio show a clear linear relationship with this magnitude, with an $R^2=0.98$ and $R^2=0.99$, respectively. This indicates that, despite the spectral nature of soiling, the performance of a soiled CPV system is mainly dominated by the broadband attenuation of the irradiance caused by soiling. In this sense, the total soiling losses can be estimated from the $AST_{MJ}$ with a MAPE=1.48% and a MPE=0.03%. As expected, the estimation of the broadband losses from $AST_{MJ}$ presents a lower margin of error, i.e. only the coupling between the spectral irradiance and the transmittance of soiling are involved. It shows a MAPE=1.06% and a MPE=0.02%. On the contrary, the relation between the SSRatio and the $AST_{MJ}$ shows the poorest linear behavior with a $R^2=0.63$. However, it can also be predicted with a relatively high accuracy with a MAPE=0.83% and a MPE=0.01%.

Figure 36:
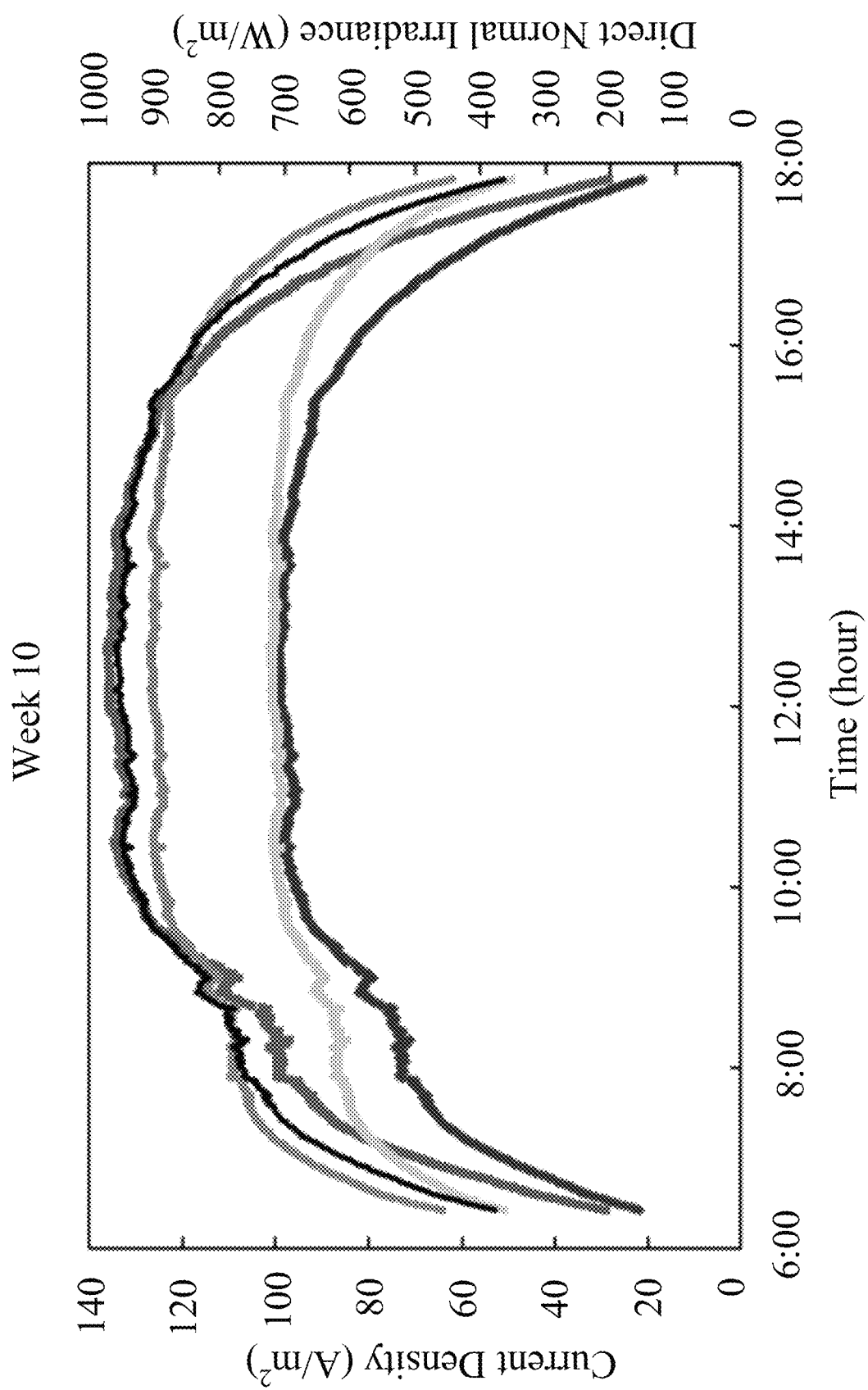
FIG. 36 shows the hourly time-series of the short-circuit current densities for the top and middle subcells with and without considering the spectral transmittance of soiling for week 10 of a test of the present disclosure.
Figure 37:
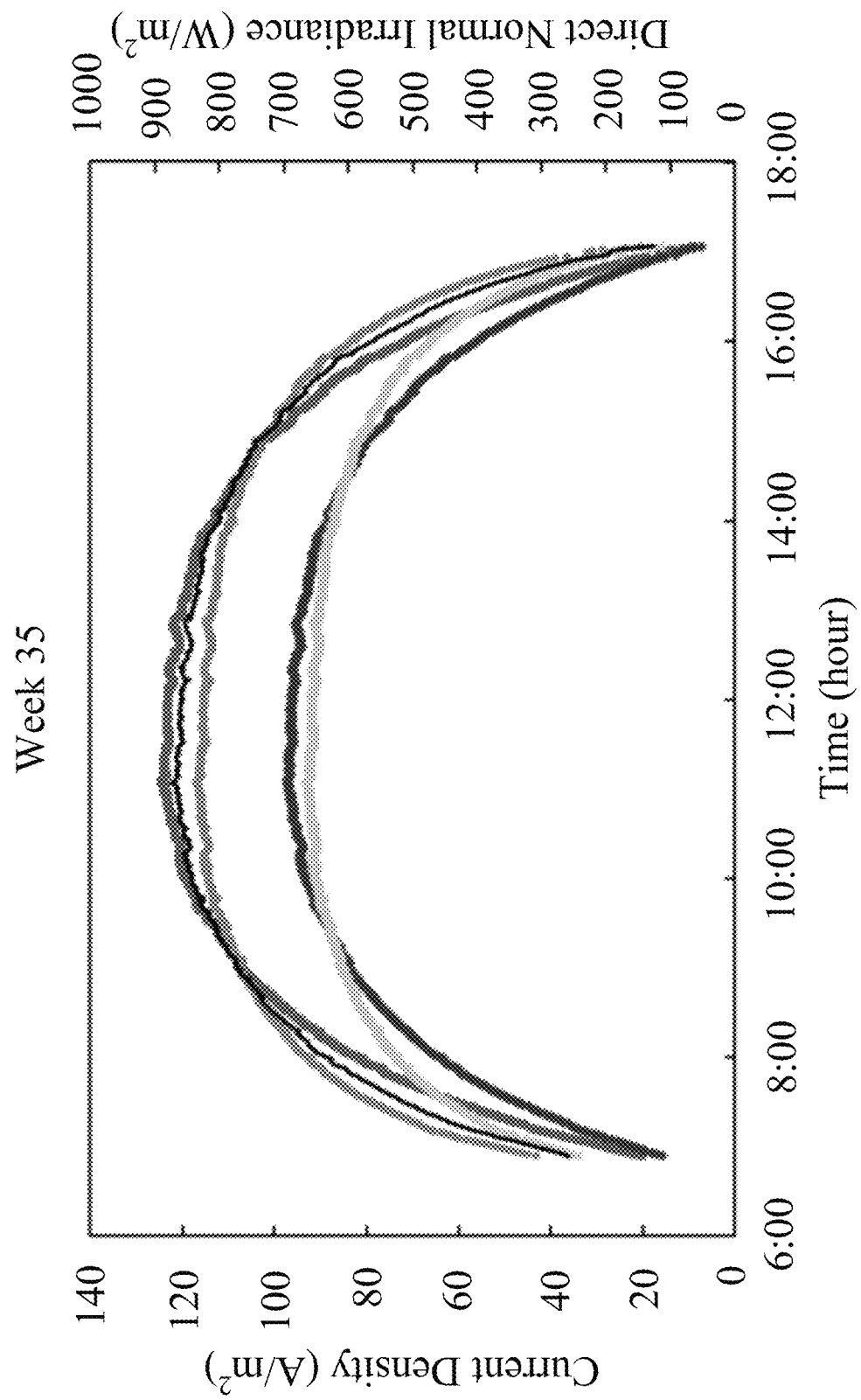
FIG. 37 shows the hourly time-series of the short-circuit current densities for the top and middle subcells with and without considering the spectral transmittance of soiling for week 35 of a test of the present disclosure.
Figure 38:
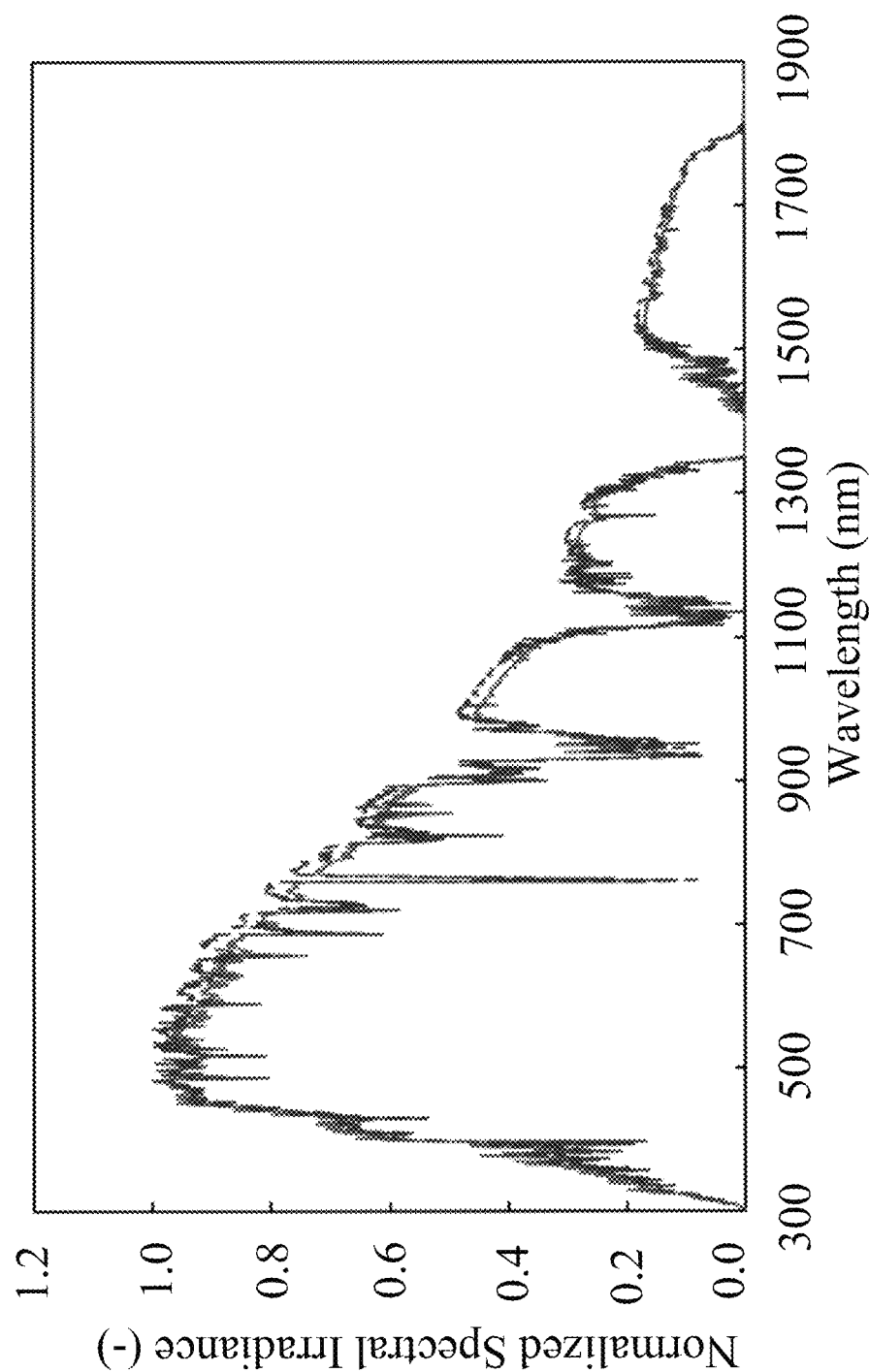
FIG. 38 shows a normalized spectral irradiance recorded at noon for weeks 10 and 35 during a one-year outdoor test of the present disclosure.

The poorer linear behavior of SSRatio with $AST_{MJ}$ is due to the non-flat spectral transmittance of soiling. However, the value of SSRatio is also going to depend on the distribution of the actual spectral irradiance. In order to illustrate this phenomenon, FIG. 36 and FIG. 37 shows the short-circuit current densities, as well as the DNI, for the top and middle subcells with and without considering soiling for weeks 10 and 35 respectively. The top (clean) is shown as the top line with squares, the mid (clean) is shown with circles, top (soiled) is shown as the lowest line with diamonds, the mid (soiled) is shown as triangles, and the DNI is shown as a dark, solid line. These weeks have been selected since both present approximately the same soiling spectral losses, i.e. SSRatio=0.97 (week 10) and 0.96 (week 35), but remarkable $AST_{MJ}$ different values, i.e. $AST_{MJ}$=0.79 (week 10) and 0.87 (week 35). Moreover, the $AST_{top}/AST_{mid}$ and SMRatio ratios are, respectively, 0.88 and 0.92 in week 10, and 0.97 and 0.98 in week 35. Based on this, it could be expected that week 10 would have higher soiling spectral losses due to the higher reduction of the current on the top junction. The way to elucidate why both weeks present almost the same SSRatio is related to the wavelength distribution of the irradiance. FIG. 38 shows the normalized recorded spectral irradiance at noon for the two days used to estimate the different index on those weeks. Week 10 is shown as a solid line and week 35 is shown as a dashed line. As can be seen, the spectrum in week 10 is blue—richer than the spectrum in week 35. As a consequence, the current generated by the top junction respect to the middle is higher, i.e. approximately 1% higher than in week 35. As a result of the lower SMratio on week 10, the top and middle junctions stay in current-matching condition at the central hours of the day. In this sense, soiling contributes to improve the spectral performance of the system when the DNI is at maximum. On the contrary, in week 35, soiling reduces the current of both junctions, but it does not contribute to significantly improve the current-matching between the top and middle subcells. This is a relevant conclusion since this phenomenon could help to diminish the soiling losses of MJ-based CPV systems. Indeed, week 10 presents a SRatio approximately 4.5% lower than week 35, i.e. SRatio=0.755 (week 10) and SRatio=0.790. However, the $AST_{MJ}$ of week 10 is approximately 8.5% lower than in week 35. This means that week 10 presents approximately 50% lower soiling losses than it would be expected.

Based on the above, it could be concluded the that impact of soiling on the performance of CPV systems could be minimized at locations characterized by a blue-rich spectral distribution. These locations correspond with sites close to the equator, thus with low AM values, and a clear atmosphere, thus low values of aerosols. Hence, locations with high annual irradiation since the AM and aerosols affect the spectral distribution, but also the total irradiance. These sites are, in fact, the ones of interest for CPV technology due their high annual solar resource. This novel phenomenon could help to diminish the soiling losses and increase the competitiveness of CPVs.

Along with its individual impact on each subcell, soiling also causes changes in the current balance among the subcells, which is also effected by the actual spectral irradiance. Some indexes have been introduced to describe the spectral characteristics of soiling and their impact on a MJ cell performance, and the correlations among them have also been discussed. In general, after one-year experimental investigation conducted in the South of Spain, the attenuation in the transmittance of the top subcell waveband due to soiling has been found to be always greater than the attenuations in the transmittance of the other two subcells wavebands. In addition, the impact of soiling on the transmittance of the top subcell, compared to the transmittance of the other two subcells, has been found to linearly increase with the severity of soiling.

Despite this initial finding, it has been highlighted how the effect of soiling on the current generation of each subcell is also a result of the spectral distribution of the irradiance, which tends to be more intense in the region of the middle subcell. This means that, also if the soiling transmittance attenuation is lower in the mid-subcell waveband than in the top-subcell waveband, its relative impact on the current generated by the mid-subcell can be higher because of the larger amount of incoming light in its waveband.

As described herein, soiling as been found to be responsible for about 40% of the spectral losses, a non-negligible issue for CPV systems. The present disclosure also shows that soiling on CPV could be mitigated in conditions of blue-rich spectral irradiance distribution, thanks to the series configuration of the subcells in a MJ cell and the higher current generated by the top subcell at these sites during the central hours of day when the irradiance is at a maximum. These conditions are common in regions close to the equator and with a clear atmosphere, which have also been previously found to be the most convenient for CPV applications due to their high solar energy resources.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an invention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

EXAMPLES

Example 1

A device comprising:
a glass pane having a first surface and a second surface;
a light source configured to emit a light beam on the first surface of the glass pane; and
a light detector adjacent to the second surface of the glass pane and configured to receive at least a portion of the light beam as a reading; wherein:
the light beam is transmitted through the glass pane.

Example 2

The device of Example 1, wherein the light beam is collimated.

Example 3

The device of Example 1, wherein a collimator is positioned between the second surface of the glass pane and the light detector.

Example 4

The device of Example 3, wherein the collimator is a curved glass lens.

Example 5

The device of Example 3, wherein the light beam is collimated.

Example 6

The device of Example 1, wherein the light source is positioned within an enclosure

Example 7

The device of Example 1, wherein the light detector is a photovoltaic cell.

Example 8

The device of Example 7, wherein the photovoltaic cell is a concentrated photovoltaic cell.

Example 9

The device of Example 8, wherein a collimator is positioned adjacent to the second surface of the glass pane.

Example 10

The device of Example 9, wherein the collimator is a curved glass lens.

Example 11

The device of Example 1, wherein the light detector is a spectrophotometer.

Example 12

The device of Example 11, wherein a collimator is positioned adjacent to the second surface of the glass pane.

Example 13

The device of Example 1, further comprising a control unit which receives a reading from the light detector.

Example 14

The device of Example 13, wherein the control unit follows an algorithm to use the reading to determine a soiling metric.

Example 15

The device of Example 14, wherein the soiling metric is used to estimate the soiling on a proximately located photovoltaic cell.

Example 16

A method comprising:
recording a first reading of a light detector;
turning on a light source configured to emit a light beam on a first surface of a glass pane;
recording a second reading of the light detector while the light source is turned on;
subtracting the first reading from the second reading resulting in a corrected second reading; and
determining a soiling metric of the glass pane using the corrected second reading; wherein:
the glass pane comprises the first surface and a second surface,
the light beam is transmitted through the glass pane, and
the light detector is adjacent to the second surface of the glass pane and configured to receive at least a portion of the light beam.

Example 17

The method of Example 16, wherein the glass pane is cleaned when the soiling metric reaches a predetermined amount.

Example 18

The method of Example 16, wherein the first reading and the second reading are measurements of the transmittance of the light beam through the glass pane.

Example 19

The method of Example 16, wherein the light detector is a photovoltaic cell.

Example 20

The method of Example 16, wherein the light source emits the light beam at a discrete wavelength.

Example 21

The method of Example 20, wherein the discrete wavelength is between 300 nm and 1300 nm.

Example 22

The method of Example 16, wherein the soiling metric of the glass pane is inferd to be approximately equal to the soiling metric for a proximately located photovoltaic cell.

Example 23

The method of Example 16, wherein the light detector is in direct contact with the second surface of the glass pane.

Example 24

The method of Example 16, wherein the light detector is positioned within an enclosure and the glass pane is the top surface of the enclosure.

Example 25

The method of Example 16, wherein the determining of the soiling ratio of the glass pane is performed by a control unit.

Example 26

The method of Example 16, wherein a collimator is adjacent to the second surface of the glass pane.

Example 27

The method of Example 26, further comprising collimating the light beam after it is transmitted through the glass pane.

Example 28

The method of Example 16, wherein the soiling metric is a ratio of the corrected second reading and a corrected baseline reading.

Example 29

The method of Example 28, wherein the corrected baseline reading is determined by:
recording a third reading of a light detector while the light source is turned off,
turning the light source on,
recording a fourth reading of the light detector, and
subtracting the third reading from the fourth reading resulting in the corrected baseline reading.

Example 30

The method of Example 29, wherein the third reading and the fourth reading are measurements of the transmittance of the light beam through the glass pane.

Example 31

The method of Example 29, wherein the corrected baseline reading is determined prior to determining the soiling ratio of the glass pane.

Example 32

The method of Example 29, wherein the corrected baseline reading is determined immediately after the light detector is installed.

Example 33

The method of Example 29, wherein the corrected baseline reading is determined immediately after the light detector is cleaned.

Example 34

The method of Example 29, wherein the determining of the corrected baseline reading is performed by a control unit.

Example 35

A device comprising:
a light source configured to emit a light beam on a first surface of a glass pane;
a light detector configured to be adjacent to a collimator and a second surface of the glass pane;
a collimator configured to be in direct contact with the second surface of the glass pane and adjacent to the light detector; and
a control unit connected to the light detector via a first wiring and connect to the light source via a second wiring; wherein:
the light beam is transmitted through the glass pane,
the light beam is collimated by the collimator resulting in a collimated light, and
the light detector absorbs the collimated light.

Example 36

The device of Example 35, wherein the collimator is a curved glass lens.

Example 37

The device of Example 35, wherein the light detector is a photovoltaic cell.

Example 38

The device of Example 37, wherein the photovoltaic cell is a concentrated photovoltaic cell.

Example 39

The device of Example 35, wherein the light source is a light emitting diode (LED).

Example 40 the device of Example 35, wherein the light source is a laser diode.

Example 41

The device of Example 35, further comprising a heat sink in direct contact with the light source.

Example 42

The device of Example 41, wherein the heat sink comprises a fin.

Example 43

The device of Example 35, wherein the control unit records a reading of the collimated light.

Example 44

The device of Example 35, wherein the control unit uses an algorithm to determine a soiling metric for the glass pane from the reading.

Example 45

A method comprising:
taking a zero measurement using a light detector;
turning on a light source to emit a light beam at an approximately right angle to a glass pane;
taking a soiling measurement using the light detector;

correcting the soiling measurement by subtracting the zero measurement from the soiling measurement, resulting in a corrected soiling measurement; and calculating a soiling metric using the corrected soiling measurement, wherein:

the glass pane has a first surface and a second surface, and
the light detector is adjacent to the second surface of the glass pane.

Example 46

The method of Example 45, further comprising collimating the light beam using a collimator, wherein the collimator is positioned between the second surface of the glass pane and the light detector.

Example 47

The method of Example 46, wherein the light detector is a photovoltaic cell.

Example 48

The method of Example 47, wherein the photovoltaic cell is a concentrated photovoltaic cell.

Example 49

The method of Example 45, wherein the light beam is allowed to stabilize prior to taking the soiling measurement.

Example 50

The method of Example 49, wherein the taking the soiling measurement occurs 10 minutes after the turning on of the light source.

Example 51

The method of Example 45, wherein the light detector is a photovoltaic cell.

Example 52

The method of Example 45, wherein a baseline measurement is also used to calculate a soiling metric.

Example 53

The method of Example 52, wherein the baseline measurement is determined by:
cleaning the glass pane;
taking a baseline zero measurement using the light detector;
turning on the light source;
taking a baseline soiling measurement using the light detector;
correcting the baseline soiling measurement by subtracting the baseline zero measurement from the baseline soiling measurement, resulting in the baseline measurement.

Example 54

The method of Example 52, wherein the baseline measurement is determined when the light detector is installed Example 55

The method of Example 52, wherein the baseline measurement is determined when the light detector is cleaned.

The invention claimed is:

1. A method for determining the soiling ratio of an amorphous silicon (a-Si) photovoltaic cell, the method comprising:

measuring a reference spectral transmittance ($\tau_{ref}$) at a single wavelength of a glass pane immediately after the glass pane is cleaned;

measuring a soiled spectral transmittance ($\tau_{soil}$) at the single wavelength of the glass pane;

calculating the spectral transmittance of soiling ($\tau_{soiling}$) at the single wavelength of the glass pane, using the equation $$\tau_{soiling} = \frac{\tau_{soil}}{\tau_{ref}};$$

and assigning a soiling ratio of the a-Si photovoltaic cell to the corrected spectral transmittance of soiling of the glass pane.

2. The method of claim 1, wherein the single wavelength is within the visible region of light.

3. The method of claim 1, wherein the single wavelength is 500 nm.

4. The method of claim 1, wherein the measuring is performed using a light detector.

5. The method of claim 4, wherein the light detector is the amorphous silicon (a-Si) photovoltaic cell.

6. The method of claim 5, wherein:
a nearby photovoltaic cell comprises a cover,
the cover is oriented at an angle and is comprised of a first material,
the glass pane is oriented at the angle, and
the glass pane is comprised of the first material.

* * * * *